US010856259B2

(12) United States Patent
Park et al.

(10) Patent No.: US 10,856,259 B2
(45) Date of Patent: *Dec. 1, 2020

(54) RAN PAGING TRANSMISSION BY A BASE STATION

(71) Applicant: Ofinno, LLC, Reston, VA (US)

(72) Inventors: Kyungmin Park, Herndon, VA (US); Esmael Dinan, Herndon, VA (US)

(73) Assignee: Ofinno, LLC, Reston, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/524,589

(22) Filed: Jul. 29, 2019

(65) Prior Publication Data
US 2019/0357172 A1    Nov. 21, 2019

Related U.S. Application Data

(63) Continuation of application No. 15/925,573, filed on Mar. 19, 2018, now Pat. No. 10,368,334.

(60) Provisional application No. 62/472,997, filed on Mar. 17, 2017.

(51) Int. Cl.
| H04W 68/02 | (2009.01) |
| H04W 76/27 | (2018.01) |
| H04W 76/28 | (2018.01) |
| H04W 68/00 | (2009.01) |
| H04W 68/04 | (2009.01) |
| H04W 76/18 | (2018.01) |

(52) U.S. Cl.
CPC ....... *H04W 68/025* (2013.01); *H04W 68/005* (2013.01); *H04W 68/04* (2013.01); *H04W 76/27* (2018.02); *H04W 76/28* (2018.02); *H04W 76/18* (2018.02)

(58) Field of Classification Search
CPC .......................... H04W 84/045; H04W 76/28
USPC ...... 455/552.1, 450, 458; 370/329, 328, 252
See application file for complete search history.

(56) References Cited

U.S. PATENT DOCUMENTS

| 7,020,477 | B2 | 3/2006 | Cramby et al. | |
| 2008/0218209 | A1 | 9/2008 | Lee et al. | |
| 2011/0107465 | A1 | 5/2011 | Reuzeau et al. | |
| 2013/0260811 | A1* | 10/2013 | Rayavarapu | H04W 76/19 455/509 |
| 2016/0044740 | A1 | 2/2016 | Siomina et al. | |

(Continued)

OTHER PUBLICATIONS

R2-1700888; 3GPP TSG-RAN WG2 #97; Athens, Greece, Feb. 13-17, 2017; Agenda Item: 10.2.2.2; Source: Ericsson; Title: Small data: comparison between solutions A and B; Document for: Discussion, Decision.

(Continued)

*Primary Examiner* — Kiet M Doan
(74) *Attorney, Agent, or Firm* — David Grossman; Kavon Nasabzadeh; Philip Smith

(57) ABSTRACT

A first base station receives an uplink signal from a wireless device. The first base station receives a packet for the wireless device: after a duration from receiving the uplink signal; and when the wireless device is in a radio resource control inactive state. A determination is made that the duration is larger than a value. Based on the determining, the first base station sends a radio access network (RAN) paging to a second base station of a RAN notification area of the wireless device. The first base station sends the packet.

20 Claims, 41 Drawing Sheets

(56) References Cited

U.S. PATENT DOCUMENTS

2016/0183245 A1* 6/2016 Zhang .................. H04W 68/00
370/329
2017/0195991 A1* 7/2017 Ahn .................... H04L 47/2416

OTHER PUBLICATIONS

R2-1700890; 3GPP TSG-RAN WG2 #97; Athens, Greece, Feb. 13-17, 2017; Agenda Item: 10.2.2.2; Source: Ericsson; Title: Details of solution B for small data transmission in RRC_INACTIVE; Document for: Discussion, Decision.

R2-1700891; 3GPP TSG-RAN WG2 #97; Athens, Greece, Feb. 13-17, 2017; Agenda Item: 10.2.2.2; Source: Ericsson; Title: Responding the questions on small data Tx in RRC_INACTIVE; Document for: Discussion, Decision.

R2-1700894; 3GPP TSG-RAN WG2 #97; Athens, Greece, Feb. 13-17, 2017; Agenda Item: 10.2.2.6; Source: Ericsson; Title: RAN area updating due to mobility in RRC_INACTIVE; Document for: Discussion.

R2-1700895; 3GPP TSG-RAN WG2 #97; Athens, Greece, Feb. 13-17, 2017; Agenda Item: 10.2.2.6; Source: Ericsson; Title: Periodic RAN area updates in RRC_INACTIVE; Document for: Discussion, Decision.

R2-1700963; 3GPP TSG-RAN2#97; Athens, Greece, Feb. 13-17, 2017; Agenda Item: 10.2.2.2; Source: OPPO; Title: Issues on Data transmission in INACTIVE State; Document for: Discussion and Decision.

R2-1700975; 3GPP TSG-RAN WG2 Meeting #97; Athens, Greece, Feb. 13-17, 2017; Revision of R2-1700207; Source: CATT; Title: DL Data Transmission in Response to UL Activity in RRC_INACTIVE; Agenda Item: 10.2.2.2; Document for: Discussion and Decision.

R2-1701066; 3GPP TSG-RAN WG2 NR #97; Athens, Greece, Feb. 13-17, 2017; Agenda item: 10.2.2.3; Source: Nokia, Alcatel-Lucent Shanghai Bell; Title: INACTIVE mode procedures in NR; WID/SID: FS_ NR_newRAT—Release 14; Document for: Discussion and Decision.

R2-1701125; 3GPP TSG-RAN WG2 #97; Athens, Greece, Feb. 13-17, 2017; Agenda Item: 10.2.2.2; Source: Huawei, Ericsson; Title: Summary of email discussion [NR-AH1#13][NR] UL data in INACTIVE; Document for: Discussion and Decision.

R2-1701126; 3GPP TSG-RAN WG2 #97; Athens, Greece, Feb. 13-17, 2017; Agenda Item: 10.2.2.2; Source: Huawei, HiSilicon; Title: Direct Data transmission in inactive state, option A; Document for: Discussion and Decision.

R2-1701127; 3GPP TSG-RAN WG2 #97; Athens, Greece, Feb. 13-17, 2017; Agenda Item: 10.2.2.2; Source: Huawei, HiSilicon; Title: Data transmission in inactive state, option A vs. option B; Document for: Discussion and Decision.

R2-1701190; 3GPP TSG-RAN WG2 #97; Athens, Greece Feb. 13-17, 2017; Agenda Item: 10.2.2.2; Source: InterDigital Communications; Title: Comparison of UL Data Transmission Solutions for Inactive State; Document for: Discussion, Decision.

R2-1701191; 3GPP TSG-RAN WG2 #97; Athens, Greece Feb. 13-17, 2017; Agenda Item: 10.2.2.2; Source: InterDigital Communications; Title: UL and DL Data Transmission Procedures in Inactive State; Document for: Discussion, Decision.

R2-1701196; 3GPP TSG-RAN WG2 #97; Athens, Greece Feb. 13-17, 2017; Update of R2-1700518; Agenda Item: 10.2.2.3; Source: InterDigital Communications; Title: RAN Paging in the INACTIVE State; Document for: Discussion, Decision.

R2-1701396; 3GPP TSG-RAN WG2 Meeting #97; Athens, Greece, Feb. 13-17, 2017; Agenda Item: 10.2.2.2 :Inactive state—UL/DL data); Source: Fujitsu; Title: Trigger on INACTIVE or CONNECTED; Document for: Decision.

R2-1701498; 3GPP TSG RAN WG2 Meeting #97; Athens, Greece, Feb. 13-17, 2017; Agenda Item: 10.2.2.2; Source: Sony; Title: DL data transmission in RRC_INACTIVE; Document for: Discussion.

R2-1701527; 3GPP TSG-RAN WG2 Feb. 2017 RAN2#97; Athens, Greece, Feb. 13-17, 2017; Agenda item: 10.2.2.2; Source: Samsung; Title: Data transfer in INACTIVE catering different service requirements; Document for: Discussion & Decision.

R2-1701528; 3GPP TSG-RAN WG2 Feb. 2017 RAN2#97; Athens, Greece, Feb. 13-17, 2017; Agenda item: 10.2.2.2; Source: Samsung; Title: DRB and QoS management in INACTIVE; Document for: Discussion & Decision.

R2-1701529; 3GPP TSG-RAN WG2 #97; Athens, Greece, Feb. 13-17, 2017; resubmission of R2-1700366; Agenda item: 10.2.2.2; Source: Samsung; Title: Data transfer in inactive state based on 4-step RACH procedures; Document for: Discussion & Decision.

R2-1701531; 3GPP TSG-RAN WG2 #97; Athens, Greece, Feb. 13-17, 2017; resubmission of R2-1700370; Agenda item: 10.2.2.3; Source: Samsung; Title: UE energy consumption analysis for data transfer in inactive state; Document for: Discussion & Decision.

R2-1701555; 3GPP TSG-RAN WG2 #97; Athens, Greece, Feb. 13-17, 2017; Agenda item: 10.2.2.2; Source: Samsung; Title: Discussion on Solution-A and Solution-B for UL data transmission; Document for: Discussion.

R2-1701592; 3GPP TSG-RAN WG2 Meeting #97; Athens, Greece, Feb. 13-17, 2017; Agenda item: 9.2.2.1; Source: Nokia, Alcatel-Lucent Shanghai Bell; Title: Paging in RRC_INACTIVE; Document for: Discussion and Decision.

R2-1701628; 3GPP TSG-RAN WG2 #97; Athens, Greece, Feb. 13-17, 2017; Resubmission of R2-1700449; Agenda Item: 10.2.2.2; Source: LG Electronics Inc.; Title: Handling of radio bearers and security for data transmission in RRC_INACTIVE; Document for: Discussion and Decision.

R2-1701629; 3GPP TSG-RAN WG2 #97; Athens, Greece, Feb. 13-17, 2017; Resubmission of R2-1700440; Agenda Item: 10.2.2.2; Source: LG Electronics Inc.; Title: Notification triggered DL data transmission in RRC_INACTIVE; Document for: Discussion and Decision.

R2-1701725; 3GPP TSG RAN WG2#97; Athens, Greece, Feb. 13-17, 2017; Agenda item: 10.3.1.2; Source: Intel Corporation; Title: Further considerations on cell reselection; Document for: Discussion and decision.

R2-1701732; 3GPP TSG-RAN WG2 Meeting #97; Athens, Greece, Feb. 13-17, 2017; Agenda item: 10.2.2.2; Source: Mediatek Inc; Title: Procedure for Data transmission in RRC_Inactive; Document for: Discussion and Decision.

R2-1701742; 3GPP TSG RAN WG2 Meeting # 97; Athens, Greece, Feb. 13-17, 2017; Agenda item: 10.2.23; Source: Intel Corporation; Title: Paging in INACTIVE; Document for: Discussion and decision.

R2-1701745; 3GPP TSG RAN WG2 NR 97; Athens, Greece, Feb. 13-17, 2017; Agenda item: 10.2.2.2; Source: Intel Corporation; Title: Data transmission mechanism for a UE in INACTIVE; Document for: Discussion and decision.

R2-1701792; 3GPP TSG-RAN WG2 #97; Athens, Greece, Feb. 13-17, 2017; Agenda Item: 10.2.2.2; Source: Huawei, HiSilicon; Title: DL data transmission in RRC_INACTIVE; Document for: Discussion and Decision.

R2-1701793; 3GPP TSG-RAN WG2 Meeting #97; Athens, Greece, Feb. 13-17, 2017; Revision of R2-1700186; Agenda item: 10.2.2.3; Source: Huawei, HiSilicon; Title: Discussion on LAU and RNA Update for inactive state; Document for: Discussion and Decision.

R2-1701824; 3GPP TSG-RAN WG2 Meeting #97; Athens, Greece, Feb. 13-17, 2017; Agenda item: 10.2.2.3; Source: LG Electronics Inc.; Title: Paging response to CN paging in RRC INACTIVE; Document for: Discussion and Decision.

R2-1701919; 3GPP TSG-RAN WG2 Meeting #97; Athens, Greece, Feb. 13-17, 2017; Agenda item: 10.2.2.3; Source: CMCC; Title: Unified Paging for NR; Document for: Discussion and decision.

R2-1701928; 3GPP TSG-RAN WG2 #97; Athens, Greece, Feb. 13-17, 2017; Agenda item: 10.2.2.2; Source: ZTE, ZTE Microelectronics; Title: Consideration on context maintenance; Document for: Discussion and Approval.

R2-1701929; 3GPP TSG-RAN WG2 #97; Athens, Greece, Feb. 13-17, 2017; Agenda item: 10.2.2.2; Source: ZTE, ZTE Microelectronics; Title: Consideration on DL Data Transmission in RRC_INACTIVE State; Document for: Discussion and Approval.

(56) References Cited

OTHER PUBLICATIONS

R2-1701930; 3GPP TSG-RAN WG2 #97; Athens, Greece, Feb. 13-17, 2017; Agenda item: 10.2.2.2; Source: ZTE, ZTE Microelectronics; Title: RRC signaling issue of solution B; Document for: Discussion and Approval.

R2-1701931; 3GPP TSG-RAN WG2 #97; Athens, Greece, Feb. 13-17, 2017; Source: ZTE; Title: Discussion on full solution A; Agenda Item: 10.2.2.2; Document for: Discussion and Decision.

R2-1701932; 3GPP TSG-RAN WG2 #97; Athens, Greece, Feb. 13-17, 2017; Resubmit of R2-1700360; Agenda item: 10.2.2.2; Source: ZTE, ZTE Microelectronics; Title: Quantitative analysis on UL data transmission in inactive state; Document for: Discussion and Approval.

R2-1702058; 3GPP TSG-RAN WG2 #97; Athens, Greece, Feb. 13-17, 2017; Agenda Item: 10.2.2.2; Source: Huawei, HiSilicon; Title: Data transmission in inactive state, option A vs. option B; Document for: Discussion and Decision.

R2-1702339; 3GPP TSG-RAN WG2 #97; Athens, Greece, Feb. 13-17, 2017; Source: Ericsson; Title: DRAFT TP for small UL data transmission in RRC_INACTIVE; Document for: Discussion, Decision.

R2-17XXXX; 3GPP TSG-RAN WG2 NR#97; Athens, Greece, Feb. 13-17, 2017; Resubmission of R2-1700295; Agenda item: 10.2.2.2; Source: Samsung; Title: Direct Downlink Data Transmission for Inactive State; Document for: Discussion.

3GPP TS 36.300 V14.1.0 (Dec. 2016); 3rd Generation Partnership Project; Technical Specification Group Radio Access Network; Evolved Universal Terrestrial Radio Access (E-UTRA) and Evolved Universal Terrestrial Radio Access Vetwork (E-UTRAN);Overall description; Stage 2; (Release 14).

3GPP TS 36.331 V14.1.0 (Dec. 2016); 3rd Generation Partnership Project; Technical Specification Group Radio Access Network; Evolved Universal Terrestrial Radio Access (E-UTRA); Radio Resource Control (RRC); Protocol specification (Release 14).

\* cited by examiner

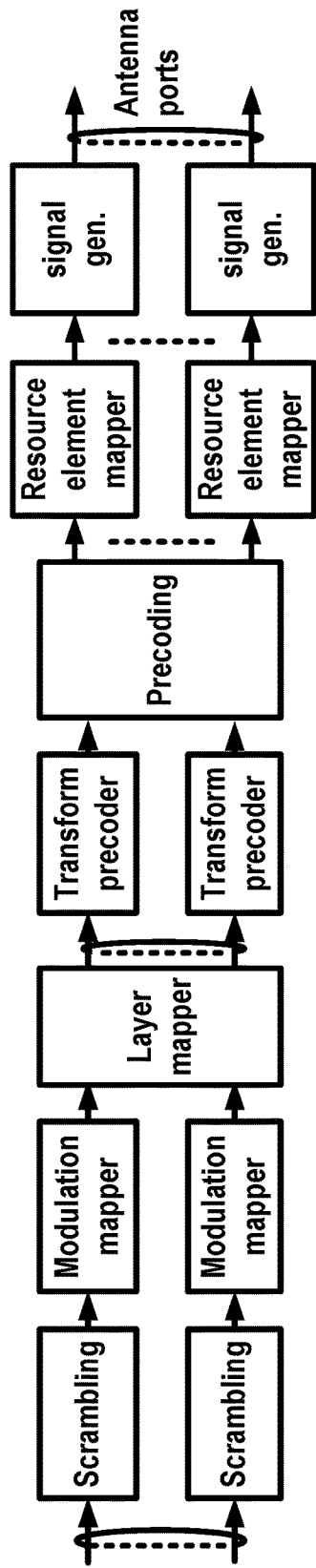
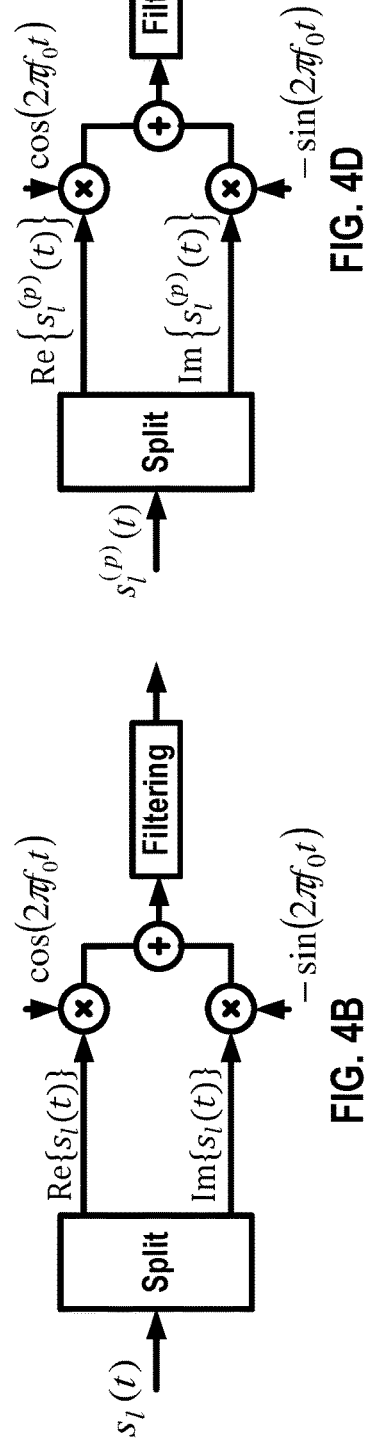
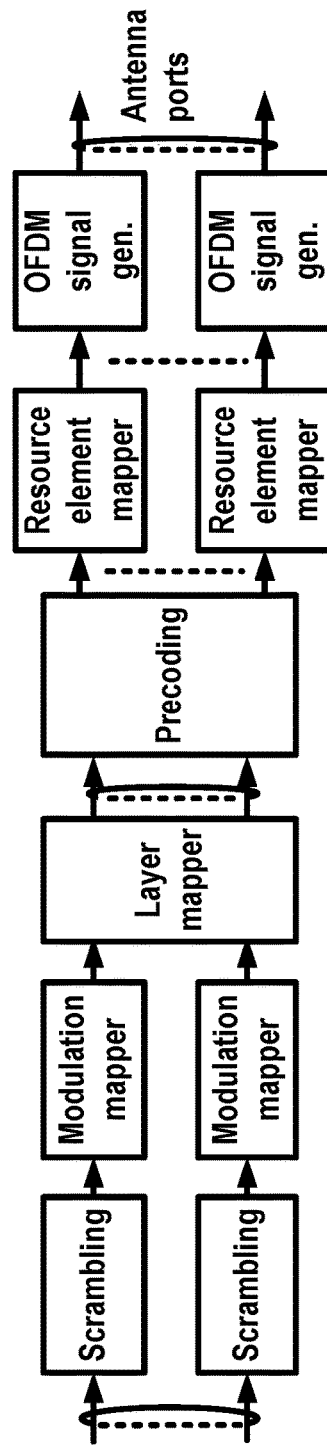
FIG. 4A
FIG. 4B
FIG. 4C
FIG. 4D

Receive, by a 3rd base station from a 2nd core network entity, 1st paging message for a wireless device, where the 1st paging message comprises a 2nd identifier of the wireless device
2810

Transmit, by the 3rd base station and in response to receiving the 1st paging message, a 2nd paging message for the wireless device via a radio interface
2820

Receive, by the 3rd base station from the wireless device and in response to the 1st paging message, a random access preamble for an RRC connection
2830

Transmit, by the 3rd base station to the 2nd core network entity and in response to the RRC connection, a 3rd message comprising a tunnel endpoint identifier of the 3rd base station
2840

Receive, by the 3rd base station from a 1st base station, packet(s) based on the tunnel endpoint identifier
2850

FIG. 28

Receive, by a 1st base station from a 2nd base station, first packet(s) associated with a wireless device
3310

Receive, by the 1st base station from a core network entity, 2nd packet(s) for the wireless device when the wireless device is in an RRC inactive state
3320

Transmit, by the 1st base station, a 1st RAN paging message to a 3rd base station of a RAN area associated with the wireless device and in response to a 1st time duration being larger than a 1st time value, where the 1st time duration comprises a time duration between the receiving of the first packet(s) and the receiving of the second packet(s)
3330

Transmit, by the 1st base station, a 2nd RAN paging message to the 2nd base station regardless of the 1st time duration being smaller or larger than the 1st time value
3340

Transmit, by the 1st base station, the 2nd packet(s) to one of the 2nd base station or the 3rd base station based on a response received for one of the 1st RAN paging message or the 2nd RAN paging message
3350

FIG. 33

```
┌─────────────────────────────────────────────────────────────┐
│ Receive, by a 1st base station from a wireless device, 1st  │
│ packet(s) via a 1st cell of the 1st base station            │
│                          3510                                │
└─────────────────────────────────────────────────────────────┘
                              ↓
┌─────────────────────────────────────────────────────────────┐
│ Receive, by the 1st base station from a core network        │
│ entity, 2nd packet(s) for the wireless device when the      │
│ wireless device is in a radio resource control inactive     │
│ state                                                        │
│                          3520                                │
└─────────────────────────────────────────────────────────────┘
                              ↓
┌─────────────────────────────────────────────────────────────┐
│ Transmit, by the 1st base station, a 1st RAN paging         │
│ message to a 2nd base station of a RAN area associated      │
│ with the wireless device and in response to a 1st time      │
│ duration being larger than a 1st time value, where the 1st  │
│ time duration comprises a time duration between the         │
│ receiving of the 1st packet(s) and the receiving of the     │
│ 2nd packet(s)                                                │
│                          3530                                │
└─────────────────────────────────────────────────────────────┘
                              ↓
┌─────────────────────────────────────────────────────────────┐
│ Transmit, by the 1st base station, a 2nd RAN paging         │
│ message via 1nd cell(s) of the RAN area regardless of the   │
│ 1st time duration being smaller or larger than the 1st      │
│ time value, where the 2nd cell(s) comprise the 1st cell     │
│                          3540                                │
└─────────────────────────────────────────────────────────────┘
                              ↓
┌─────────────────────────────────────────────────────────────┐
│ Transmit, by the 1st base station, the 2nd packet(s) to the │
│ wireless device via one of the 2nd cell(s) or the 2nd base  │
│ station based on a response received for one of the 1st     │
│ RAN paging message or the 2nd RAN paging message            │
│                          3550                                │
└─────────────────────────────────────────────────────────────┘
```

FIG. 35

```
┌─────────────────────────────────────────────────────┐
│  Receive, from a base station, 1st message(s) comprising │
│  configuration parameters of at least one of: logical channel(s); or │
│                      radio bearer(s)                │
│                          3610                        │
└─────────────────────────────────────────────────────┘
                            │
                            ▼
┌─────────────────────────────────────────────────────┐
│  Receive, from the base station, a 2nd message indicating an RRC │
│    state transition of the wireless device from an RRC connected │
│                 state to an RRC inactive state      │
│                          3620                        │
└─────────────────────────────────────────────────────┘
                            │
                            ▼
┌─────────────────────────────────────────────────────┐
│   Select a 1st cell based on the configuration parameters, the │
│       wireless device being in the RRC inactive state │
│                          3630                        │
└─────────────────────────────────────────────────────┘
                            │
                            ▼
┌─────────────────────────────────────────────────────┐
│  Transmit, to the base station, a random access preamble via the │
│                          1st cell                    │
│                          3640                        │
└─────────────────────────────────────────────────────┘
```

FIG. 36

Transmit, by a base station to a wireless device, 1st message(s) comprising configuration parameters of at least one of: logical channel(s); or radio bearer(s)
3710

Transmit, by the base station to the wireless device, a 2nd message indicating an RRC state transition of the wireless device from an RRC connected state to an RRC inactive state
3720

Receive, by the base station from the wireless device, a random access preamble via the 1st cell selected by the wireless device based on the configuration parameters, the wireless device being in the RRC inactive state
3730

FIG. 37

Transmit, by a 1st base station to a wireless device, 1st message(s) indicating an RRC state transition of the wireless device from an RRC connected state to an RRC inactive state, where the 1st message(s) comprises a parameter indicating a value associated with a wireless device radio access network (RAN) notification area update timer for a periodic RAN notification area update procedure
4010

Receive, by the 1st base station from the wireless device, a 2nd message indicating a RAN notification area update by the wireless device in response to expiry of the wireless device RAN notification area update timer
4020

Transmit, by the 1st base station to a core network entity and in response to not receiving a RAN notification area update within a time duration, a 3rd message indicating a wireless device context release request for the wireless device, where the time period is longer than the value associated with the wireless device RAN notification area update timer
4030

FIG. 40

RAN PAGING TRANSMISSION BY A BASE STATION

CROSS-REFERENCE TO RELATED APPLICATIONS

This application is a continuation of U.S. patent application Ser. No. 15/925,573, filed Mar. 19, 2018, which claims the benefit of U.S. Provisional Application No. 62/472,997, filed Mar. 17, 2017, which is hereby incorporated by reference in its entirety.

BRIEF DESCRIPTION OF THE SEVERAL VIEWS OF THE DRAWINGS

Examples of several of the various embodiments of the present disclosure are described herein with reference to the drawings.

FIG. 4A, FIG. 4B, FIG. 4C and FIG. 4D are example diagrams for uplink and downlink signal transmission as per an aspect of an embodiment of the present disclosure.

FIG. 28 is an example diagram as per an aspect of an embodiment of the present disclosure.

FIG. 33 is an example flow diagram as per an aspect of an embodiment of the present disclosure.

FIG. 35 is an example flow diagram as per an aspect of an embodiment of the present disclosure.

FIG. 36 is an example diagram as per an aspect of an embodiment of the present disclosure.

FIG. 37 is an example diagram as per an aspect of an embodiment of the present disclosure.

FIG. 40 is an example flow diagram as per an aspect of an embodiment of the present disclosure.

DETAILED DESCRIPTION OF EMBODIMENTS

Figure 1:
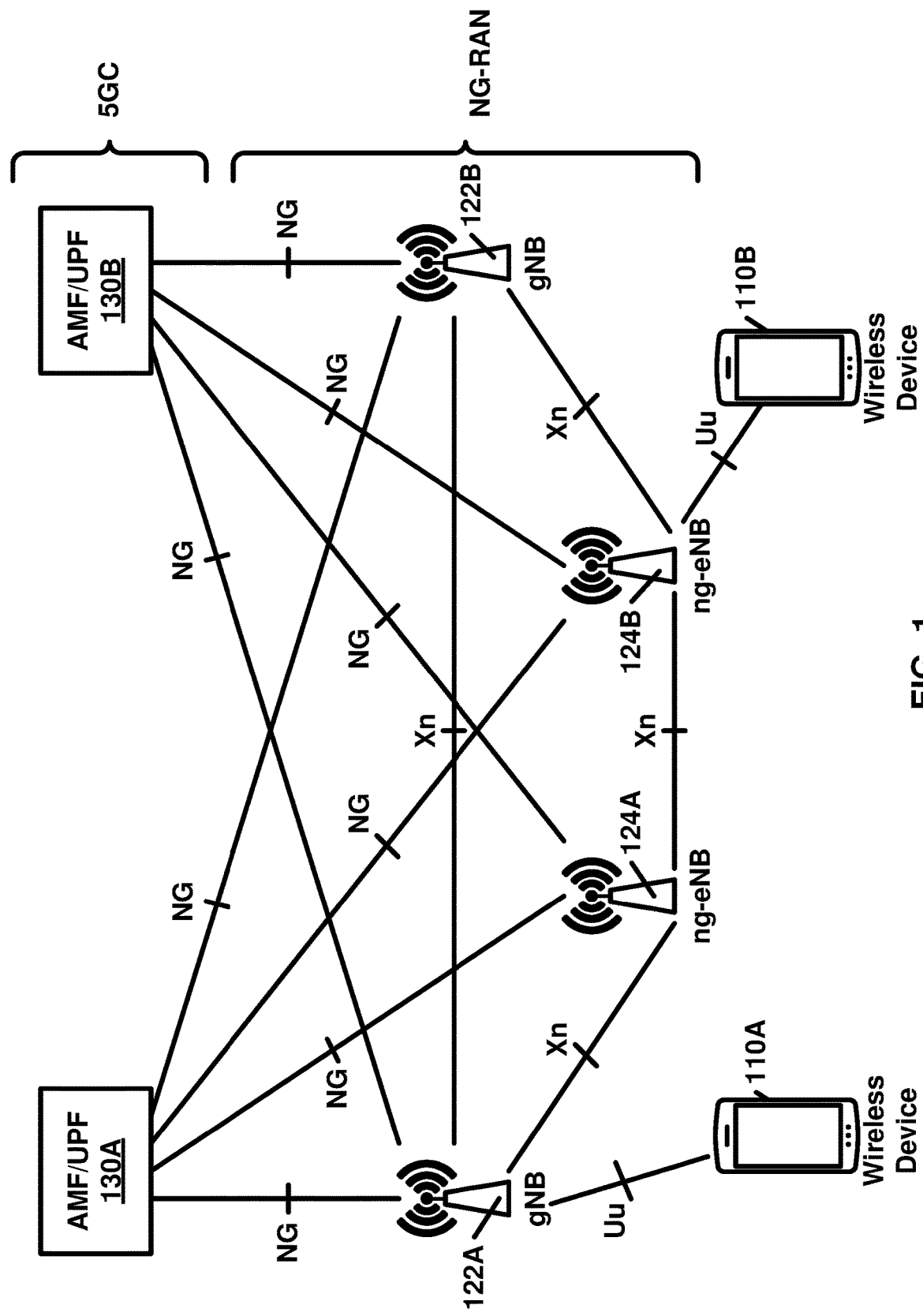
FIG. 1 is a diagram of an example RAN architecture as per an aspect of an embodiment of the present disclosure.

Example embodiments of the present disclosure enable operation of communication network(s). Embodiments of the technology disclosed herein may be employed in the technical field of multicarrier communication systems. More particularly, the embodiments of the technology disclosed herein may relate to radio access network(s) in multicarrier communication systems.

The following Acronyms are used throughout the present disclosure:
3GPP 3rd Generation Partnership Project
5GC 5G Core Network
ACK Acknowledgement
AMF Access and Mobility Management Function
ARQ Automatic Repeat Request
AS Access Stratum
ASIC Application-Specific Integrated Circuit BA Bandwidth Adaptation
BCCH Broadcast Control Channel
BCH Broadcast Channel
BPSK Binary Phase Shift Keying
BWP Bandwidth Part
CA Carrier Aggregation
CC Component Carrier
CCCH Common Control CHannel
CDMA Code Division Multiple Access
CN Core Network
CP Cyclic Prefix
CP-OFDM Cyclic Prefix-Orthogonal Frequency Division Multiplex
C-RNTI Cell-Radio Network Temporary Identifier
CS Configured Scheduling
CSI Channel State Information
CSI-RS Channel State Information-Reference Signal
CQI Channel Quality Indicator
CSS Common Search Space
CU Central Unit
DC Dual Connectivity
DCCH Dedicated Control CHannel
DCI Downlink Control Information
DL Downlink
DL-SCH Downlink Shared CHannel
DM-RS DeModulation Reference Signal
DRB Data Radio Bearer
DRX Discontinuous Reception
DTCH Dedicated Traffic CHannel
DU Distributed Unit
EPC Evolved Packet Core
E-UTRA Evolved UMTS Terrestrial Radio Access
E-UTRAN Evolved-Universal Terrestrial Radio Access Network
FDD Frequency Division Duplex
FPGA Field Programmable Gate Arrays
F1-C F1-Control plane
F1-U F1-User plane
gNB next generation Node B
HARQ Hybrid Automatic Repeat reQuest
HDL Hardware Description Languages
IE Information Element
IP Internet Protocol
LCID Logical Channel IDentifier
LTE Long Term Evolution
MAC Media Access Control
MCG Master Cell Group
MCS Modulation and Coding Scheme
MeNB Master evolved Node B
MIB Master Information Block
MME Mobility Management Entity
MN Master Node
NACK Negative Acknowledgement
NAS Non-Access Stratum
NG CP Next Generation Control Plane
NGC Next Generation Core
NG-C NG-Control plane
ng-eNB next generation evolved Node B
NG-U NG-User plane
NR New Radio
NR MAC New Radio MAC
NR PDCP New Radio PDCP
NR PHY New Radio PHYsical
NR RLC New Radio RLC
NR RRC New Radio RRC
NSSAI Network Slice Selection Assistance Information
O&M Operation and Maintenance
OFDM Orthogonal Frequency Division Multiplexing
PBCH Physical Broadcast CHannel
PCC Primary Component Carrier
PCCH Paging Control CHannel
PCell Primary Cell
PCH Paging CHannel
PDCCH Physical Downlink Control CHannel
PDCP Packet Data Convergence Protocol
PDSCH Physical Downlink Shared CHannel
PDU Protocol Data Unit
PHICH Physical HARQ Indicator CHannel
PHY PHYsical
PLMN Public Land Mobile Network
PMI Precoding Matrix Indicator
PRACH Physical Random Access CHannel
PRB Physical Resource Block
PSCell Primary Secondary Cell
PSS Primary Synchronization Signal
pTAG primary Timing Advance Group
PT-RS Phase Tracking Reference Signal
PUCCH Physical Uplink Control CHannel
PUSCH Physical Uplink Shared CHannel
QAM Quadrature Amplitude Modulation
QFI Quality of Service Indicator
QoS Quality of Service
QPSK Quadrature Phase Shift Keying
RA Random Access
RACH Random Access CHannel
RAN Radio Access Network
RAT Radio Access Technology
RA-RNTI Random Access-Radio Network Temporary Identifier
RB Resource Blocks
RBG Resource Block Groups
RI Rank Indicator
RLC Radio Link Control
RRC Radio Resource Control
RS Reference Signal
RSRP Reference Signal Received Power
SCC Secondary Component Carrier
SCell Secondary Cell
SCG Secondary Cell Group
SC-FDMA Single Carrier-Frequency Division Multiple Access
SDAP Service Data Adaptation Protocol
SDU Service Data Unit
SeNB Secondary evolved Node B
SFN System Frame Number
S-GW Serving GateWay
SI System Information
SIB System Information Block
SMF Session Management Function
SN Secondary Node
SpCell Special Cell
SRB Signaling Radio Bearer
SRS Sounding Reference Signal
SS Synchronization Signal
SSS Secondary Synchronization Signal
sTAG secondary Timing Advance Group
TA Timing Advance
TAG Timing Advance Group
TAI Tracking Area Identifier
TAT Time Alignment Timer
TB Transport Block
TC-RNTI Temporary Cell-Radio Network Temporary Identifier
TDD Time Division Duplex TDMA Time Division Multiple Access
TTI Transmission Time Interval
UCI Uplink Control Information
UE User Equipment
UL Uplink
UL-SCH Uplink Shared CHannel
UPF User Plane Function
UPGW User Plane Gateway
VHDL VHSIC Hardware Description Language
Xn-C Xn-Control plane
Xn-U Xn-User plane Example embodiments of the disclosure may be implemented using various physical layer modulation and transmission mechanisms. Example transmission mechanisms may include, but are not limited to: Code Division Multiple Access (CDMA), Orthogonal Frequency Division Multiple Access (OFDMA), Time Division Multiple Access (TDMA), Wavelet technologies, and/or the like. Hybrid transmission mechanisms such as TDMA/CDMA, and OFDM/CDMA may also be employed. Various modulation schemes may be applied for signal transmission in the physical layer. Examples of modulation schemes include, but are not limited to: phase, amplitude, code, a combination of these, and/or the like. An example radio transmission method may implement Quadrature Amplitude Modulation (QAM) using Binary Phase Shift Keying (BPSK), Quadrature Phase Shift Keying (QPSK), 16-QAM, 64-QAM, 256-QAM, and/or the like. Physical radio transmission may be enhanced by dynamically or semi-dynamically changing the modulation and coding scheme depending on transmission requirements and radio conditions.

FIG. 1 is an example Radio Access Network (RAN) architecture as per an aspect of an embodiment of the present disclosure. As illustrated in this example, a RAN node may be a next generation Node B (gNB) (e.g. 120A, 120B) providing New Radio (NR) user plane and control plane protocol terminations towards a first wireless device (e.g. 110A). In an example, a RAN node may be a next generation evolved Node B (ng-eNB) (e.g. 124A, 124B), providing Evolved UMTS Terrestrial Radio Access (E-UTRA) user plane and control plane protocol terminations towards a second wireless device (e.g. 110B). The first wireless device may communicate with a gNB over a Uu interface. The second wireless device may communicate with a ng-eNB over a Uu interface. In this disclosure, wireless device 110A and 110B are structurally similar to wireless device 110. Base stations 120A and/or 120B may be structurally similarly to base station 120. Base station 120 may comprise at least one of a gNB (e.g. 122A and/or 122B), ng-eNB (e.g. 124A and/or 124B), and or the like.

A gNB or an ng-eNB may host functions such as: radio resource management and scheduling, IP header compression, encryption and integrity protection of data, selection of Access and Mobility Management Function (AMF) at User Equipment (UE) attachment, routing of user plane and control plane data, connection setup and release, scheduling and transmission of paging messages (originated from the AMF), scheduling and transmission of system broadcast information (originated from the AMF or Operation and Maintenance (O&M)), measurement and measurement reporting configuration, transport level packet marking in the uplink, session management, support of network slicing, Quality of Service (QoS) flow management and mapping to data radio bearers, support of UEs in RRC_INACTIVE state, distribution function for Non-Access Stratum (NAS) messages, RAN sharing, and dual connectivity or tight interworking between NR and E-UTRA.

In an example, one or more gNBs and/or one or more ng-eNBs may be interconnected with each other by means of Xn interface. A gNB or an ng-eNB may be connected by means of NG interfaces to 5G Core Network (5GC). In an example, 5GC may comprise one or more AMF/User Plan Function (UPF) functions (e.g. 130A or 130B). A gNB or an ng-eNB may be connected to a UPF by means of an NG-User plane (NG-U) interface. The NG-U interface may provide delivery (e.g. non-guaranteed delivery) of user plane Protocol Data Units (PDUs) between a RAN node and the UPF. A gNB or an ng-eNB may be connected to an AMF by means of an NG-Control plane (NG-C) interface. The NG-C interface may provide, for example, NG interface management, UE context management, UE mobility management, transport of NAS messages, paging, PDU session management, configuration transfer and/or warning message transmission, combinations thereof, and/or the like.

In an example, a UPF may host functions such as anchor point for intra-/inter-Radio Access Technology (RAT) mobility (when applicable), external PDU session point of interconnect to data network, packet routing and forwarding, packet inspection and user plane part of policy rule enforcement, traffic usage reporting, uplink classifier to support routing traffic flows to a data network, branching point to support multi-homed PDU session, QoS handling for user plane, e.g. packet filtering, gating, Uplink (UL)/Downlink (DL) rate enforcement, uplink traffic verification (e.g. Service Data Flow (SDF) to QoS flow mapping), downlink packet buffering and/or downlink data notification triggering.

In an example, an AMF may host functions such as NAS signaling termination, NAS signaling security, Access Stratum (AS) security control, inter Core Network (CN) node signaling for mobility between $3^{rd}$ Generation Partnership Project (3GPP) access networks, idle mode UE reachability (e.g., control and execution of paging retransmission), registration area management, support of intra-system and inter-system mobility, access authentication, access authorization including check of roaming rights, mobility management control (subscription and policies), support of network slicing and/or Session Management Function (SMF) selection.

Figure 2A:
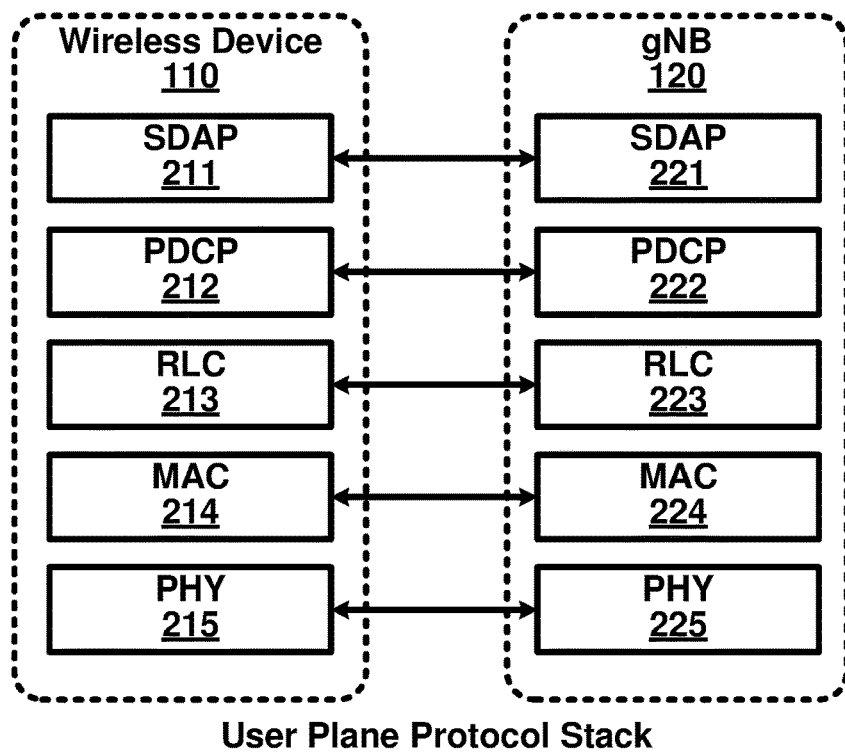
FIG. 2A is a diagram of an example user plane protocol stack as per an aspect of an embodiment of the present disclosure.

FIG. 2A is an example user plane protocol stack, where Service Data Adaptation Protocol (SDAP) (e.g. 211 and 221), Packet Data Convergence Protocol (PDCP) (e.g. 212 and 222), Radio Link Control (RLC) (e.g. 213 and 223) and Media Access Control (MAC) (e.g. 214 and 224) sublayers and Physical (PHY) (e.g. 215 and 225) layer may be terminated in wireless device (e.g. 110) and gNB (e.g. 120) on the network side. In an example, a PHY layer provides transport services to higher layers (e.g. MAC, RRC, etc.). In an example, services and functions of a MAC sublayer may comprise mapping between logical channels and transport channels, multiplexing/demultiplexing of MAC Service Data Units (SDUs) belonging to one or different logical channels into/from Transport Blocks (TBs) delivered to/from the PHY layer, scheduling information reporting, error correction through Hybrid Automatic Repeat request (HARQ) (e.g. one HARQ entity per carrier in case of Carrier Aggregation (CA)), priority handling between UEs by means of dynamic scheduling, priority handling between logical channels of one UE by means of logical channel prioritization, and/or padding. A MAC entity may support one or multiple numerologies and/or transmission timings. In an example, mapping restrictions in a logical channel prioritization may control which numerology and/or transmission timing a logical channel may use. In an example, an RLC sublayer may supports transparent mode (TM), unacknowledged mode (UM) and acknowledged mode (AM) transmission modes. The RLC configuration may be per logical channel with no dependency on numerologies and/or Transmission Time Interval (TTI) durations. In an example, Automatic Repeat Request (ARQ) may operate on any of the numerologies and/or TTI durations the logical channel is configured with. In an example, services and functions of the PDCP layer for the user plane may comprise sequence numbering, header compression and decompression, transfer of user data, reordering and duplicate detection, PDCP PDU routing (e.g. in case of split bearers), retransmission of PDCP SDUs, ciphering, deciphering and integrity protection, PDCP SDU discard, PDCP re-establishment and data recovery for RLC AM, and/or duplication of PDCP PDUs. In an example, services and functions of SDAP may comprise mapping between a QoS flow and a data radio bearer. In an example, services and functions of SDAP may comprise mapping Quality of Service Indicator (QFI) in DL and UL packets. In an example, a protocol entity of SDAP may be configured for an individual PDU session.

Figure 2B:
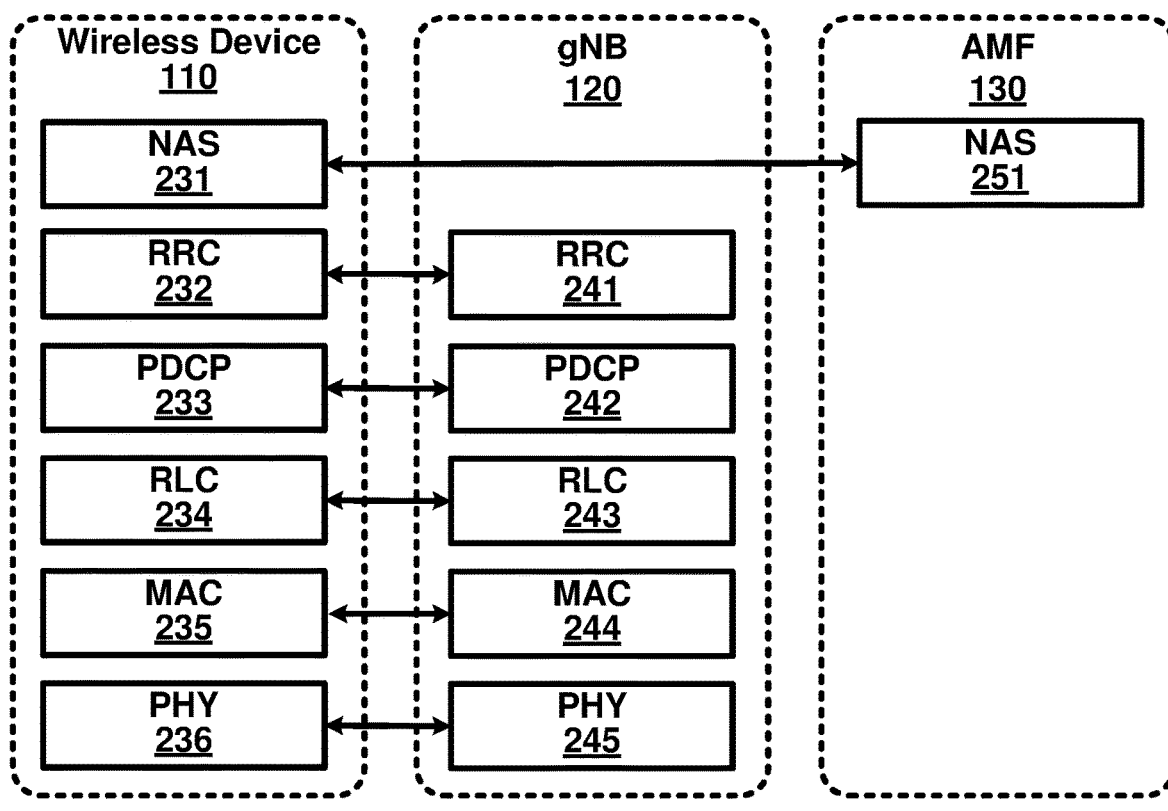
FIG. 2B is a diagram of an example control plane protocol stack as per an aspect of an embodiment of the present disclosure.

FIG. 2B is an example control plane protocol stack where PDCP (e.g. 233 and 242), RLC (e.g. 234 and 243) and MAC (e.g. 235 and 244) sublayers and PHY (e.g. 236 and 245) layer may be terminated in wireless device (e.g. 110) and gNB (e.g. 120) on a network side and perform service and functions described above. In an example, RRC (e.g. 232 and 241) may be terminated in a wireless device and a gNB on a network side. In an example, services and functions of RRC may comprise broadcast of system information related to AS and NAS, paging initiated by 5GC or RAN, establishment, maintenance and release of an RRC connection between the UE and RAN, security functions including key management, establishment, configuration, maintenance and release of Signaling Radio Bearers (SRBs) and Data Radio Bearers (DRBs), mobility functions, QoS management functions, UE measurement reporting and control of the reporting, detection of and recovery from radio link failure, and/or NAS message transfer to/from NAS from/to a UE. In an example, NAS control protocol (e.g. 231 and 251) may be terminated in the wireless device and AMF (e.g. 130) on a network side and may perform functions such as authentication, mobility management between a UE and a AMF for 3GPP access and non-3GPP access, and session management between a UE and a SMF for 3GPP access and non-3GPP access.

In an example, a base station may configure a plurality of logical channels for a wireless device. A logical channel in the plurality of logical channels may correspond to a radio bearer and the radio bearer may be associated with a QoS requirement. In an example, a base station may configure a logical channel to be mapped to one or more TTIs/numerologies in a plurality of TTIs/numerologies. The wireless device may receive a Downlink Control Information (DCI) via Physical Downlink Control CHannel (PDCCH) indicating an uplink grant. In an example, the uplink grant may be for a first TTI/numerology and may indicate uplink resources for transmission of a transport block. The base station may configure each logical channel in the plurality of logical channels with one or more parameters to be used by a logical channel prioritization procedure at the MAC layer of the wireless device. The one or more parameters may comprise priority, prioritized bit rate, etc. A logical channel in the plurality of logical channels may correspond to one or more buffers comprising data associated with the logical channel. The logical channel prioritization procedure may allocate the uplink resources to one or more first logical channels in the plurality of logical channels and/or one or more MAC Control Elements (CEs). The one or more first logical channels may be mapped to the first TTI/numerology. The MAC layer at the wireless device may multiplex one or more MAC CEs and/or one or more MAC SDUs (e.g., logical channel) in a MAC PDU (e.g., transport block). In an example, the MAC PDU may comprise a MAC header comprising a plurality of MAC sub-headers. A MAC sub-header in the plurality of MAC sub-headers may correspond to a MAC CE or a MAC SUD (logical channel) in the one or more MAC CEs and/or one or more MAC SDUs. In an example, a MAC CE or a logical channel may be configured with a Logical Channel IDentifier (LCID). In an example, LCID for a logical channel or a MAC CE may be fixed/pre-configured. In an example, LCID for a logical channel or MAC CE may be configured for the wireless device by the base station. The MAC sub-header corresponding to a MAC CE or a MAC SDU may comprise LCID associated with the MAC CE or the MAC SDU.

In an example, a base station may activate and/or deactivate and/or impact one or more processes (e.g., set values of one or more parameters of the one or more processes or start and/or stop one or more timers of the one or more processes) at the wireless device by employing one or more MAC commands. The one or more MAC commands may comprise one or more MAC control elements. In an example, the one or more processes may comprise activation and/or deactivation of PDCP packet duplication for one or more radio bearers. The base station may transmit a MAC CE comprising one or more fields, the values of the fields indicating activation and/or deactivation of PDCP duplication for the one or more radio bearers. In an example, the one or more processes may comprise Channel State Information (CSI) transmission of on one or more cells. The base station may transmit one or more MAC CEs indicating activation and/or deactivation of the CSI transmission on the one or more cells. In an example, the one or more processes may comprise activation or deactivation of one or more secondary cells. In an example, the base station may transmit a MA CE indicating activation or deactivation of one or more secondary cells. In an example, the base station may transmit one or more MAC CEs indicating starting and/or stopping one or more Discontinuous Reception (DRX) timers at the wireless device. In an example, the base station may transmit one or more MAC CEs indicating one or more timing advance values for one or more Timing Advance Groups (TAGs).

Figure 3:
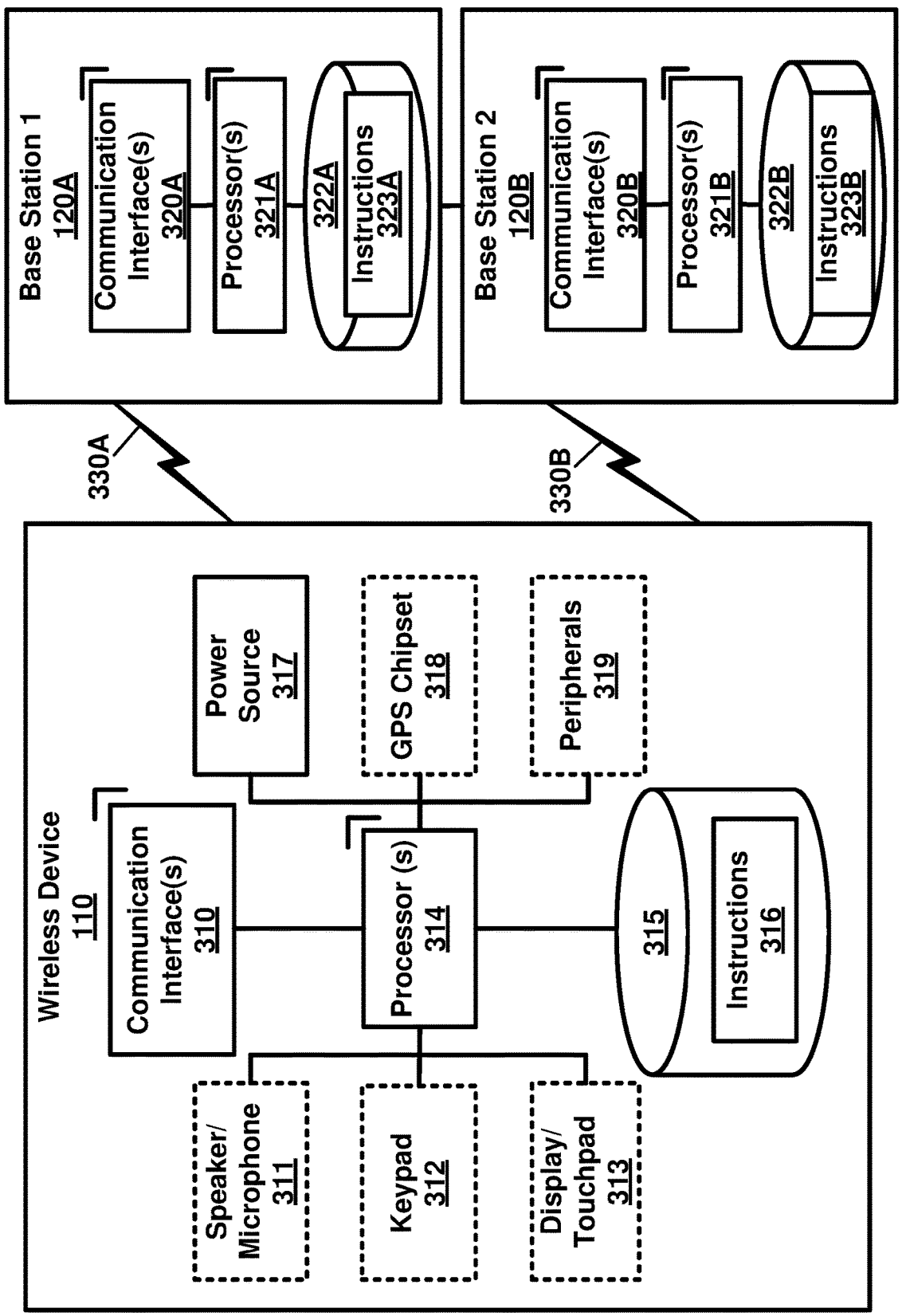
FIG. 3 is a diagram of an example wireless device and two base stations as per an aspect of an embodiment of the present disclosure.

FIG. 3 is a block diagram of base stations (base station 1, 120A, and base station 2, 120B) and a wireless device 110. A wireless device may be called an UE. A base station may be called a NB, eNB, gNB, and/or ng-eNB. In an example, a wireless device and/or a base station may act as a relay node. The base station 1, 120A, may comprise at least one communication interface 320A (e.g. a wireless modem, an antenna, a wired modem, and/or the like), at least one processor 321A, and at least one set of program code instructions 323A stored in non-transitory memory 322A and executable by the at least one processor 321A. The base station 2, 120B, may comprise at least one communication interface 320B, at least one processor 321B, and at least one set of program code instructions 323B stored in non-transitory memory 322B and executable by the at least one processor 321B.

A base station may comprise many sectors for example: 1, 2, 3, 4, or 6 sectors. A base station may comprise many cells, for example, ranging from 1 to 50 cells or more. A cell may be categorized, for example, as a primary cell or secondary cell. At Radio Resource Control (RRC) connection establishment/re-establishment/handover, one serving cell may provide the NAS (non-access stratum) mobility information (e.g. Tracking Area Identifier (TAI)). At RRC connection re-establishment/handover, one serving cell may provide the security input. This cell may be referred to as the Primary Cell (PCell). In the downlink, a carrier corresponding to the PCell may be a DL Primary Component Carrier (PCC), while in the uplink, a carrier may be an UL PCC. Depending on wireless device capabilities, Secondary Cells (SCells) may be configured to form together with a PCell a set of serving cells. In a downlink, a carrier corresponding to an SCell may be a downlink secondary component carrier (DL SCC), while in an uplink, a carrier may be an uplink secondary component carrier (UL SCC). An SCell may or may not have an uplink carrier.

A cell, comprising a downlink carrier and optionally an uplink carrier, may be assigned a physical cell ID and a cell index. A carrier (downlink or uplink) may belong to one cell. The cell ID or cell index may also identify the downlink carrier or uplink carrier of the cell (depending on the context it is used). In the disclosure, a cell ID may be equally referred to a carrier ID, and a cell index may be referred to a carrier index. In an implementation, a physical cell ID or a cell index may be assigned to a cell. A cell ID may be determined using a synchronization signal transmitted on a downlink carrier. A cell index may be determined using RRC messages. For example, when the disclosure refers to a first physical cell ID for a first downlink carrier, the disclosure may mean the first physical cell ID is for a cell comprising the first downlink carrier. The same concept may apply to, for example, carrier activation. When the disclosure indicates that a first carrier is activated, the specification may equally mean that a cell comprising the first carrier is activated.

A base station may transmit to a wireless device one or more messages (e.g. RRC messages) comprising a plurality of configuration parameters for one or more cells. One or more cells may comprise at least one primary cell and at least one secondary cell. In an example, an RRC message may be broadcasted or unicasted to the wireless device. In an example, configuration parameters may comprise common parameters and dedicated parameters.

Services and/or functions of an RRC sublayer may comprise at least one of: broadcast of system information related to AS and NAS; paging initiated by 5GC and/or NG-RAN; establishment, maintenance, and/or release of an RRC connection between a wireless device and NG-RAN, which may comprise at least one of addition, modification and release of carrier aggregation; or addition, modification, and/or release of dual connectivity in NR or between E-UTRA and NR. Services and/or functions of an RRC sublayer may further comprise at least one of security functions comprising key management; establishment, configuration, maintenance, and/or release of Signaling Radio Bearers (SRBs) and/or Data Radio Bearers (DRBs); mobility functions which may comprise at least one of a handover (e.g. intra NR mobility or inter-RAT mobility) and a context transfer; or a wireless device cell selection and reselection and control of cell selection and reselection. Services and/or functions of an RRC sublayer may further comprise at least one of QoS management functions; a wireless device measurement configuration/reporting; detection of and/or recovery from radio link failure; or NAS message transfer to/from a core network entity (e.g. AMF, Mobility Management Entity (MME)) from/to the wireless device.

An RRC sublayer may support an RRC_Idle state, an RRC_Inactive state and/or an RRC_Connected state for a wireless device. In an RRC_Idle state, a wireless device may perform at least one of: Public Land Mobile Network (PLMN) selection; receiving broadcasted system information; cell selection/re-selection; monitoring/receiving a paging for mobile terminated data initiated by 5GC; paging for mobile terminated data area managed by 5GC; or DRX for CN paging configured via NAS. In an RRC_Inactive state, a wireless device may perform at least one of: receiving broadcasted system information; cell selection/re-selection; monitoring/receiving a RAN/CN paging initiated by NG-RAN/5GC; RAN-based notification area (RNA) managed by NG-RAN; or DRX for RAN/CN paging configured by NG-RAN/NAS. In an RRC_Idle state of a wireless device, a base station (e.g. NG-RAN) may keep a 5GC-NG-RAN connection (both C/U-planes) for the wireless device; and/or store a UE AS context for the wireless device. In an RRC_Connected state of a wireless device, a base station (e.g. NG-RAN) may perform at least one of: establishment of 5GC-NG-RAN connection (both C/U-planes) for the wireless device; storing a UE AS context for the wireless device; transmit/receive of unicast data to/from the wireless device; or network-controlled mobility based on measurement results received from the wireless device. In an RRC_Connected state of a wireless device, an NG-RAN may know a cell that the wireless device belongs to.

System information (SI) may be divided into minimum SI and other SI. The minimum SI may be periodically broadcast. The minimum SI may comprise basic information required for initial access and information for acquiring any other SI broadcast periodically or provisioned on-demand, i.e. scheduling information. The other SI may either be broadcast, or be provisioned in a dedicated manner, either triggered by a network or upon request from a wireless device. A minimum SI may be transmitted via two different downlink channels using different messages (e.g. MasterInformationBlock and SystemInformationBlockType1). Another SI may be transmitted via SystemInformationBlockType2. For a wireless device in an RRC_Connected state, dedicated RRC signaling may be employed for the request and delivery of the other SI. For the wireless device in the RRC_Idle state and/or the RRC_Inactive state, the request may trigger a random-access procedure.

A wireless device may report its radio access capability information which may be static. A base station may request what capabilities for a wireless device to report based on band information. When allowed by a network, a temporary capability restriction request may be sent by the wireless device to signal the limited availability of some capabilities (e.g. due to hardware sharing, interference or overheating) to the base station. The base station may confirm or reject the request. The temporary capability restriction may be transparent to 5GC (e.g., static capabilities may be stored in 5GC).

When CA is configured, a wireless device may have an RRC connection with a network. At RRC connection establishment/re-establishment/handover procedure, one serving cell may provide NAS mobility information, and at RRC connection re-establishment/handover, one serving cell may provide a security input. This cell may be referred to as the PCell. Depending on the capabilities of the wireless device, SCells may be configured to form together with the PCell a set of serving cells. The configured set of serving cells for the wireless device may comprise one PCell and one or more SCells.

The reconfiguration, addition and removal of SCells may be performed by RRC. At intra-NR handover, RRC may also add, remove, or reconfigure SCells for usage with the target PCell. When adding a new SCell, dedicated RRC signaling may be employed to send all required system information of the SCell i.e. while in connected mode, wireless devices may not need to acquire broadcasted system information directly from the SCells.

The purpose of an RRC connection reconfiguration procedure may be to modify an RRC connection, (e.g. to establish, modify and/or release RBs, to perform handover, to setup, modify, and/or release measurements, to add, modify, and/or release SCells and cell groups). As part of the RRC connection reconfiguration procedure, NAS dedicated information may be transferred from the network to the wireless device. The RRCConnectionReconfiguration message may be a command to modify an RRC connection. It may convey information for measurement configuration, mobility control, radio resource configuration (e.g. RBs, MAC main configuration and physical channel configuration) comprising any associated dedicated NAS information and security configuration. If the received RRC Connection Reconfiguration message includes the sCellToReleaseList, the wireless device may perform an SCell release. If the received RRC Connection Reconfiguration message includes the sCellToAddModList, the wireless device may perform SCell additions or modification.

An RRC connection establishment (or reestablishment, resume) procedure may be to establish (or reestablish, resume) an RRC connection. an RRC connection establishment procedure may comprise SRB1 establishment. The RRC connection establishment procedure may be used to transfer the initial NAS dedicated information/message from a wireless device to E-UTRAN. The RRCConnectionReestablishment message may be used to re-establish SRB1.

A measurement report procedure may be to transfer measurement results from a wireless device to NG-RAN. The wireless device may initiate a measurement report procedure after successful security activation. A measurement report message may be employed to transmit measurement results.

The wireless device 110 may comprise at least one communication interface 310 (e.g. a wireless modem, an antenna, and/or the like), at least one processor 314, and at least one set of program code instructions 316 stored in non-transitory memory 315 and executable by the at least one processor 314. The wireless device 110 may further comprise at least one of at least one speaker/microphone 311, at least one keypad 312, at least one display/touchpad 313, at least one power source 317, at least one global positioning system (GPS) chipset 318, and other peripherals 319.

The processor 314 of the wireless device 110, the processor 321A of the base station 1 120A, and/or the processor 321B of the base station 2 120B may comprise at least one of a general-purpose processor, a digital signal processor (DSP), a controller, a microcontroller, an application specific integrated circuit (ASIC), a field programmable gate array (FPGA) and/or other programmable logic device, discrete gate and/or transistor logic, discrete hardware components, and the like. The processor 314 of the wireless device 110, the processor 321A in base station 1 120A, and/or the processor 321B in base station 2 120B may perform at least one of signal coding/processing, data processing, power control, input/output processing, and/or any other functionality that may enable the wireless device 110, the base station 1 120A and/or the base station 2 120B to operate in a wireless environment.

The processor 314 of the wireless device 110 may be connected to the speaker/microphone 311, the keypad 312, and/or the display/touchpad 313. The processor 314 may receive user input data from and/or provide user output data to the speaker/microphone 311, the keypad 312, and/or the display/touchpad 313. The processor 314 in the wireless device 110 may receive power from the power source 317 and/or may be configured to distribute the power to the other components in the wireless device 110. The power source 317 may comprise at least one of one or more dry cell batteries, solar cells, fuel cells, and the like. The processor 314 may be connected to the GPS chipset 318. The GPS chipset 318 may be configured to provide geographic location information of the wireless device 110.

The processor 314 of the wireless device 110 may further be connected to other peripherals 319, which may comprise one or more software and/or hardware modules that provide additional features and/or functionalities. For example, the peripherals 319 may comprise at least one of an accelerometer, a satellite transceiver, a digital camera, a universal serial bus (USB) port, a hands-free headset, a frequency modulated (FM) radio unit, a media player, an Internet browser, and the like.

The communication interface 320A of the base station 1, 120A, and/or the communication interface 320B of the base station 2, 120B, may be configured to communicate with the communication interface 310 of the wireless device 110 via a wireless link 330A and/or a wireless link 330B respectively. In an example, the communication interface 320A of the base station 1, 120A, may communicate with the communication interface 320B of the base station 2 and other RAN and core network nodes.

The wireless link 330A and/or the wireless link 330B may comprise at least one of a bi-directional link and/or a directional link. The communication interface 310 of the wireless device 110 may be configured to communicate with the communication interface 320A of the base station 1 120A and/or with the communication interface 320B of the base station 2 120B. The base station 1 120A and the wireless device 110 and/or the base station 2 120B and the wireless device 110 may be configured to send and receive transport blocks via the wireless link 330A and/or via the wireless link 330B, respectively. The wireless link 330A and/or the wireless link 330B may employ at least one frequency carrier. According to some of various aspects of embodiments, transceiver(s) may be employed. A transceiver may be a device that comprises both a transmitter and a receiver. Transceivers may be employed in devices such as wireless devices, base stations, relay nodes, and/or the like. Example embodiments for radio technology implemented in the communication interface 310, 320A, 320B and the wireless link 330A, 330B are illustrated in FIG. 4A, FIG. 4B, FIG. 4C, FIG. 4D, FIG. 6, FIG. 7A, FIG. 7B, FIG. 8, and associated text.

In an example, other nodes in a wireless network (e.g. AMF, UPF, SMF, etc.) may comprise one or more communication interfaces, one or more processors, and memory storing instructions.

A node (e.g. wireless device, base station, AMF, SMF, UPF, servers, switches, antennas, and/or the like) may comprise one or more processors, and memory storing instructions that when executed by the one or more processors causes the node to perform certain processes and/or functions. Example embodiments may enable operation of single-carrier and/or multi-carrier communications. Other example embodiments may comprise a non-transitory tangible computer readable media comprising instructions executable by one or more processors to cause operation of single-carrier and/or multi-carrier communications. Yet other example embodiments may comprise an article of manufacture that comprises a non-transitory tangible computer readable machine-accessible medium having instructions encoded thereon for enabling programmable hardware to cause a node to enable operation of single-carrier and/or multi-carrier communications. The node may include processors, memory, interfaces, and/or the like.

An interface may comprise at least one of a hardware interface, a firmware interface, a software interface, and/or a combination thereof. The hardware interface may comprise connectors, wires, electronic devices such as drivers, amplifiers, and/or the like. The software interface may comprise code stored in a memory device to implement protocol(s), protocol layers, communication drivers, device drivers, combinations thereof, and/or the like. The firmware interface may comprise a combination of embedded hardware and code stored in and/or in communication with a memory device to implement connections, electronic device operations, protocol(s), protocol layers, communication drivers, device drivers, hardware operations, combinations thereof, and/or the like.

FIG. 4A, FIG. 4B, FIG. 4C and FIG. 4D are example diagrams for uplink and downlink signal transmission as per an aspect of an embodiment of the present disclosure. FIG. 4A shows an example uplink transmitter for at least one physical channel A baseband signal representing a physical uplink shared channel may perform one or more functions. The one or more functions may comprise at least one of: scrambling; modulation of scrambled bits to generate complex-valued symbols; mapping of the complex-valued modulation symbols onto one or several transmission layers; transform precoding to generate complex-valued symbols; precoding of the complex-valued symbols; mapping of precoded complex-valued symbols to resource elements; generation of complex-valued time-domain Single Carrier-Frequency Division Multiple Access (SC-FDMA) or CP-OFDM signal for an antenna port; and/or the like. In an example, when transform precoding is enabled, a SC-FDMA signal for uplink transmission may be generated. In an example, when transform precoding is not enabled, an CP-OFDM signal for uplink transmission may be generated by FIG. 4A. These functions are illustrated as examples and it is anticipated that other mechanisms may be implemented in various embodiments.

An example structure for modulation and up-conversion to the carrier frequency of the complex-valued SC-FDMA or CP-OFDM baseband signal for an antenna port and/or the complex-valued Physical Random Access CHannel (PRACH) baseband signal is shown in FIG. 4B. Filtering may be employed prior to transmission.

An example structure for downlink transmissions is shown in FIG. 4C. The baseband signal representing a downlink physical channel may perform one or more functions. The one or more functions may comprise: scrambling of coded bits in a codeword to be transmitted on a physical channel; modulation of scrambled bits to generate complex-valued modulation symbols; mapping of the complex-valued modulation symbols onto one or several transmission layers; precoding of the complex-valued modulation symbols on a layer for transmission on the antenna ports; mapping of complex-valued modulation symbols for an antenna port to resource elements; generation of complex-valued time-domain OFDM signal for an antenna port; and/or the like. These functions are illustrated as examples and it is anticipated that other mechanisms may be implemented in various embodiments.

In an example, a gNB may transmit a first symbol and a second symbol on an antenna port, to a wireless device. The wireless device may infer the channel (e.g., fading gain, multipath delay, etc.) for conveying the second symbol on the antenna port, from the channel for conveying the first symbol on the antenna port. In an example, a first antenna port and a second antenna port may be quasi co-located if one or more large-scale properties of the channel over which a first symbol on the first antenna port is conveyed may be inferred from the channel over which a second symbol on a second antenna port is conveyed. The one or more large-scale properties may comprise at least one of: delay spread; doppler spread; doppler shift; average gain; average delay; and/or spatial Receiving (Rx) parameters.

An example modulation and up-conversion to the carrier frequency of the complex-valued OFDM baseband signal for an antenna port is shown in FIG. 4D. Filtering may be employed prior to transmission.

Figure 5A:
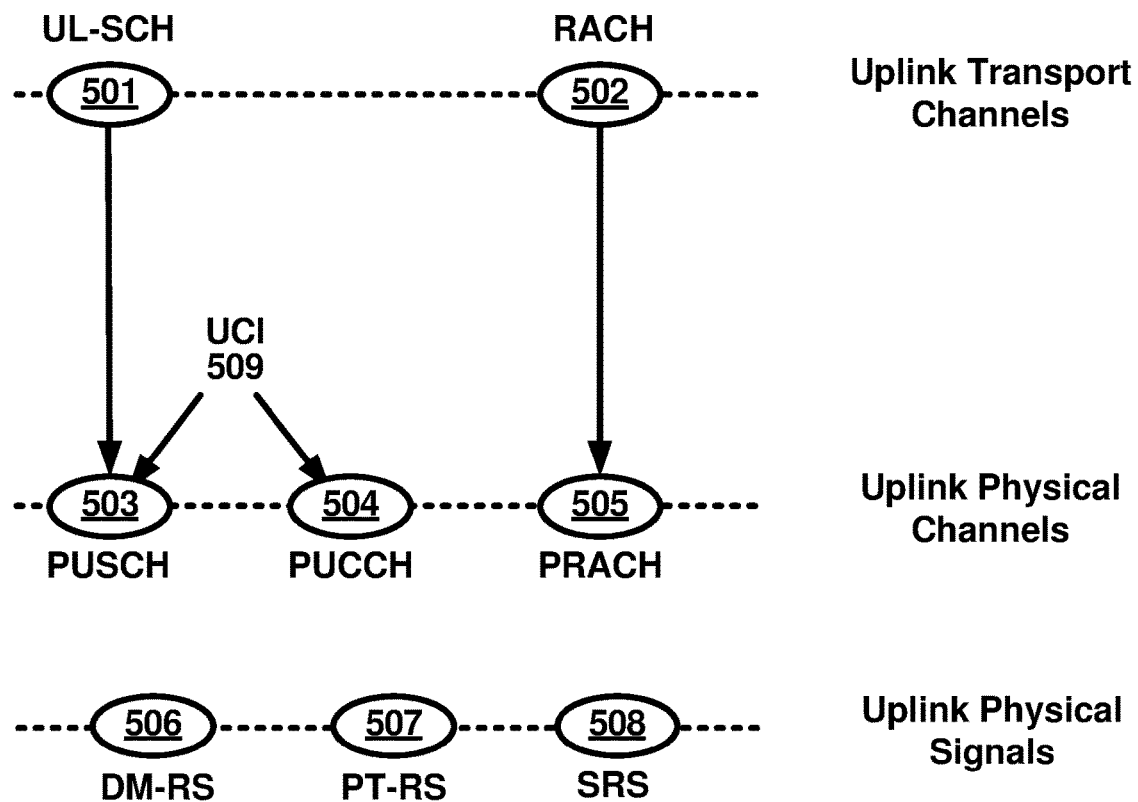
FIG. 5A is a diagram of an example uplink channel mapping and example uplink physical signals as per an aspect of an embodiment of the present disclosure.
Figure 5B:
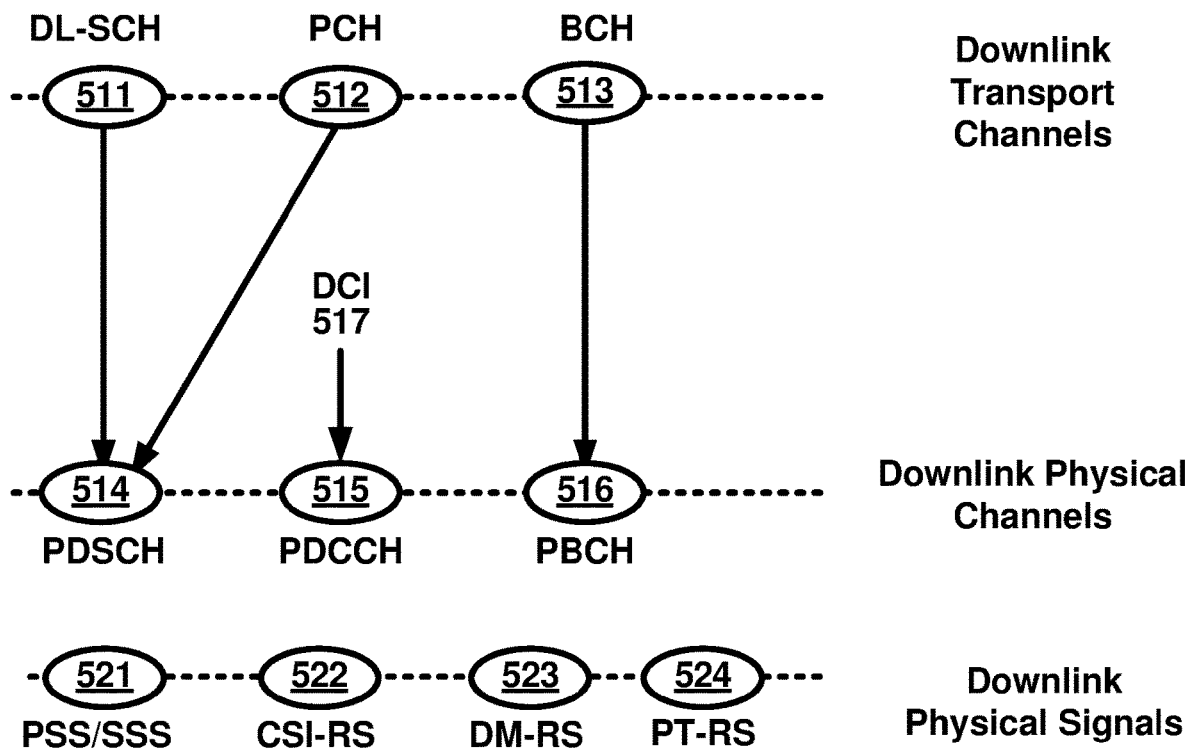
FIG. 5B is a diagram of an example downlink channel mapping and example downlink physical signals as per an aspect of an embodiment of the present disclosure.

FIG. 5A is a diagram of an example uplink channel mapping and example uplink physical signals. FIG. 5B is a diagram of an example downlink channel mapping and a downlink physical signals. In an example, a physical layer may provide one or more information transfer services to a MAC and/or one or more higher layers. For example, the physical layer may provide the one or more information transfer services to the MAC via one or more transport channels. An information transfer service may indicate how and with what characteristics data are transferred over the radio interface.

In an example embodiment, a radio network may comprise one or more downlink and/or uplink transport channels. For example, a diagram in FIG. 5A shows example uplink transport channels comprising Uplink-Shared CHannel (UL-SCH) 501 and Random Access CHannel (RACH) 502. A diagram in FIG. 5B shows example downlink transport channels comprising Downlink-Shared CHannel (DL-SCH) 511, Paging CHannel (PCH) 512, and Broadcast CHannel (BCH) 513. A transport channel may be mapped to one or more corresponding physical channels. For example, UL-SCH 501 may be mapped to Physical Uplink Shared CHannel (PUSCH) 503. RACH 502 may be mapped to PRACH 505. DL-SCH 511 and PCH 512 may be mapped to Physical Downlink Shared CHannel (PDSCH) 514. BCH 513 may be mapped to Physical Broadcast CHannel (PBCH) 516.

There may be one or more physical channels without a corresponding transport channel. The one or more physical channels may be employed for Uplink Control Information (UCI) 509 and/or Downlink Control Information (DCI) 517. For example, Physical Uplink Control CHannel (PUCCH) 504 may carry UCI 509 from a UE to a base station. For example, Physical Downlink Control CHannel (PDCCH) 515 may carry DCI 517 from a base station to a UE. NR may support UCI 509 multiplexing in PUSCH 503 when UCI 509 and PUSCH 503 transmissions may coincide in a slot at least in part. The UCI 509 may comprise at least one of CSI, Acknowledgement (ACK)/Negative Acknowledgement (NACK), and/or scheduling request. The DCI 517 on PDCCH 515 may indicate at least one of following: one or more downlink assignments and/or one or more uplink scheduling grants In uplink, a UE may transmit one or more Reference Signals (RSs) to a base station. For example, the one or more RSs may be at least one of Demodulation-RS (DM-RS) 506, Phase Tracking-RS (PT-RS) 507, and/or Sounding RS (SRS) 508. In downlink, a base station may transmit (e.g., unicast, multicast, and/or broadcast) one or more RSs to a UE. For example, the one or more RSs may be at least one of Primary Synchronization Signal (PSS)/Secondary Synchronization Signal (SSS) 521, CSI-RS 522, DM-RS 523, and/or PT-RS 524.

In an example, a UE may transmit one or more uplink DM-RSs 506 to a base station for channel estimation, for example, for coherent demodulation of one or more uplink physical channels (e.g., PUSCH 503 and/or PUCCH 504). For example, a UE may transmit a base station at least one uplink DM-RS 506 with PUSCH 503 and/or PUCCH 504, wherein the at least one uplink DM-RS 506 may be spanning a same frequency range as a corresponding physical channel. In an example, a base station may configure a UE with one or more uplink DM-RS configurations. At least one DM-RS configuration may support a front-loaded DM-RS pattern. A front-loaded DM-RS may be mapped over one or more OFDM symbols (e.g., 1 or 2 adjacent OFDM symbols). One or more additional uplink DM-RS may be configured to transmit at one or more symbols of a PUSCH and/or PUCCH. A base station may semi-statistically configure a UE with a maximum number of front-loaded DM-RS symbols for PUSCH and/or PUCCH. For example, a UE may schedule a single-symbol DM-RS and/or double symbol DM-RS based on a maximum number of front-loaded DM-RS symbols, wherein a base station may configure the UE with one or more additional uplink DM-RS for PUSCH and/or PUCCH. A new radio network may support, e.g., at least for CP-OFDM, a common DM-RS structure for DL and UL, wherein a DM-RS location, DM-RS pattern, and/or scrambling sequence may be same or different.

In an example, whether uplink PT-RS 507 is present or not may depend on a RRC configuration. For example, a presence of uplink PT-RS may be UE-specifically configured. For example, a presence and/or a pattern of uplink PT-RS 507 in a scheduled resource may be UE-specifically configured by a combination of RRC signaling and/or association with one or more parameters employed for other purposes (e.g., Modulation and Coding Scheme (MCS)) which may be indicated by DCI. When configured, a dynamic presence of uplink PT-RS 507 may be associated with one or more DCI parameters comprising at least MCS. A radio network may support plurality of uplink PT-RS densities defined in time/frequency domain. When present, a frequency domain density may be associated with at least one configuration of a scheduled bandwidth. A UE may assume a same precoding for a DMRS port and a PT-RS port. A number of PT-RS ports may be fewer than a number of DM-RS ports in a scheduled resource. For example, uplink PT-RS 507 may be confined in the scheduled time/frequency duration for a UE.

In an example, a UE may transmit SRS 508 to a base station for channel state estimation to support uplink channel dependent scheduling and/or link adaptation. For example, SRS 508 transmitted by a UE may allow for a base station to estimate an uplink channel state at one or more different frequencies. A base station scheduler may employ an uplink channel state to assign one or more resource blocks of good quality for an uplink PUSCH transmission from a UE. A base station may semi-statistically configure a UE with one or more SRS resource sets. For an SRS resource set, a base station may configure a UE with one or more SRS resources. An SRS resource set applicability may be configured by a higher layer (e.g., RRC) parameter. For example, when a higher layer parameter indicates beam management, a SRS resource in each of one or more SRS resource sets may be transmitted at a time instant. A UE may transmit one or more SRS resources in different SRS resource sets simultaneously. A new radio network may support aperiodic, periodic and/or semi-persistent SRS transmissions. A UE may transmit SRS resources based on one or more trigger types, wherein the one or more trigger types may comprise higher layer signaling (e.g., RRC) and/or one or more DCI formats (e.g., at least one DCI format may be employed for a UE to select at least one of one or more configured SRS resource sets. An SRS trigger type 0 may refer to an SRS triggered based on a higher layer signaling. An SRS trigger type 1 may refer to an SRS triggered based on one or more DCI formats. In an example, when PUSCH 503 and SRS 508 are transmitted in a same slot, a UE may be configured to transmit SRS 508 after a transmission of PUSCH 503 and corresponding uplink DM-RS 506.

In an example, a base station may semi-statistically configure a UE with one or more SRS configuration parameters indicating at least one of following: a SRS resource configuration identifier, a number of SRS ports, time domain behavior of SRS resource configuration (e.g., an indication of periodic, semi-persistent, or aperiodic SRS), slot (mini-slot, and/or subframe) level periodicity and/or offset for a periodic and/or aperiodic SRS resource, a number of OFDM symbols in a SRS resource, starting OFDM symbol of a SRS resource, a SRS bandwidth, a frequency hopping bandwidth, a cyclic shift, and/or a SRS sequence ID.

In an example, in a time domain, an SS/PBCH block may comprise one or more OFDM symbols (e.g., 4 OFDM symbols numbered in increasing order from 0 to 3) within the SS/PBCH block. An SS/PBCH block may comprise PSS/SSS 521 and PBCH 516. In an example, in the frequency domain, an SS/PBCH block may comprise one or more contiguous subcarriers (e.g., 240 contiguous subcarriers with the subcarriers numbered in increasing order from 0 to 239) within the SS/PBCH block. For example, a PSS/SSS 521 may occupy 1 OFDM symbol and 127 subcarriers. For example, PBCH 516 may span across 3 OFDM symbols and 240 subcarriers. A UE may assume that one or more SS/PBCH blocks transmitted with a same block index may be quasi co-located, e.g., with respect to Doppler spread, Doppler shift, average gain, average delay, and spatial Rx parameters. A UE may not assume quasi co-location for other SS/PBCH block transmissions. A periodicity of an SS/PBCH block may be configured by a radio network (e.g., by an RRC signaling) and one or more time locations where the SS/PBCH block may be sent may be determined by sub-carrier spacing. In an example, a UE may assume a band-specific sub-carrier spacing for an SS/PBCH block unless a radio network has configured a UE to assume a different sub-carrier spacing.

In an example, downlink CSI-RS 522 may be employed for a UE to acquire channel state information. A radio network may support periodic, aperiodic, and/or semi-persistent transmission of downlink CSI-RS 522. For example, a base station may semi-statistically configure and/or reconfigure a UE with periodic transmission of downlink CSI-RS 522. A configured CSI-RS resources may be activated ad/or deactivated. For semi-persistent transmission, an activation and/or deactivation of CSI-RS resource may be triggered dynamically. In an example, CSI-RS configuration may comprise one or more parameters indicating at least a number of antenna ports. For example, a base station may configure a UE with 32 ports. A base station may semi-statistically configure a UE with one or more CSI-RS resource sets. One or more CSI-RS resources may be allocated from one or more CSI-RS resource sets to one or more UEs. For example, a base station may semi-statistically configure one or more parameters indicating CSI RS resource mapping, for example, time-domain location of one or more CSI-RS resources, a bandwidth of a CSI-RS resource, and/or a periodicity. In an example, a UE may be configured to employ a same OFDM symbols for downlink CSI-RS 522 and control resource set (coreset) when the downlink CSI-RS 522 and coreset are spatially quasi co-located and resource elements associated with the downlink CSI-RS 522 are the outside of PRBs configured for coreset. In an example, a UE may be configured to employ a same OFDM symbols for downlink CSI-RS 522 and SSB/PBCH when the downlink CSI-RS 522 and SSB/PBCH are spatially quasi co-located and resource elements associated with the downlink CSI-RS 522 are the outside of PRBs configured for SSB/PBCH.

In an example, a UE may transmit one or more downlink DM-RSs 523 to a base station for channel estimation, for example, for coherent demodulation of one or more downlink physical channels (e.g., PDSCH 514). For example, a radio network may support one or more variable and/or configurable DM-RS patterns for data demodulation. At least one downlink DM-RS configuration may support a front-loaded DM-RS pattern. A front-loaded DM-RS may be mapped over one or more OFDM symbols (e.g., 1 or 2 adjacent OFDM symbols). A base station may semi-statistically configure a UE with a maximum number of front-loaded DM-RS symbols for PDSCH 514. For example, a DM-RS configuration may support one or more DM-RS ports. For example, for single user-MIMO, a DM-RS configuration may support at least 8 orthogonal downlink DM-RS ports. For example, for multiuser-MIMO, a DM-RS configuration may support 12 orthogonal downlink DM-RS ports. A radio network may support, e.g., at least for CP-OFDM, a common DM-RS structure for DL and UL, wherein a DM-RS location, DM-RS pattern, and/or scrambling sequence may be same or different.

In an example, whether downlink PT-RS 524 is present or not may depend on a RRC configuration. For example, a presence of downlink PT-RS 524 may be UE-specifically configured. For example, a presence and/or a pattern of downlink PT-RS 524 in a scheduled resource may be UE-specifically configured by a combination of RRC signaling and/or association with one or more parameters employed for other purposes (e.g., MCS) which may be indicated by DCI. When configured, a dynamic presence of downlink PT-RS 524 may be associated with one or more DCI parameters comprising at least MCS. A radio network may support plurality of PT-RS densities defined in time/frequency domain. When present, a frequency domain density may be associated with at least one configuration of a scheduled bandwidth. A UE may assume a same precoding for a DMRS port and a PT-RS port. A number of PT-RS ports may be fewer than a number of DM-RS ports in a scheduled resource. For example, downlink PT-RS 524 may be confined in the scheduled time/frequency duration for a UE.

Figure 6:
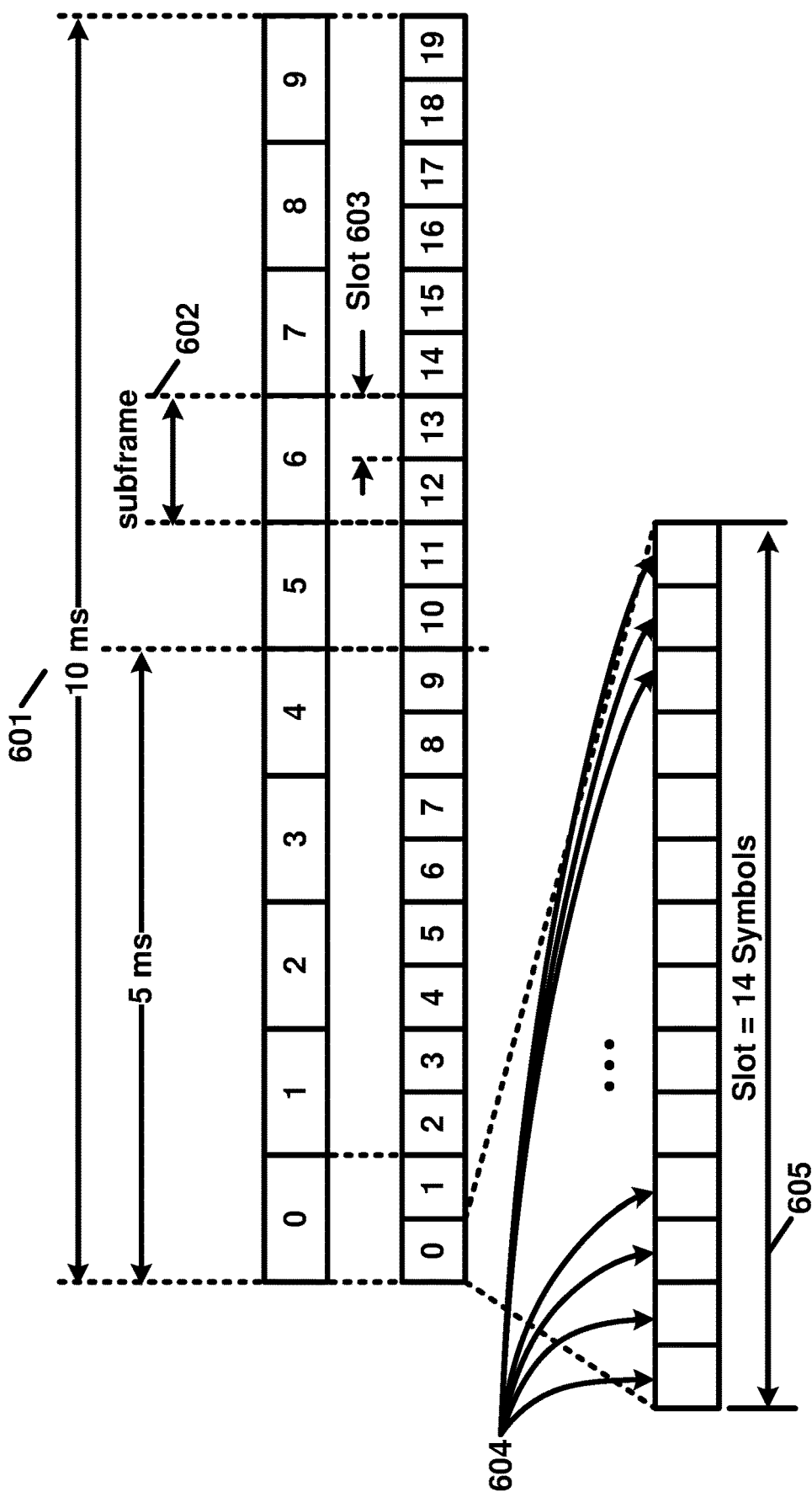
FIG. 6 is a diagram depicting an example frame structure as per an aspect of an embodiment of the present disclosure.

FIG. 6 is a diagram depicting an example frame structure for a carrier as per an aspect of an embodiment of the present disclosure. A multicarrier OFDM communication system may include one or more carriers, for example, ranging from 1 to 32 carriers, in case of carrier aggregation, or ranging from 1 to 64 carriers, in case of dual connectivity. Different radio frame structures may be supported (e.g., for FDD and for TDD duplex mechanisms). FIG. 6 shows an example frame structure. Downlink and uplink transmissions may be organized into radio frames 601. In this example, radio frame duration is 10 ms. In this example, a 10 ms radio frame 601 may be divided into ten equally sized subframes 602 with 1 ms duration. Subframe(s) may comprise one or more slots (e.g. slots 603 and 605) depending on subcarrier spacing and/or CP length. For example, a subframe with 15 kHz, 30 kHz, 60 kHz, 120 kHz, 240 kHz and 480 kHz subcarrier spacing may comprise one, two, four, eight, sixteen and thirty-two slots, respectively. In FIG. 6, a subframe may be divided into two equally sized slots 603 with 0.5 ms duration. For example, 10 subframes may be available for downlink transmission and 10 subframes may be available for uplink transmissions in a 10 ms interval. Uplink and downlink transmissions may be separated in the frequency domain. Slot(s) may include a plurality of OFDM symbols 604. The number of OFDM symbols 604 in a slot 605 may depend on the cyclic prefix length. For example, a slot may be 14 OFDM symbols for the same subcarrier spacing of up to 480 kHz with normal CP. A slot may be 12 OFDM symbols for the same subcarrier spacing of 60 kHz with extended CP. A slot may contain downlink, uplink, or a downlink part and an uplink part and/or alike.

Figure 7A:
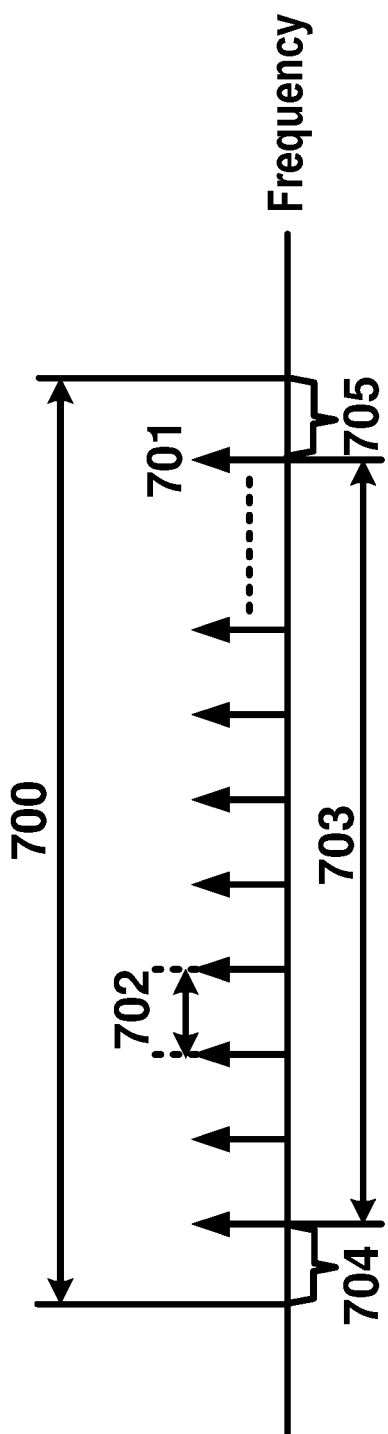
FIG. 7A and FIG. 7B are diagrams depicting example sets of OFDM subcarriers as per an aspect of an embodiment of the present disclosure.

FIG. 7A is a diagram depicting example sets of OFDM subcarriers as per an aspect of an embodiment of the present disclosure. In the example, a gNB may communicate with a wireless device with a carrier with an example channel bandwidth 700. Arrow(s) in the diagram may depict a subcarrier in a multicarrier OFDM system. The OFDM system may use technology such as OFDM technology, SC-FDMA technology, and/or the like. In an example, an arrow 701 shows a subcarrier transmitting information symbols. In an example, a subcarrier spacing 702, between two contiguous subcarriers in a carrier, may be any one of 15 KHz, 30 KHz, 60 KHz, 120 KHz, 240 KHz etc. In an example, different subcarrier spacing may correspond to different transmission numerologies. In an example, a transmission numerology may comprise at least: a numerology index; a value of subcarrier spacing; a type of cyclic prefix (CP). In an example, a gNB may transmit to/receive from a UE on a number of subcarriers 703 in a carrier. In an example, a bandwidth occupied by a number of subcarriers 703 (transmission bandwidth) may be smaller than the channel bandwidth 700 of a carrier, due to guard band 704 and 705. In an example, a guard band 704 and 705 may be used to reduce interference to and from one or more neighbor carriers. A number of subcarriers (transmission width) in a carrier may depend on the channel bandwidth of the carrier and the subcarrier spacing. For example, a transmission bandwidth, for a carrier with 20 MHz channel bandwidth and 15 KHz subcarrier spacing, may be in number of 1024 subcarriers.

Figure 7B:
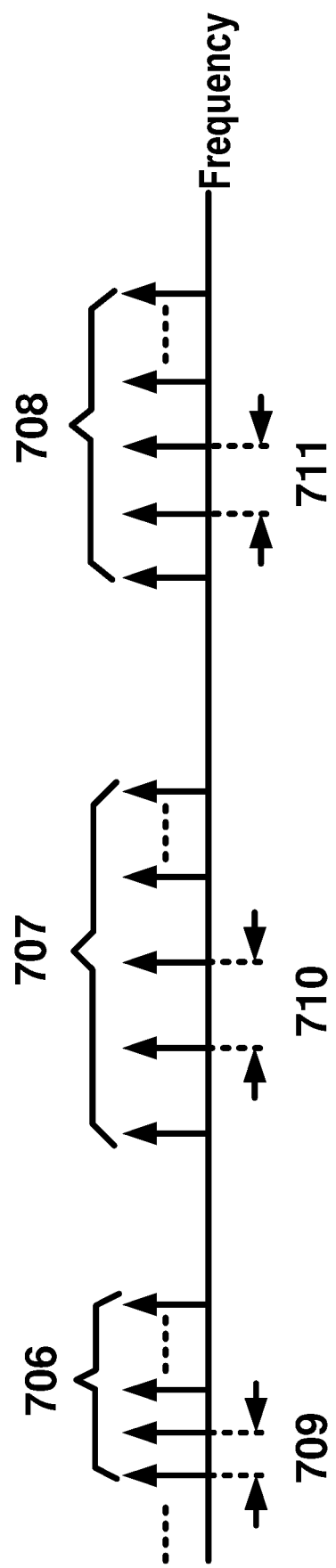

In an example, a gNB and a wireless device may communicate with multiple CCs when configured with CA. In an example, different component carriers may have different bandwidth and/or subcarrier spacing, if CA is supported. In an example, a gNB may transmit a first type of service to a UE on a first component carrier. The gNB may transmit a second type of service to the UE on a second component carrier. Different type of services may have different service requirement (e.g., data rate, latency, reliability), which may be suitable for transmission via different component carrier having different subcarrier spacing and/or bandwidth. FIG. 7B shows an example embodiment. A first component carrier may comprise a first number of subcarriers 706 with a first subcarrier spacing 709. A second component carrier may comprise a second number of subcarriers 707 with a second subcarrier spacing 710. A third component carrier may comprise a third number of subcarriers 708 with a third subcarrier spacing 711. Carriers in a multicarrier OFDM communication system may be contiguous carriers, non-contiguous carriers, or a combination of both contiguous and non-contiguous carriers.

Figure 8:
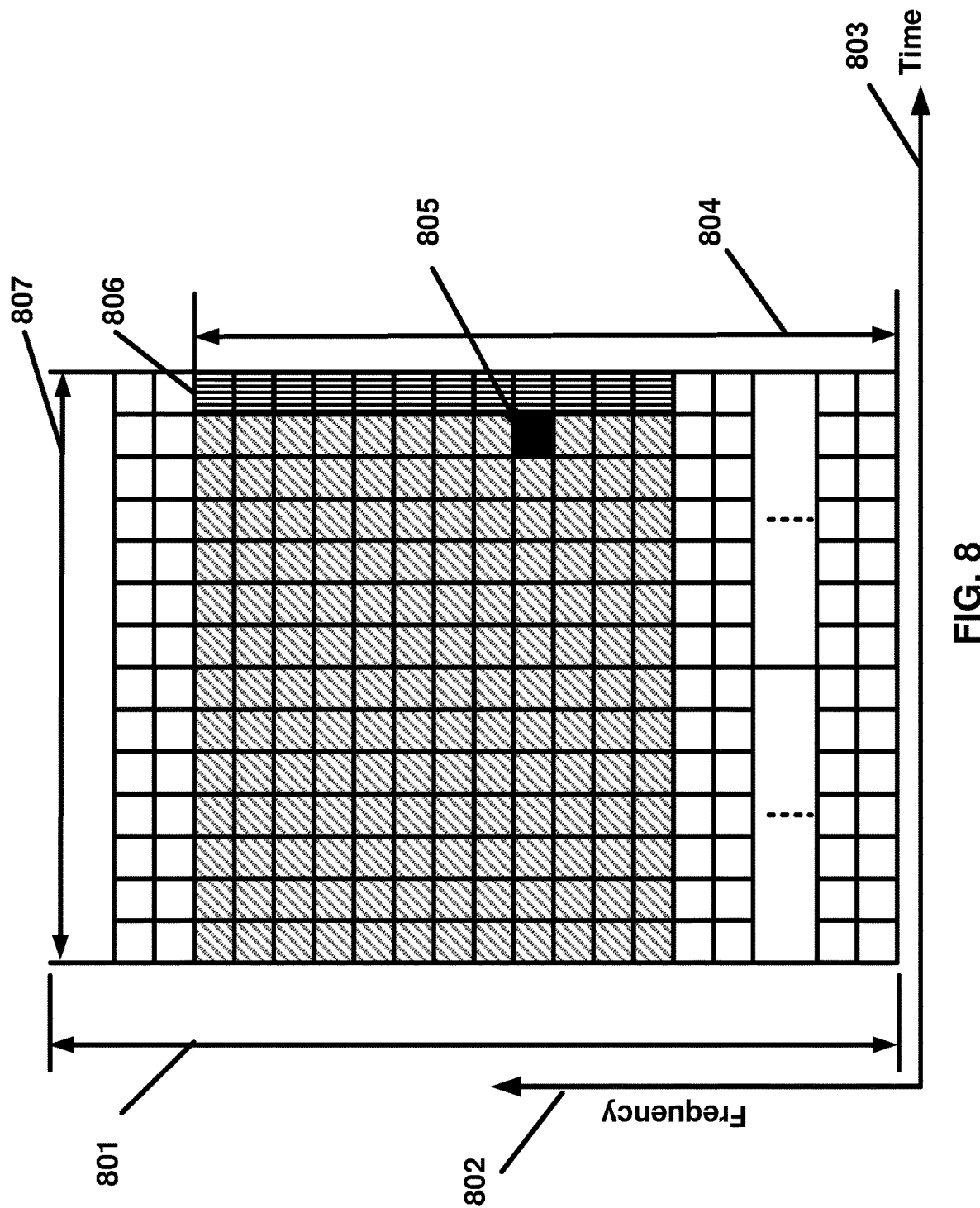
FIG. 8 is a diagram depicting example OFDM radio resources as per an aspect of an embodiment of the present disclosure.

FIG. 8 is a diagram depicting OFDM radio resources as per an aspect of an embodiment of the present disclosure. In an example, a carrier may have a transmission bandwidth 801. In an example, a resource grid may be in a structure of frequency domain 802 and time domain 803. In an example, a resource grid may comprise a first number of OFDM symbols in a subframe and a second number of resource blocks, starting from a common resource block indicated by higher-layer signaling (e.g. RRC signaling), for a transmission numerology and a carrier. In an example, in a resource grid, a resource unit identified by a subcarrier index and a symbol index may be a resource element 805. In an example, a subframe may comprise a first number of OFDM symbols 807 depending on a numerology associated with a carrier. For example, when a subcarrier spacing of a numerology of a carrier is 15 KHz, a subframe may have 14 OFDM symbols for a carrier. When a subcarrier spacing of a numerology is 30 KHz, a subframe may have 28 OFDM symbols. When a subcarrier spacing of a numerology is 60 Khz, a subframe may have 56 OFDM symbols, etc. In an example, a second number of resource blocks comprised in a resource grid of a carrier may depend on a bandwidth and a numerology of the carrier.

As shown in FIG. 8, a resource block 806 may comprise 12 subcarriers. In an example, multiple resource blocks may be grouped into a Resource Block Group (RBG) 804. In an example, a size of a RBG may depend on at least one of: a RRC message indicating a RBG size configuration; a size of a carrier bandwidth; or a size of a bandwidth part of a carrier. In an example, a carrier may comprise multiple bandwidth parts. A first bandwidth part of a carrier may have different frequency location and/or bandwidth from a second bandwidth part of the carrier.

In an example, a gNB may transmit a downlink control information comprising a downlink or uplink resource block assignment to a wireless device. A base station may transmit to or receive from, a wireless device, data packets (e.g. transport blocks) scheduled and transmitted via one or more resource blocks and one or more slots according to parameters in a downlink control information and/or RRC message(s). In an example, a starting symbol relative to a first slot of the one or more slots may be indicated to the wireless device. In an example, a gNB may transmit to or receive from, a wireless device, data packets scheduled on one or more RBGs and one or more slots.

In an example, a gNB may transmit a downlink control information comprising a downlink assignment to a wireless device via one or more PDCCHs. The downlink assignment may comprise parameters indicating at least modulation and coding format; resource allocation; and/or HARQ information related to DL-SCH. In an example, a resource allocation may comprise parameters of resource block allocation; and/or slot allocation. In an example, a gNB may dynamically allocate resources to a wireless device via a Cell-Radio Network Temporary Identifier (C-RNTI) on one or more PDCCHs. The wireless device may monitor the one or more PDCCHs in order to find possible allocation when its downlink reception is enabled. The wireless device may receive one or more downlink data package on one or more PDSCH scheduled by the one or more PDCCHs, when successfully detecting the one or more PDCCHs.

In an example, a gNB may allocate Configured Scheduling (CS) resources for down link transmission to a wireless device. The gNB may transmit one or more RRC messages indicating a periodicity of the CS grant. The gNB may transmit a DCI via a PDCCH addressed to a Configured Scheduling-RNTI (CS-RNTI) activating the CS resources. The DCI may comprise parameters indicating that the downlink grant is a CS grant. The CS grant may be implicitly reused according to the periodicity defined by the one or more RRC messages, until deactivated.

In an example, a gNB may transmit a downlink control information comprising an uplink grant to a wireless device via one or more PDCCHs. The uplink grant may comprise parameters indicating at least modulation and coding format; resource allocation; and/or HARQ information related to UL-SCH. In an example, a resource allocation may comprise parameters of resource block allocation; and/or slot allocation. In an example, a gNB may dynamically allocate resources to a wireless device via a C-RNTI on one or more PDCCHs. The wireless device may monitor the one or more PDCCHs in order to find possible resource allocation. The wireless device may transmit one or more uplink data package via one or more PUSCH scheduled by the one or more PDCCHs, when successfully detecting the one or more PDCCHs.

In an example, a gNB may allocate CS resources for uplink data transmission to a wireless device. The gNB may transmit one or more RRC messages indicating a periodicity of the CS grant. The gNB may transmit a DCI via a PDCCH addressed to a CS-RNTI activating the CS resources. The DCI may comprise parameters indicating that the uplink grant is a CS grant. The CS grant may be implicitly reused according to the periodicity defined by the one or more RRC message, until deactivated.

In an example, a base station may transmit DCI/control signaling via PDCCH. The DCI may take a format in a plurality of formats. A DCI may comprise downlink and/or uplink scheduling information (e.g., resource allocation information, HARQ related parameters, MCS), request for CSI (e.g., aperiodic CQI reports), request for SRS, uplink power control commands for one or more cells, one or more timing information (e.g., TB transmission/reception timing, HARQ feedback timing, etc.), etc. In an example, a DCI may indicate an uplink grant comprising transmission parameters for one or more transport blocks. In an example, a DCI may indicate downlink assignment indicating parameters for receiving one or more transport blocks. In an example, a DCI may be used by base station to initiate a contention-free random access at the wireless device. In an example, the base station may transmit a DCI comprising slot format indicator (SFI) notifying a slot format. In an example, the base station may transmit a DCI comprising pre-emption indication notifying the PRB(s) and/or OFDM symbol(s) where a UE may assume no transmission is intended for the UE. In an example, the base station may transmit a DCI for group power control of PUCCH or PUSCH or SRS. In an example, a DCI may correspond to an RNTI. In an example, the wireless device may obtain an RNTI in response to completing the initial access (e.g., C-RNTI). In an example, the base station may configure an RNTI for the wireless (e.g., CS-RNTI, TPC-CS-RNTI, TPC-PUCCH-RNTI, TPC-PUSCH-RNTI, TPC-SRS-RNTI). In an example, the wireless device may compute an RNTI (e.g., the wireless device may compute RA-RNTI based on resources used for transmission of a preamble). In an example, an RNTI may have a pre-configured value (e.g., P-RNTI or SI-RNTI). In an example, a wireless device may monitor a group common search space which may be used by base station for transmitting DCIs that are intended for a group of UEs. In an example, a group common DCI may correspond to an RNTI which is commonly configured for a group of UEs. In an example, a wireless device may monitor a UE-specific search space. In an example, a UE specific DCI may correspond to an RNTI configured for the wireless device.

A NR system may support a single beam operation and/or a multi-beam operation. In a multi-beam operation, a base station may perform a downlink beam sweeping to provide coverage for common control channels and/or downlink SS blocks, which may comprise at least a PSS, a SSS, and/or PBCH. A wireless device may measure quality of a beam pair link using one or more RSs. One or more SS blocks, or one or more CSI-RS resources, associated with a CSI-RS resource index (CRI), or one or more DM-RSs of PBCH, may be used as RS for measuring quality of a beam pair link. Quality of a beam pair link may be defined as a reference signal received power (RSRP) value, or a reference signal received quality (RSRQ) value, and/or a CSI value measured on RS resources. The base station may indicate whether an RS resource, used for measuring a beam pair link quality, is quasi-co-located (QCLed) with DM-RSs of a control channel. A RS resource and DM-RSs of a control channel may be called QCLed when a channel characteristics from a transmission on an RS to a wireless device, and that from a transmission on a control channel to a wireless device, are similar or same under a configured criterion. In a multi-beam operation, a wireless device may perform an uplink beam sweeping to access a cell.

In an example, a wireless device may be configured to monitor PDCCH on one or more beam pair links simultaneously depending on a capability of a wireless device. This may increase robustness against beam pair link blocking. A base station may transmit one or more messages to configure a wireless device to monitor PDCCH on one or more beam pair links in different PDCCH OFDM symbols. For example, a base station may transmit higher layer signaling (e.g. RRC signaling) or MAC CE comprising parameters related to the Rx beam setting of a wireless device for monitoring PDCCH on one or more beam pair links. A base station may transmit indication of spatial QCL assumption between an DL RS antenna port(s) (for example, cell-specific CSI-RS, or wireless device-specific CSI-RS, or SS block, or PBCH with or without DM-RSs of PBCH), and DL RS antenna port(s) for demodulation of DL control channel. Signaling for beam indication for a PDCCH may be MAC CE signaling, or RRC signaling, or DCI signaling, or specification-transparent and/or implicit method, and combination of these signaling methods.

For reception of unicast DL data channel, a base station may indicate spatial QCL parameters between DL RS antenna port(s) and DM-RS antenna port(s) of DL data channel. The base station may transmit DCI (e.g. downlink grants) comprising information indicating the RS antenna port(s). The information may indicate RS antenna port(s) which may be QCL-ed with the DM-RS antenna port(s). Different set of DM-RS antenna port(s) for a DL data channel may be indicated as QCL with different set of the RS antenna port(s).

Figure 9A:
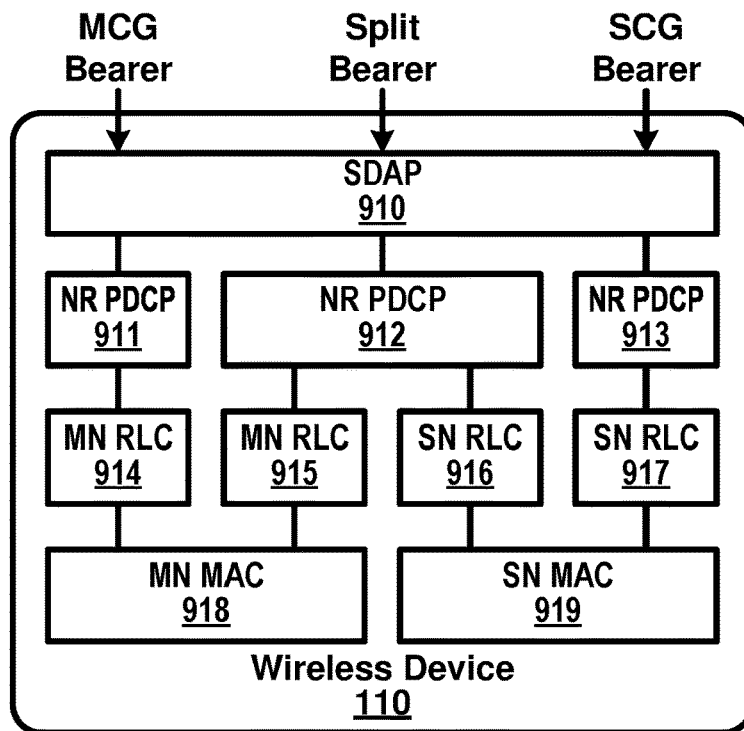
FIG. 9A, and FIG. 9B are diagrams of an example multi connectivity as per an aspect of an embodiment of the present disclosure.
Figure 9B:
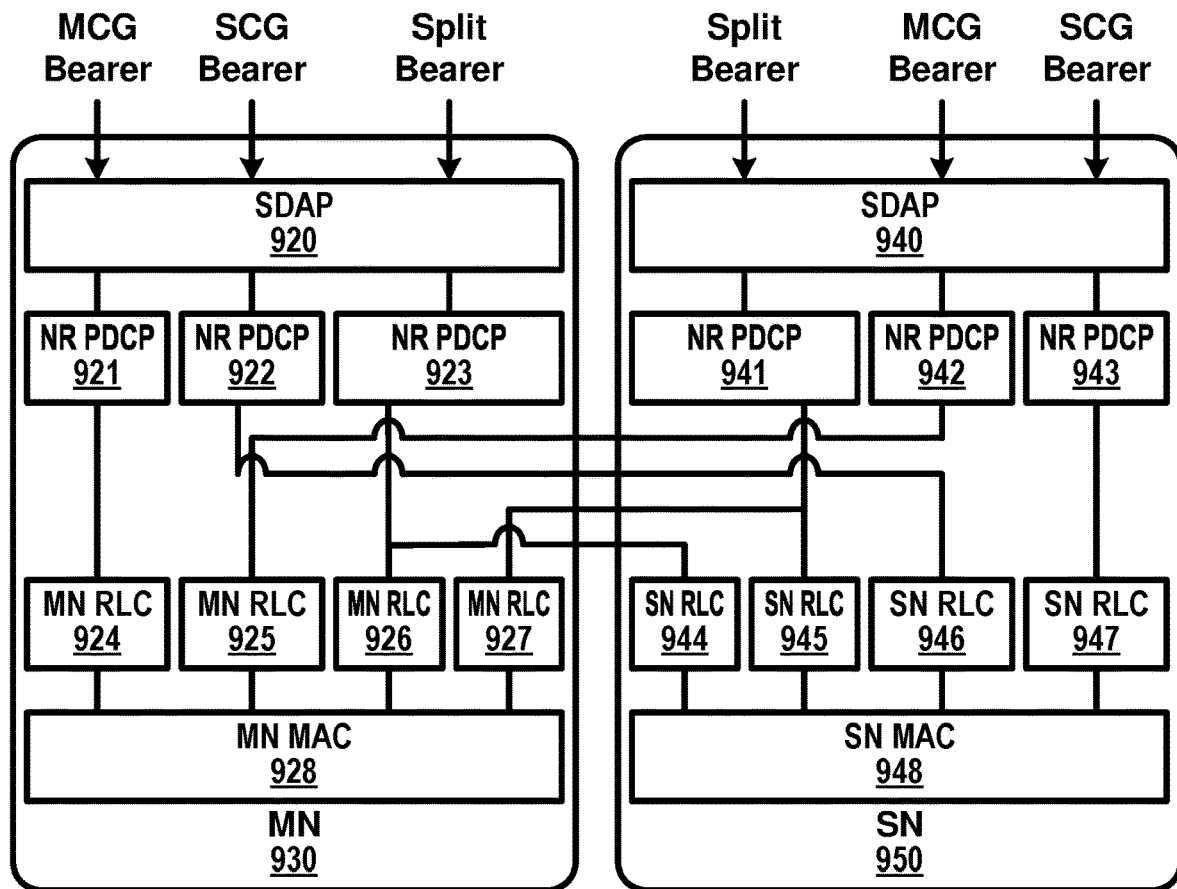

FIG. 9A and FIG. 9B show packet flows employing a multi connectivity (e.g. dual connectivity, multi connectivity, tight interworking, and/or the like). FIG. 9A is an example diagram of a protocol structure of a wireless device 110 (e.g. UE) with CA and/or multi connectivity as per an aspect of an embodiment. FIG. 9B is an example diagram of a protocol structure of multiple base stations with CA and/or multi connectivity as per an aspect of an embodiment. The multiple base stations may comprise a master node, MN 1130 (e.g. a master node, a master base station, a master gNB, a master eNB, and/or the like) and a secondary node, SN 1150 (e.g. a secondary node, a secondary base station, a secondary gNB, a secondary eNB, and/or the like). A master node 1130 and a secondary node 1150 may co-work to communicate with a wireless device 110.

When multi connectivity is configured for a wireless device 110, the wireless device 110, which may support multiple reception/transmission functions in an RRC connected state, may be configured to utilize radio resources provided by multiple schedulers of a multiple base stations. Multiple base stations may be inter-connected via a non-ideal or ideal backhaul (e.g. Xn interface, X2 interface, and/or the like). A base station involved in multi connectivity for a certain wireless device may perform at least one of two different roles: a base station may either act as a master base station or as a secondary base station. In multi connectivity, a wireless device may be connected to one master base station and one or more secondary base stations. In an example, a master base station (e.g. the MN 1130) may provide a master cell group (MCG) comprising a primary cell and/or one or more secondary cells for a wireless device (e.g. the wireless device 110). A secondary base station (e.g. the SN 1150) may provide a secondary cell group (SCG) comprising a primary secondary cell (PSCell) and/or one or more secondary cells for a wireless device (e.g. the wireless device 110).

In multi connectivity, a radio protocol architecture that a bearer employs may depend on how a bearer is setup. In an example, three different type of bearer setup options may be supported: an MCG bearer, an SCG bearer, and/or a split bearer. A wireless device may receive/transmit packets of an MCG bearer via one or more cells of the MCG, and/or may receive/transmits packets of an SCG bearer via one or more cells of an SCG. Multi-connectivity may also be described as having at least one bearer configured to use radio resources provided by the secondary base station. Multi-connectivity may or may not be configured/implemented in some of the example embodiments.

In an example, a wireless device (e.g. Wireless Device 110) may transmit and/or receive: packets of an MCG bearer via an SDAP layer (e.g. SDAP 1110), a PDCP layer (e.g. NR PDCP 1111), an RLC layer (e.g. MN RLC 1114), and a MAC layer (e.g. MN MAC 1118); packets of a split bearer via an SDAP layer (e.g. SDAP 1110), a PDCP layer (e.g. NR PDCP 1112), one of a master or secondary RLC layer (e.g. MN RLC 1115, SN RLC 1116), and one of a master or secondary MAC layer (e.g. MN MAC 1118, SN MAC 1119); and/or packets of an SCG bearer via an SDAP layer (e.g. SDAP 1110), a PDCP layer (e.g. NR PDCP 1113), an RLC layer (e.g. SN RLC 1117), and a MAC layer (e.g. MN MAC 1119).

In an example, a master base station (e.g. MN 1130) and/or a secondary base station (e.g. SN 1150) may transmit/receive: packets of an MCG bearer via a master or secondary node SDAP layer (e.g. SDAP 1120, SDAP 1140), a master or secondary node PDCP layer (e.g. NR PDCP 1121, NR PDCP 1142), a master node RLC layer (e.g. MN RLC 1124, MN RLC 1125), and a master node MAC layer (e.g. MN MAC 1128); packets of an SCG bearer via a master or secondary node SDAP layer (e.g. SDAP 1120, SDAP 1140), a master or secondary node PDCP layer (e.g. NR PDCP 1122, NR PDCP 1143), a secondary node RLC layer (e.g. SN RLC 1146, SN RLC 1147), and a secondary node MAC layer (e.g. SN MAC 1148); packets of a split bearer via a master or secondary node SDAP layer (e.g. SDAP 1120, SDAP 1140), a master or secondary node PDCP layer (e.g.

NR PDCP 1123, NR PDCP 1141), a master or secondary node RLC layer (e.g. MN RLC 1126, SN RLC 1144, SN RLC 1145, MN RLC 1127), and a master or secondary node MAC layer (e.g. MN MAC 1128, SN MAC 1148).

In multi connectivity, a wireless device may configure multiple MAC entities: one MAC entity (e.g. MN MAC 1118) for a master base station, and other MAC entities (e.g. SN MAC 1119) for a secondary base station. In multi-connectivity, a configured set of serving cells for a wireless device may comprise two subsets: an MCG comprising serving cells of a master base station, and SCGs comprising serving cells of a secondary base station. For an SCG, one or more of following configurations may be applied: at least one cell of an SCG has a configured UL CC and at least one cell of a SCG, named as primary secondary cell (PSCell, PCell of SCG, or sometimes called PCell), is configured with PUCCH resources; when an SCG is configured, there may be at least one SCG bearer or one Split bearer; upon detection of a physical layer problem or a random access problem on a PSCell, or a number of NR RLC retransmissions has been reached associated with the SCG, or upon detection of an access problem on a PSCell during a SCG addition or a SCG change: an RRC connection re-establishment procedure may not be triggered, UL transmissions towards cells of an SCG may be stopped, a master base station may be informed by a wireless device of a SCG failure type, for split bearer, a DL data transfer over a master base station may be maintained; an NR RLC acknowledged mode (AM) bearer may be configured for a split bearer; PCell and/or PSCell may not be de-activated; PSCell may be changed with a SCG change procedure (e.g. with security key change and a RACH procedure); and/or a bearer type change between a split bearer and a SCG bearer or simultaneous configuration of a SCG and a split bearer may or may not supported.

With respect to interaction between a master base station and a secondary base stations for multi-connectivity, one or more of the following may be applied: a master base station and/or a secondary base station may maintain RRM measurement configurations of a wireless device; a master base station may (e.g. based on received measurement reports, traffic conditions, and/or bearer types) may decide to request a secondary base station to provide additional resources (e.g. serving cells) for a wireless device; upon receiving a request from a master base station, a secondary base station may create/modify a container that may result in configuration of additional serving cells for a wireless device (or decide that the secondary base station has no resource available to do so); for a UE capability coordination, a master base station may provide (a part of) an AS configuration and UE capabilities to a secondary base station; a master base station and a secondary base station may exchange information about a UE configuration by employing of RRC containers (inter-node messages) carried via Xn messages; a secondary base station may initiate a reconfiguration of the secondary base station existing serving cells (e.g. PUCCH towards the secondary base station); a secondary base station may decide which cell is a PSCell within a SCG; a master base station may or may not change content of RRC configurations provided by a secondary base station; in case of a SCG addition and/or a SCG SCell addition, a master base station may provide recent (or the latest) measurement results for SCG cell(s); a master base station and secondary base stations may receive information of SFN and/or subframe offset of each other from OAM and/or via an Xn interface, (e.g. for a purpose of DRX alignment and/or identification of a measurement gap). In an example, when adding a new SCG SCell, dedicated RRC signaling may be used for sending required system information of a cell as for CA, except for a SFN acquired from a MIB of a PSCell of a SCG.

Figure 10:
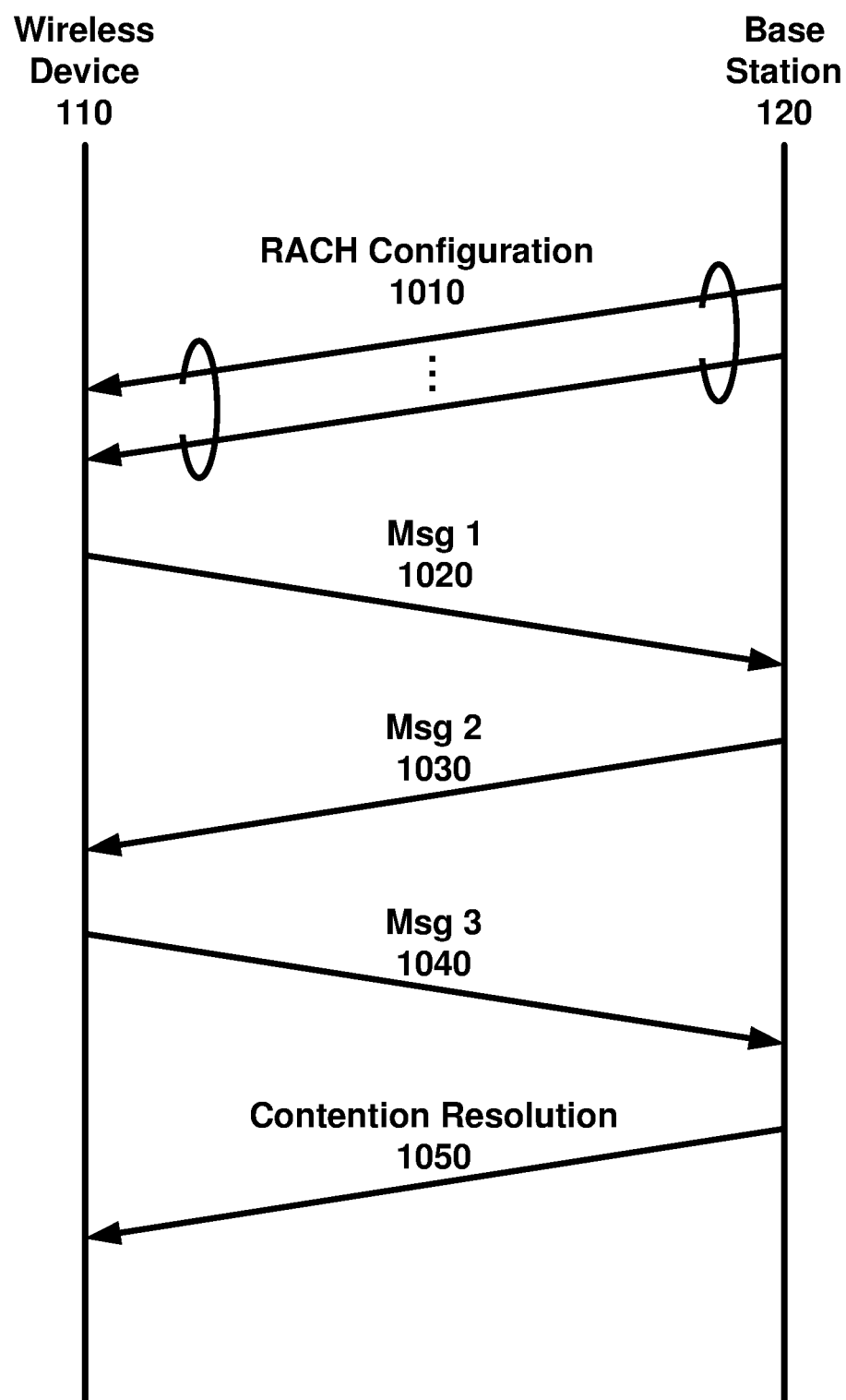
FIG. 10 is a diagram of an example random access procedure as per an aspect of an embodiment of the present disclosure.

FIG. 10 is an example diagram of a random access procedure. One or more events may trigger a random access procedure. For example, one or more events may be at least one of following: initial access from RRC_IDLE, RRC connection re-establishment procedure, handover, DL or UL data arrival during RRC_CONNECTED when UL synchronization status is non-synchronized, transition from RRC_Inactive, and/or request for other system information. For example, a PDCCH order, a MAC entity, and/or a beam failure indication may initiate a random access procedure.

In an example embodiment, a random access procedure may be at least one of a contention based random access procedure and a contention free random access procedure. For example, a contention based random access procedure may comprise, one or more Msg1 1220 transmissions, one or more Msg2 1230 transmissions, one or more Msg3 1240 transmissions, and contention resolution 1250. For example, a contention free random access procedure may comprise one or more Msg1 1220 transmissions and one or more Msg2 1230 transmissions.

In an example, a base station may transmit (e.g., unicast, multicast, or broadcast), to a UE, a RACH configuration 1210 via one or more beams. The RACH configuration 1210 may comprise one or more parameters indicating at least one of following: available set of PRACH resources for a transmission of a random access preamble, initial preamble power (e.g., random access preamble initial received target power), an RSRP threshold for a selection of a SS block and corresponding PRACH resource, a power-ramping factor (e.g., random access preamble power ramping step), random access preamble index, a maximum number of preamble transmission, preamble group A and group B, a threshold (e.g., message size) to determine the groups of random access preambles, a set of one or more random access preambles for system information request and corresponding PRACH resource(s), if any, a set of one or more random access preambles for beam failure recovery request and corresponding PRACH resource(s), if any, a time window to monitor RA response(s), a time window to monitor response(s) on beam failure recovery request, and/or a contention resolution timer.

In an example, the Msg1 1220 may be one or more transmissions of a random access preamble. For a contention based random access procedure, a UE may select a SS block with a RSRP above the RSRP threshold. If random access preambles group B exists, a UE may select one or more random access preambles from a group A or a group B depending on a potential Msg3 1240 size. If a random access preambles group B does not exist, a UE may select the one or more random access preambles from a group A. A UE may select a random access preamble index randomly (e.g. with equal probability or a normal distribution) from one or more random access preambles associated with a selected group. If a base station semi-statistically configures a UE with an association between random access preambles and SS blocks, the UE may select a random access preamble index randomly with equal probability from one or more random access preambles associated with a selected SS block and a selected group.

For example, a UE may initiate a contention free random access procedure based on a beam failure indication from a lower layer. For example, a base station may semi-statistically configure a UE with one or more contention free PRACH resources for beam failure recovery request associated with at least one of SS blocks and/or CSI-RSs. If at least one of SS blocks with a RSRP above a first RSRP threshold amongst associated SS blocks or at least one of CSI-RSs with a RSRP above a second RSRP threshold amongst associated CSI-RSs is available, a UE may select a random access preamble index corresponding to a selected SS block or CSI-RS from a set of one or more random access preambles for beam failure recovery request.

For example, a UE may receive, from a base station, a random access preamble index via PDCCH or RRC for a contention free random access procedure. If a base station does not configure a UE with at least one contention free PRACH resource associated with SS blocks or CSI-RS, the UE may select a random access preamble index. If a base station configures a UE with one or more contention free PRACH resources associated with SS blocks and at least one SS block with a RSRP above a first RSRP threshold amongst associated SS blocks is available, the UE may select the at least one SS block and select a random access preamble corresponding to the at least one SS block. If a base station configures a UE with one or more contention free PRACH resources associated with CSI-RSs and at least one CSI-RS with a RSRP above a second RSPR threshold amongst the associated CSI-RSs is available, the UE may select the at least one CSI-RS and select a random access preamble corresponding to the at least one CSI-RS.

A UE may perform one or more Msg1 1220 transmissions by transmitting the selected random access preamble. For example, if a UE selects an SS block and is configured with an association between one or more PRACH occasions and one or more SS blocks, the UE may determine an PRACH occasion from one or more PRACH occasions corresponding to a selected SS block. For example, if a UE selects a CSI-RS and is configured with an association between one or more PRACH occasions and one or more CSI-RSs, the UE may determine a PRACH occasion from one or more PRACH occasions corresponding to a selected CSI-RS. A UE may transmit, to a base station, a selected random access preamble via a selected PRACH occasions. A UE may determine a transmit power for a transmission of a selected random access preamble at least based on an initial preamble power and a power-ramping factor. A UE may determine a RA-RNTI associated with a selected PRACH occasions in which a selected random access preamble is transmitted. For example, a UE may not determine a RA-RNTI for a beam failure recovery request. A UE may determine an RA-RNTI at least based on an index of a first OFDM symbol and an index of a first slot of a selected PRACH occasions, and/or an uplink carrier index for a transmission of Msg1 1220.

In an example, a UE may receive, from a base station, a random access response, Msg2 1230. A UE may start a time window (e.g., ra-Response Window) to monitor a random access response. For beam failure recovery request, a base station may configure a UE with a different time window (e.g., bfr-ResponseWindow) to monitor response on beam failure recovery request. For example, a UE may start a time window (e.g., ra-Response Window or bfr-ResponseWindow) at a start of a first PDCCH occasion after a fixed duration of one or more symbols from an end of a preamble transmission. If a UE transmits multiple preambles, the UE may start a time window at a start of a first PDCCH occasion after a fixed duration of one or more symbols from an end of a first preamble transmission. A UE may monitor a PDCCH of a cell for at least one random access response identified by a RA-RNTI or for at least one response to beam failure recovery request identified by a C-RNTI while a timer for a time window is running.

In an example, a UE may consider a reception of random access response successful if at least one random access response comprises a random access preamble identifier corresponding to a random access preamble transmitted by the UE. A UE may consider the contention free random access procedure successfully completed if a reception of random access response is successful. If a contention free random access procedure is triggered for a beam failure recovery request, a UE may consider a contention free random access procedure successfully complete if a PDCCH transmission is addressed to a C-RNTI. In an example, if at least one random access response comprises a random access preamble identifier, a UE may consider the random access procedure successfully completed and may indicate a reception of an acknowledgement for a system information request to upper layers. If a UE has signaled multiple preamble transmissions, the UE may stop transmitting remaining preambles (if any) in response to a successful reception of a corresponding random access response.

In an example, a UE may perform one or more Msg3 1240 transmissions in response to a successful reception of random access response (e.g., for a contention based random access procedure). A UE may adjust an uplink transmission timing based on a timing advanced command indicated by a random access response and may transmit one or more transport blocks based on an uplink grant indicated by a random access response. Subcarrier spacing for PUSCH transmission for Msg3 1240 may be provided by at least one higher layer (e.g. RRC) parameter. A UE may transmit a random access preamble via PRACH and Msg3 1240 via PUSCH on a same cell. A base station may indicate an UL BWP for a PUSCH transmission of Msg3 1240 via system information block. A UE may employ HARQ for a retransmission of Msg3 1240.

In an example, multiple UEs may perform Msg1 1220 by transmitting a same preamble to a base station and receive, from the base station, a same random access response comprising an identity (e.g., TC-RNTI). Contention resolution 1250 may ensure that a UE does not incorrectly use an identity of another UE. For example, contention resolution 1250 may be based on C-RNTI on PDCCH or a UE contention resolution identity on DL-SCH. For example, if a base station assigns a C-RNTI to a UE, the UE may perform contention resolution 1250 based on a reception of a PDCCH transmission that is addressed to the C-RNTI. In response to detection of a C-RNTI on a PDCCH, a UE may consider contention resolution 1250 successful and may consider a random access procedure successfully completed. If a UE has no valid C-RNTI, a contention resolution may be addressed by employing a TC-RNTI. For example, if a MAC PDU is successfully decoded and a MAC PDU comprises a UE contention resolution identity MAC CE that matches the CCCH SDU transmitted in Msg3 1250, a UE may consider the contention resolution 1250 successful and may consider the random access procedure successfully completed.

Figure 11:
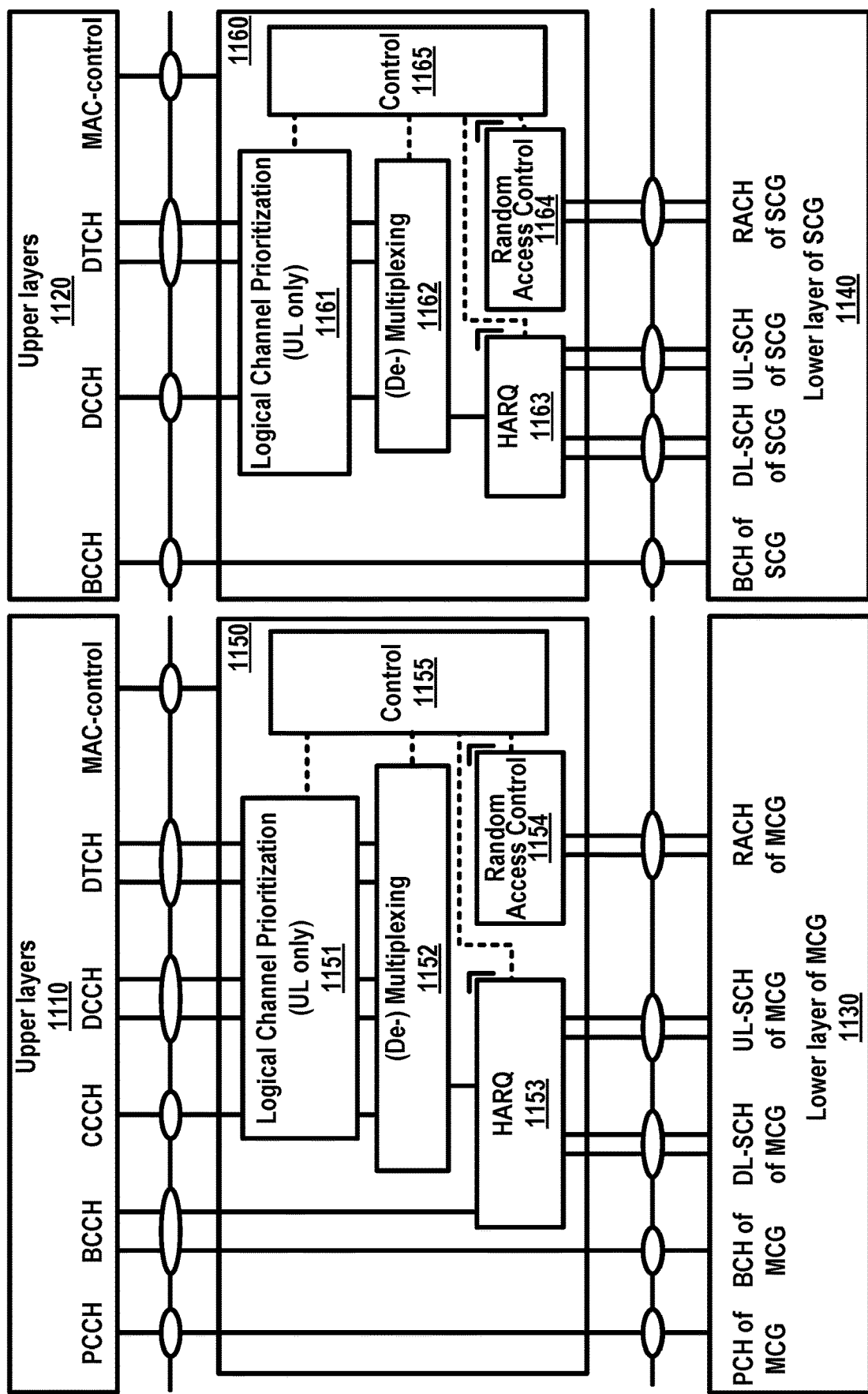
FIG. 11 is a structure of example MAC entities as per an aspect of an embodiment of the present disclosure.
Figure 13:
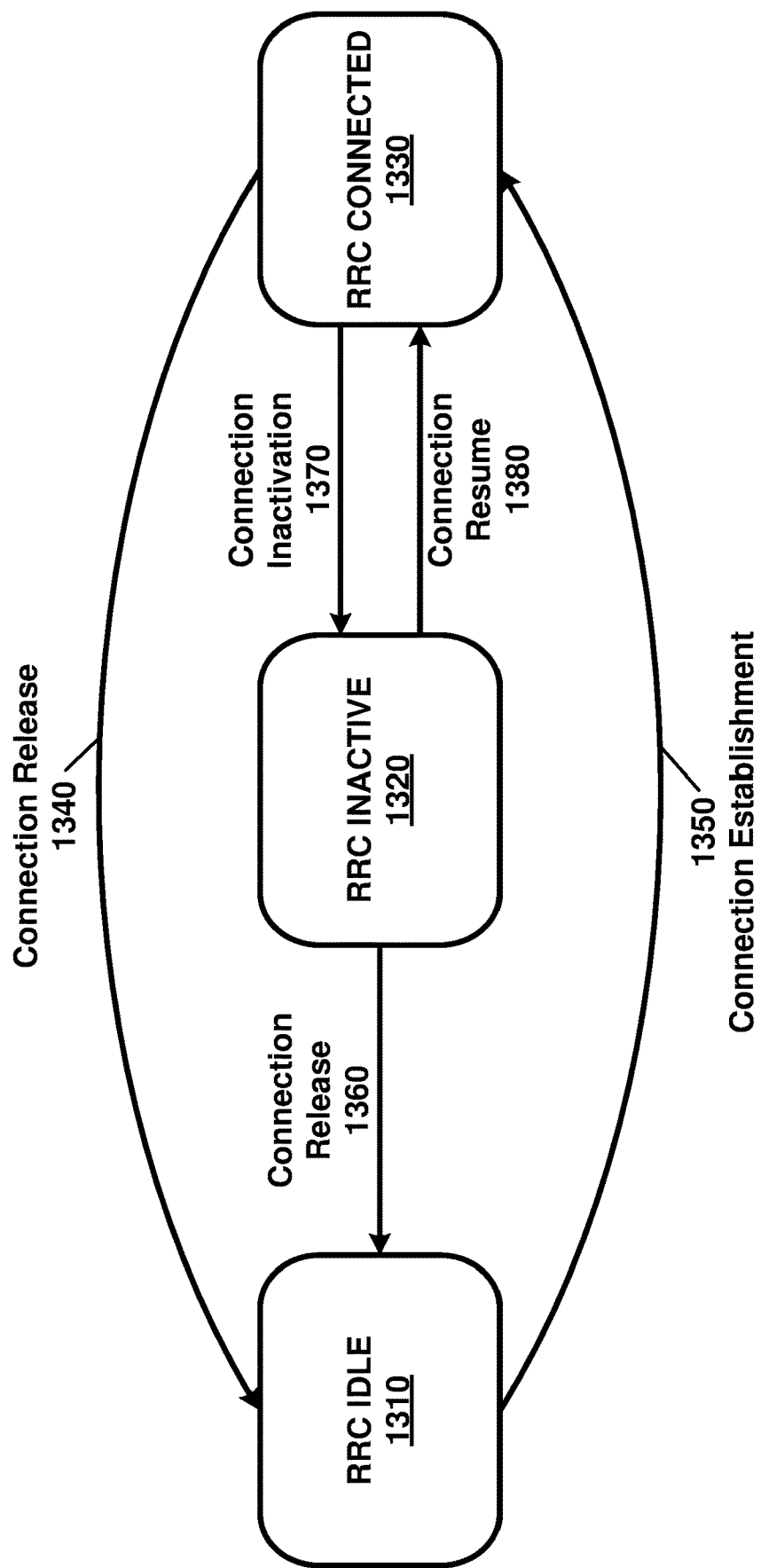
FIG. 13 is a diagram of example RRC states as per an aspect of an embodiment of the present disclosure.

FIG. 11 is an example structure for MAC entities as per an aspect of an embodiment. In an example, a wireless device may be configured to operate in a multi-connectivity mode. A wireless device in RRC_CONNECTED with multiple RX/TX may be configured to utilize radio resources provided by multiple schedulers located in a plurality of base stations. The plurality of base stations may be connected via a non-ideal or ideal backhaul over the Xn interface. In an example, a base station in a plurality of base stations may act as a master base station or as a secondary base station. A wireless device may be connected to one master base station and one or more secondary base stations. A wireless device may be configured with multiple MAC entities, e.g. one MAC entity for master base station, and one or more other MAC entities for secondary base station(s). In an example, a configured set of serving cells for a wireless device may comprise two subsets: an MCG comprising serving cells of a master base station, and one or more SCGs comprising serving cells of a secondary base station(s). FIG. 13 illustrates an example structure for MAC entities when MCG and SCG are configured for a wireless device.

In an example, at least one cell in a SCG may have a configured UL CC, wherein a cell of at least one cell may be called PSCell or PCell of SCG, or sometimes may be simply called PCell. A PSCell may be configured with PUCCH resources. In an example, when a SCG is configured, there may be at least one SCG bearer or one split bearer. In an example, upon detection of a physical layer problem or a random access problem on a PSCell, or upon reaching a number of RLC retransmissions associated with the SCG, or upon detection of an access problem on a PSCell during a SCG addition or a SCG change: an RRC connection re-establishment procedure may not be triggered, UL transmissions towards cells of an SCG may be stopped, a master base station may be informed by a UE of a SCG failure type and DL data transfer over a master base station may be maintained.

In an example, a MAC sublayer may provide services such as data transfer and radio resource allocation to upper layers (e.g. 1310 or 1320). A MAC sublayer may comprise a plurality of MAC entities (e.g. 1350 and 1360). A MAC sublayer may provide data transfer services on logical channels. To accommodate different kinds of data transfer services, multiple types of logical channels may be defined. A logical channel may support transfer of a particular type of information. A logical channel type may be defined by what type of information (e.g., control or data) is transferred. For example, BCCH, PCCH, CCCH and DCCH may be control channels and DTCH may be a traffic channel. In an example, a first MAC entity (e.g. 1310) may provide services on PCCH, BCCH, CCCH, DCCH, DTCH and MAC control elements. In an example, a second MAC entity (e.g. 1320) may provide services on BCCH, DCCH, DTCH and MAC control elements.

A MAC sublayer may expect from a physical layer (e.g. 1330 or 1340) services such as data transfer services, signaling of HARQ feedback, signaling of scheduling request or measurements (e.g. CQI). In an example, in dual connectivity, two MAC entities may be configured for a wireless device: one for MCG and one for SCG. A MAC entity of wireless device may handle a plurality of transport channels. In an example, a first MAC entity may handle first transport channels comprising a PCCH of MCG, a first BCH of MCG, one or more first DL-SCHs of MCG, one or more first UL-SCHs of MCG and one or more first RACHs of MCG. In an example, a second MAC entity may handle second transport channels comprising a second BCH of SCG, one or more second DL-SCHs of SCG, one or more second UL-SCHs of SCG and one or more second RACHs of SCG.

In an example, if a MAC entity is configured with one or more SCells, there may be multiple DL-SCHs and there may be multiple UL-SCHs as well as multiple RACHs per MAC entity. In an example, there may be one DL-SCH and UL-SCH on a SpCell. In an example, there may be one DL-SCH, zero or one UL-SCH and zero or one RACH for an SCell. A DL-SCH may support receptions using different numerologies and/or TTI duration within a MAC entity. A UL-SCH may also support transmissions using different numerologies and/or TTI duration within the MAC entity.

In an example, a MAC sublayer may support different functions and may control these functions with a control (e.g. 1355 or 1365) element. Functions performed by a MAC entity may comprise mapping between logical channels and transport channels (e.g., in uplink or downlink), multiplexing (e.g. 1352 or 1362) of MAC SDUs from one or different logical channels onto transport blocks (TB) to be delivered to the physical layer on transport channels (e.g., in uplink), demultiplexing (e.g. 1352 or 1362) of MAC SDUs to one or different logical channels from transport blocks (TB) delivered from the physical layer on transport channels (e.g., in downlink), scheduling information reporting (e.g., in uplink), error correction through HARQ in uplink or downlink (e.g. 1363), and logical channel prioritization in uplink (e.g. 1351 or 1361). A MAC entity may handle a random access process (e.g. 1354 or 1364).

Figure 12:
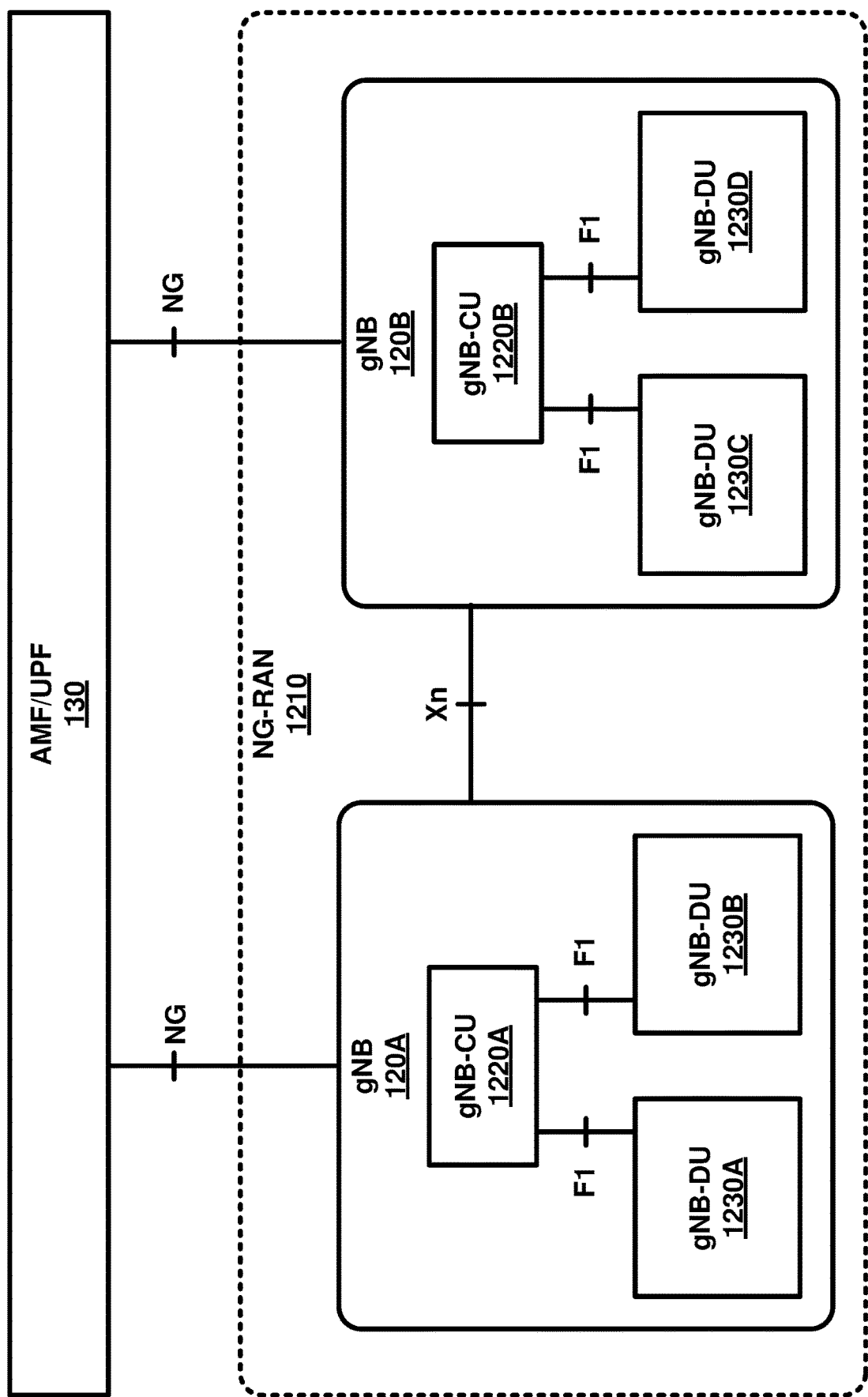
FIG. 12 is a diagram of an example RAN architecture as per an aspect of an embodiment of the present disclosure.

FIG. 12 is an example diagram of a RAN architecture comprising one or more base stations. In an example, a protocol stack (e.g. RRC, SDAP, PDCP, RLC, MAC, and PHY) may be supported at a node. A base station (e.g. 120A or 120B) may comprise a base station central unit (CU) (e.g. gNB-CU 1420A or 1420B) and at least one base station distributed unit (DU) (e.g. gNB-DU 1430A, 1430B, 1430C, or 1430D) if a functional split is configured. Upper protocol layers of a base station may be located in a base station CU, and lower layers of the base station may be located in the base station DUs. An F1 interface (e.g. CU-DU interface) connecting a base station CU and base station DUs may be an ideal or non-ideal backhaul. F1-C may provide a control plane connection over an F1 interface, and F1-U may provide a user plane connection over the F1 interface. In an example, an Xn interface may be configured between base station CUs.

In an example, a base station CU may comprise an RRC function, an SDAP layer, and a PDCP layer, and base station DUs may comprise an RLC layer, a MAC layer, and a PHY layer. In an example, various functional split options between a base station CU and base station DUs may be possible by locating different combinations of upper protocol layers (RAN functions) in a base station CU and different combinations of lower protocol layers (RAN functions) in base station DUs. A functional split may support flexibility to move protocol layers between a base station CU and base station DUs depending on service requirements and/or network environments.

In an example, functional split options may be configured per base station, per base station CU, per base station DU, per UE, per bearer, per slice, or with other granularities. In per base station CU split, a base station CU may have a fixed split option, and base station DUs may be configured to match a split option of a base station CU. In per base station DU split, a base station DU may be configured with a different split option, and a base station CU may provide different split options for different base station DUs. In per UE split, a base station (base station CU and at least one base station DUs) may provide different split options for different wireless devices. In per bearer split, different split options may be utilized for different bearers. In per slice splice, different split options may be applied for different slices.

FIG. 13 is an example diagram showing RRC state transitions of a wireless device. In an example, a wireless device may be in at least one RRC state among an RRC connected state (e.g. RRC Connected 1530, RRC_Connected), an RRC idle state (e.g. RRC Idle 1510, RRC_Idle), and/or an RRC inactive state (e.g. RRC Inactive 1520, RRC_Inactive). In an example, in an RRC connected state, a wireless device may have at least one RRC connection with at least one base station (e.g. gNB and/or eNB), which may have a UE context of the wireless device. A UE context (e.g. a wireless device context) may comprise at least one of an access stratum context, one or more radio link configuration parameters, bearer (e.g. data radio bearer (DRB), signaling radio bearer (SRB), logical channel, QoS flow, PDU session, and/or the like) configuration information, security information, PHY/MAC/RLC/PDCP/SDAP layer configuration information, and/or the like configuration information for a wireless device. In an example, in an RRC idle state, a wireless device may not have an RRC connection with a base station, and a UE context of a wireless device may not be stored in a base station. In an example, in an RRC inactive state, a wireless device may not have an RRC connection with a base station. A UE context of a wireless device may be stored in a base station, which may be called as an anchor base station (e.g. last serving base station).

In an example, a wireless device may transition a UE RRC state between an RRC idle state and an RRC connected state in both ways (e.g. connection release 1540 or connection establishment 1550; or connection reestablishment) and/or between an RRC inactive state and an RRC connected state in both ways (e.g. connection inactivation 1570 or connection resume 1580). In an example, a wireless device may transition its RRC state from an RRC inactive state to an RRC idle state (e.g. connection release 1560).

In an example, an anchor base station may be a base station that may keep a UE context (a wireless device context) of a wireless device at least during a time period that a wireless device stays in a RAN notification area (RNA) of an anchor base station, and/or that a wireless device stays in an RRC inactive state. In an example, an anchor base station may be a base station that a wireless device in an RRC inactive state was lastly connected to in a latest RRC connected state or that a wireless device lastly performed an RNA update procedure in. In an example, an RNA may comprise one or more cells operated by one or more base stations. In an example, a base station may belong to one or more RNAs. In an example, a cell may belong to one or more RNAs.

In an example, a wireless device may transition a UE RRC state from an RRC connected state to an RRC inactive state in a base station. A wireless device may receive RNA information from the base station. RNA information may comprise at least one of an RNA identifier, one or more cell identifiers of one or more cells of an RNA, a base station identifier, an IP address of the base station, an AS context identifier of the wireless device, a resume identifier, and/or the like.

In an example, an anchor base station may broadcast a message (e.g. RAN paging message) to base stations of an RNA to reach to a wireless device in an RRC inactive state, and/or the base stations receiving the message from the anchor base station may broadcast and/or multicast another message (e.g. paging message) to wireless devices in their coverage area, cell coverage area, and/or beam coverage area associated with the RNA through an air interface.

In an example, when a wireless device in an RRC inactive state moves into a new RNA, the wireless device may perform an RNA update (RNAU) procedure, which may comprise a random access procedure by the wireless device and/or a UE context retrieve procedure. A UE context retrieve may comprise: receiving, by a base station from a wireless device, a random access preamble; and fetching, by a base station, a UE context of the wireless device from an old anchor base station. Fetching may comprise: sending a retrieve UE context request message comprising a resume identifier to the old anchor base station and receiving a retrieve UE context response message comprising the UE context of the wireless device from the old anchor base station.

In an example embodiment, a wireless device in an RRC inactive state may select a cell to camp on based on at least a on measurement results for one or more cells, a cell where a wireless device may monitor an RNA paging message and/or a core network paging message from a base station. In an example, a wireless device in an RRC inactive state may select a cell to perform a random access procedure to resume an RRC connection and/or to transmit one or more packets to a base station (e.g. to a network). In an example, if a cell selected belongs to a different RNA from an RNA for a wireless device in an RRC inactive state, the wireless device may initiate a random access procedure to perform an RNA update procedure. In an example, if a wireless device in an RRC inactive state has one or more packets, in a buffer, to transmit to a network, the wireless device may initiate a random access procedure to transmit one or more packets to a base station of a cell that the wireless device selects. A random access procedure may be performed with two messages (e.g. 2 stage random access) and/or four messages (e.g. 4 stage random access) between the wireless device and the base station.

In an example embodiment, a base station receiving one or more uplink packets from a wireless device in an RRC inactive state may fetch a UE context of a wireless device by transmitting a retrieve UE context request message for the wireless device to an anchor base station of the wireless device based on at least one of an AS context identifier, an RNA identifier, a base station identifier, a resume identifier, and/or a cell identifier received from the wireless device. In response to fetching a UE context, a base station may transmit a path switch request for a wireless device to a core network entity (e.g. AMF, MME, and/or the like). A core network entity may update a downlink tunnel endpoint identifier for one or more bearers established for the wireless device between a user plane core network entity (e.g. UPF, S-GW, and/or the like) and a RAN node (e.g. the base station), e.g. changing a downlink tunnel endpoint identifier from an address of the anchor base station to an address of the base station.

A gNB may communicate with a wireless device via a wireless network employing one or more new radio technologies. The one or more radio technologies may comprise at least one of: multiple technologies related to physical layer; multiple technologies related to medium access control layer; and/or multiple technologies related to radio resource control layer. Example embodiments of enhancing the one or more radio technologies may improve performance of a wireless network. Example embodiments may increase the system throughput, or data rate of transmission. Example embodiments may reduce battery consumption of a wireless device. Example embodiments may improve latency of data transmission between a gNB and a wireless device. Example embodiments may improve network coverage of a wireless network. Example embodiments may improve transmission efficiency of a wireless network.

In an example embodiment, a wireless device of the 5G network may stay in at least one RRC state among an RRC connected state, an RRC idle state, and an RRC inactive state. In an example, in an RRC connected state, a wireless device may have at least one RRC connection with at least one base station, which may have a UE context of the wireless device. A UE context (a wireless device context) may comprise at least one of an AS context, a bearer configuration information, a security information, a PDCP configuration information, and/or other configuration information for a wireless device. In an example, in an RRC idle state, a wireless device may not have a RRC connection with a base station, and a UE context of a wireless device may not be stored in a base station. In an example, in an RRC inactive state, a wireless device may not have a RRC connection with a base station, but a UE context of a wireless device may be stored in a base station, which may be called as an anchor base station.

In an example embodiment, a wireless device may transition its RRC state between an RRC idle state and an RRC connected state in both ways, and between an RRC inactive state and an RRC connected state in both ways, and from an RRC inactive state to an RRC idle state in one direction.

In an example embodiment, an anchor base station may be a base station that may keep a UE context (a wireless device context) at least as long as a wireless device associated of the UE context stays in an RNA (RAN notification area) of the anchor base station. In an example, an anchor base station, in a UE specific anchor case, may be a base station that a wireless device in an RRC inactive state was lastly connected to in the latest RRC connected state or that a wireless device lastly performed a RNA update procedure in. In an example, an anchor base station, in a common anchor case, may be a base station determined to keep UE contexts of wireless devices in an RRC inactive state staying in an RNA of the anchor base station. In common anchor case, one or more anchor base stations may exist in an RNA.

In an example embodiment, an RNA may comprise one or more cells operated by one or more base stations. In an example, a base station may belong to one or more RNAs. In an example, a cell may belong to one or more RNAs. In an example, an anchor base station may broadcast a message to base stations in an RNA to reach to a wireless device in an RRC inactive state, and base stations receiving a broadcasted message from an anchor base station may broadcast and/or multicast another message to wireless devices in their coverage area, cell coverage area, and/or beam coverage area associated with the RNA through an air interface. In an example, when a wireless device in an RRC inactive state moves into a new RNA, it may perform an RNA update (RNAU) procedure, which may comprise a random access procedure by the wireless device and/or a UE context retrieve procedure, by a base station receiving a random access preamble message from the wireless device, fetching a UE context of the wireless device from an old anchor base station of an old RNA to a new anchor base station of the new RNA.

In an example embodiment, a wireless device may transition its RRC state from an RRC connected state to an RRC inactive state in a first base station. In an example, the wireless device may receive an RNA information from the first base station. In case that the first base station is an anchor base station for the wireless device (i.e. in a UE specific anchor case or if the first base station is an anchor base station in a common anchor case), the RNA information may comprise at least one of an RNA identifier, a cell identifier, a base station identifier, an IP address of the first base station, and/or an AS context identifier of the wireless device. In case that the first base station is not an anchor base station for the wireless device (i.e. if the first base station is not an anchor base station in a common anchor case), the RNA information may comprise at least one of an RNA identifier, a cell identifier of the first base station, a base station identifier of an anchor base station, an IP address of an anchor base station, and/or an AS context identifier.

In an example, in case that the first base station is an anchor base station for the wireless device, the first base station may keep a UE context of the wireless device at least during a period when the wireless device stays in an RNA associated with the wireless device. In case that the first base station is not an anchor base station for the wireless device, the first base station may transfer one or more elements of a UE context of the wireless device to an anchor base station, and the anchor base station may keep one or more elements of the UE context of the wireless device at least during a period when the wireless device stays in an RNA associated with the wireless device.

In an example embodiment, a wireless device in an RRC inactive state may select a cell where the wireless device receives an RNA paging message and/or a core network paging message from a base station. In an example, a wireless device in an RRC inactive state may select a cell to perform a random access procedure to establish an RRC connection and/or to transmit one or more packets. In an example, if the selected cell belongs to a different RNA than an RNA associated with the wireless device, the wireless device may initiate a random access procedure to perform an RNA update procedure. In an example, if a wireless device in an RRC inactive state has one or more packets, in its buffer, to transmit to the network, the wireless device may initiate a random access procedure to transmit the one or more packets to a base station of a cell that the wireless device selected. The random access procedure may be performed with two messages and/or four messages between the wireless device and the base station. In an example, one or more uplink packets of a wireless device in an RRC inactive state may be PDCP protocol layer packets.

In an example embodiment, one or more uplink packets from a wireless device in an RRC inactive state may be transmitted to a core network entity. In an example, a first base station receiving one or more uplink packets from a wireless device in an RRC inactive state may transmit the one or more uplink packets to an anchor base station of the wireless device based on at least one of an AS context identifier, an RNA identifier, a base station identifier, and/or a cell identifier received from the wireless device. In an example, the anchor base station may transmit the uplink data packets to a core network entity at least based on a UE context retrieved at least based on an AS context identifier and/or a wireless device identifier received from the first base station.

In an example embodiment, a first base station receiving one or more uplink packets from a wireless device in an RRC inactive state may transmit a UE context fetch request for the wireless device to an anchor base station of the wireless device based on at least one of an AS context identifier, an RNA identifier, a base station identifier, and/or a cell identifier received from the wireless device. In an example, the anchor base station may transmit a UE context for the wireless device to the first base station based on at least one of an AS context identifier and/or a wireless device identifier received from the first base station. The first base station receiving the UE context may transmit a path switch request for the wireless device to a core network entity, and the core network entity may update a downlink tunnel endpoint identifier for one or more bearers established for the wireless device between a user plane core network entity and a RAN node, e.g. changing a downlink tunnel endpoint identifier from an address of the anchor base station to an address of the first base station. In an example, the first base station may transmit the one or more uplink packets to the user plane core network entity based on at least one of the UE context and/or the updated one or more bearers between the user plane core network entity and the first base station. In an example, the anchor base station may remove the UE context for the wireless device.

In addition to the CN tracking areas, a UE in RRC_INACTIVE may be tracked on a "RAN based notification area" (called "RAN area" herein) wherein the UE may move freely without notifying the network. Once the UE moves outside the RAN area, it may perform a RAN area update.

As the RAN areas are only applicable to UEs in RRC_INACTIVE, the RAN area updates may be performed with the RRCConnectionResumeRequest message (e.g. the message may be used to transition from RRC_INACTIVE to RRC_CONNECTED) with a causeValue equal to e.g. "ranNotificationAreaUpdateRequest". The motivation for using this message may be that there may be DL data waiting so the network may have the possibility to order the UE to RRC_CONNECTED (and complete the "resume" procedure).

When the network receives the RRCConnectionResumeRequest message, if it finds the UE context, it may relocate the UE context and the CN/RAN connection and then directly may suspend the UE with an updated RAN notification Area using the RRCConnectionSuspend message. If there are DL data for the UE at this point, the network may respond with a RRCConnectionResume message transitioning the UE to RRC_CONNECTED. If there is no UL or DL data, the UE may return to RRC_INACTIVE as soon as possible. The UE may need to be given a new resume Identity when it is suspended to RRC_INACTIVE in order to indicate the new location of the UE context. The UE specific RAN area may be updated with the ranAreaInformation included in the RRCConnectionSuspend message. The ranAreaInformation may either indicate the entire new RAN area using a list of cells, or use delta-signalling to inform which cells may be added/removed from the RAN area. In addition, the ranAreaInformation may also indicate whether the UE may use its old RAN area, or if the RAN area may consist of the UE's TAI-list.

Since the UE may be assigned with a new RAN area and a new Resume ID (resume identity) when the connection is suspended it may be important that the RRCConnectionSuspend message may be encrypted and integrity protected. In LTE, this may be achieved by providing the UE with the Next Hop Chaining Counter (NCC) in the RRCConnectionSetup message and transition into RRC_CONNECTED where security may be enabled. In order to optimize the RAN area update procedure, and allow the UE to be directly suspended to RRC_INACTIVE as a response to the RRCConnectionResumeRequest, it may be necessary that the UE may have already derived the encryption keys at MSG3. This may be achieved by providing the UE with the NCC already in the RRCConnectionSuspend message. This may also allow for integrity protection of the RRCConnectionResumeRequest.

In addition, there may be cases where the RAN cannot retrieve the old UE context, e.g. if it is lost or discarded, or resides in a gNB from which it cannot fetch the context. In this case, it may not be possible to complete the RAN area update without first re-building the RAN context.

In that case, when the UE transmit the RRCConnectionResumeRequest message, the RAN may respond with a RRCConnectionSetup which may trigger the UE to initiate NAS level procedure causing the CN to rebuild the UE context in the RAN. Since the RAN may be aware that the UE wanted to perform a RAN notification area update, and that there may be no UL or DL data available, it may quickly re-suspend the UE to RRC_INACTIVE once the AS context has been rebuilt as can be seen in FIG. 3.

If the RAN decides that the UE may not be re-suspended to RRC_INACTIVE after the RAN Notification Area Update, it may respond with a RRCConnectionReject which may cause the UE to transition to RRC_IDLE. Additional signalling may be needed on the network side to trigger the removal of the RAN context.

In LTE, a UE in RRC_IDLE may perform periodic TAU (Tracking Area Update) when the TA update timer (T3412) expires in order for the CN to ascertain the UE location on a Tracking Area level and to check if UE is still attached to the network. For instance, if a UE is turned off, the absence of a periodic TAU may indicate to the CN that the UE may no longer inside the attached and that the network context may be removed. In RRC_CONNECTED, there may no need to perform the periodic TAU as the network may know the UE location on a cell level and it may be the responsibility of the RAN layer to ensure UE is still connected. For RRC_INACTIVE, the motivation to perform periodic area updates may remain the same as for periodic TAUs in RRC_IDLE, i.e. the network may need to be able to ascertain that a UE may not disappeared from the network, without informing the network (e.g. power off). The UE in an RRC inactive state may perform periodic TAU, RAN area updates, or both.

As the periodic area updates are mainly intended to inform the network that the UE may remain in the same area as before, this signalling may be performed as lightweight as possible. If a periodic TAU is performed from RRC_INACTIVE, the UE may enter RRC_CONNECTED to transmit the NAS message "TAU Request" and may await the NAS message "TAU Accept" from the CN before it may return to RRC_INACTIVE. On the other hand, a successful periodic RAN area update may consist of a RRCConnectionResumeRequest message with e.g. a causeValue "ranNotificationAreaUpdateRequest". If the periodic RAN area update is performed in same gNB as the UE may have been suspended in, the UE context may be already available in the gNB and the UE may directly be suspended to RRC_INACTIVE. The RRCConnectionSuspend message from the gNB may contain a new resumeId (resume identity), a "ranAreaInformation" (e.g. a cell list, or an indication to use the old RAN area, or an indication to use the TA-list as RAN area), as well as the Next Hop Chaining Counter (NCC). The new Resume ID (resume identity) may indicate the updated UE context, the RAN area information may ensure that the UE may maintain an up-to-date RAN area, while the NCC may ensure that the UE can resume the connection with encryption enabled already in message three of random access procedure, even in a different gNB.

If the UE resumes the connection in another gNB inside the RAN area, the UE context may be fetched from the old gNB using similar procedure as for RAN area updates based on mobility. In addition, the RAN may decide to release the UE to RRC_IDLE during the periodic RAN area update, e.g. if it may have performed multiple periodic RAN area updates within the same area without any UP activity. If the UE resumes the connection in the old gNB, the RAN may respond to the RRCConnectionResumeRequest with a RRCConnectionRelease as seen in FIG. 5. When the RAN releases the UE context, it may be necessary to inform the CN so that the it can release the CN context and/or the UE context stored in another gNB.

The periodic TA update timer (T3412) may be set by the CN and may have a default value of 54 minutes in LTE. However, in some cases as the RAN may want to have a different periodicity of the periodic location update than the periodic TAU. Therefore, the RAN may be able to configure an independent timer for the RAN area updates. If the periodic RAN area update fails, e.g. if the UE context cannot be retrieved, the RAN may decide to respond with a or RRCConnectionSetup to transition the UE to RRC_CONNECTED so that the CN is also updated as can be seen in FIG. 6. Updating the CN may be important in case the CN thinks the UE may be in RRC_IDLE and may have started the periodic TAU timer.

As the RAN area update may be more lightweight than the TAU, a UE may only perform periodic RAN area updates in RRC_INACTIVE.

Example of Inactive State Data Forwarding

In an existing RAN paging procedure, base stations exchanges backhaul signaling to transmit a downlink packets to a wireless device in an RRC inactive state. An anchor base station may transmit paging messages via its cells and/or to its neighboring base stations of a RAN notification area associated with the wireless device. Implementation of existing backhaul signaling when a RAN paging procedure is failed may result in increased packet loss rate and/or increased call drop rate due to inefficient packet forwarding to the wireless device. A failure of a RAN paging procedure may introduce a need for further enhancement in communication among network nodes (e.g. base stations, core network entity, wireless device). In an example, failure rate in receiving downlink user plane or control plane packets (e.g. data packets, NAS/RRC signaling packets) may increase for RRC inactive state wireless devices. Increased packet loss rate may degrade network system reliability. There is a need to improve backhaul signaling mechanism for RRC inactive state wireless devices. Example embodiments enhance information exchange among network nodes to improve network communication reliability when a wireless device is in an RRC inactive state or an RRC idle state. Example may enhance signaling procedures when a RAN paging procedure is failed. In an existing network signaling, when a RAN paging procedure initiated for packet transmissions is failed, an anchor base station may discard packets received from a core network entity.

Figure 14:
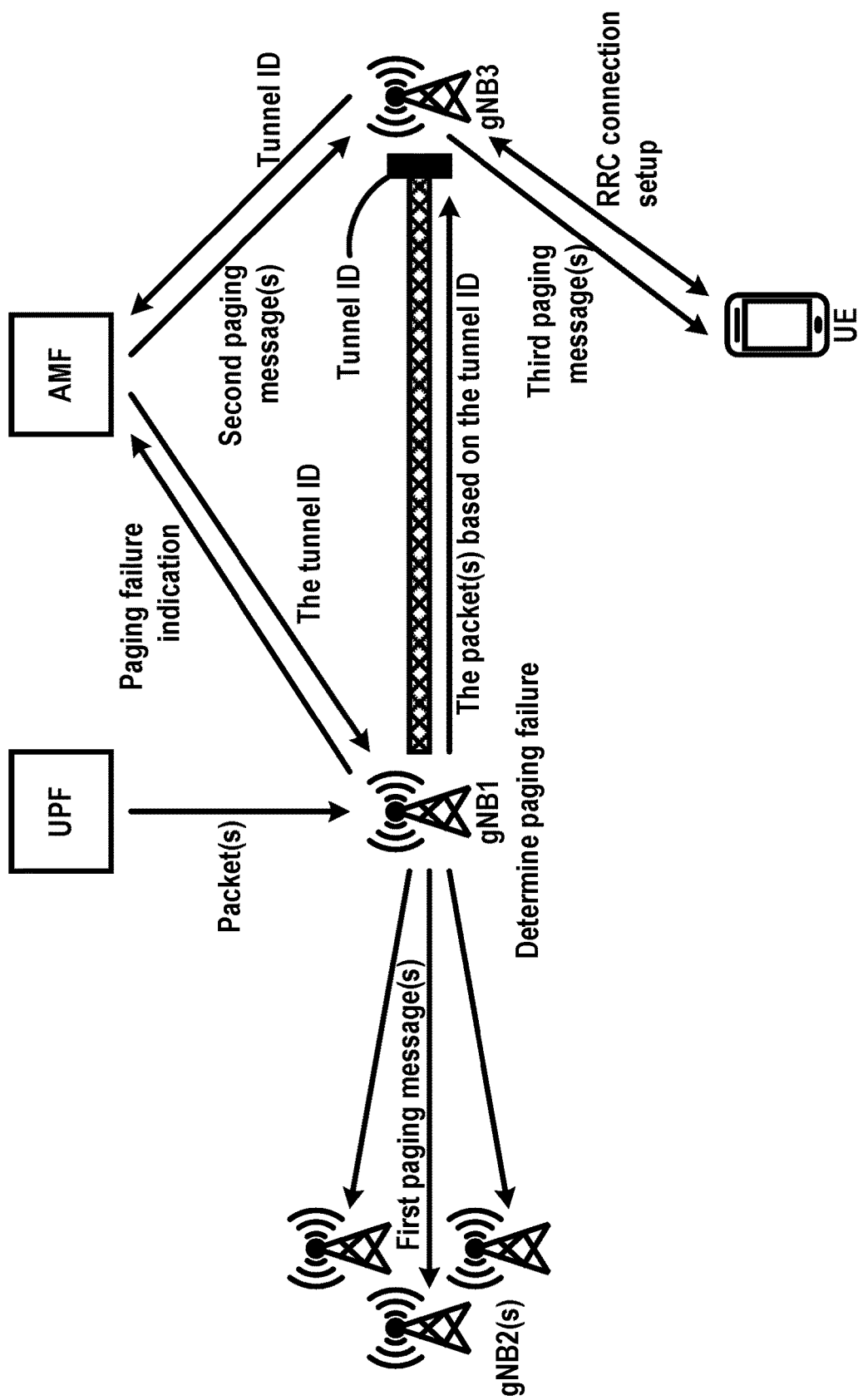
FIG. 14 is an example diagram as per an aspect of an embodiment of the present disclosure.
Figure 15:
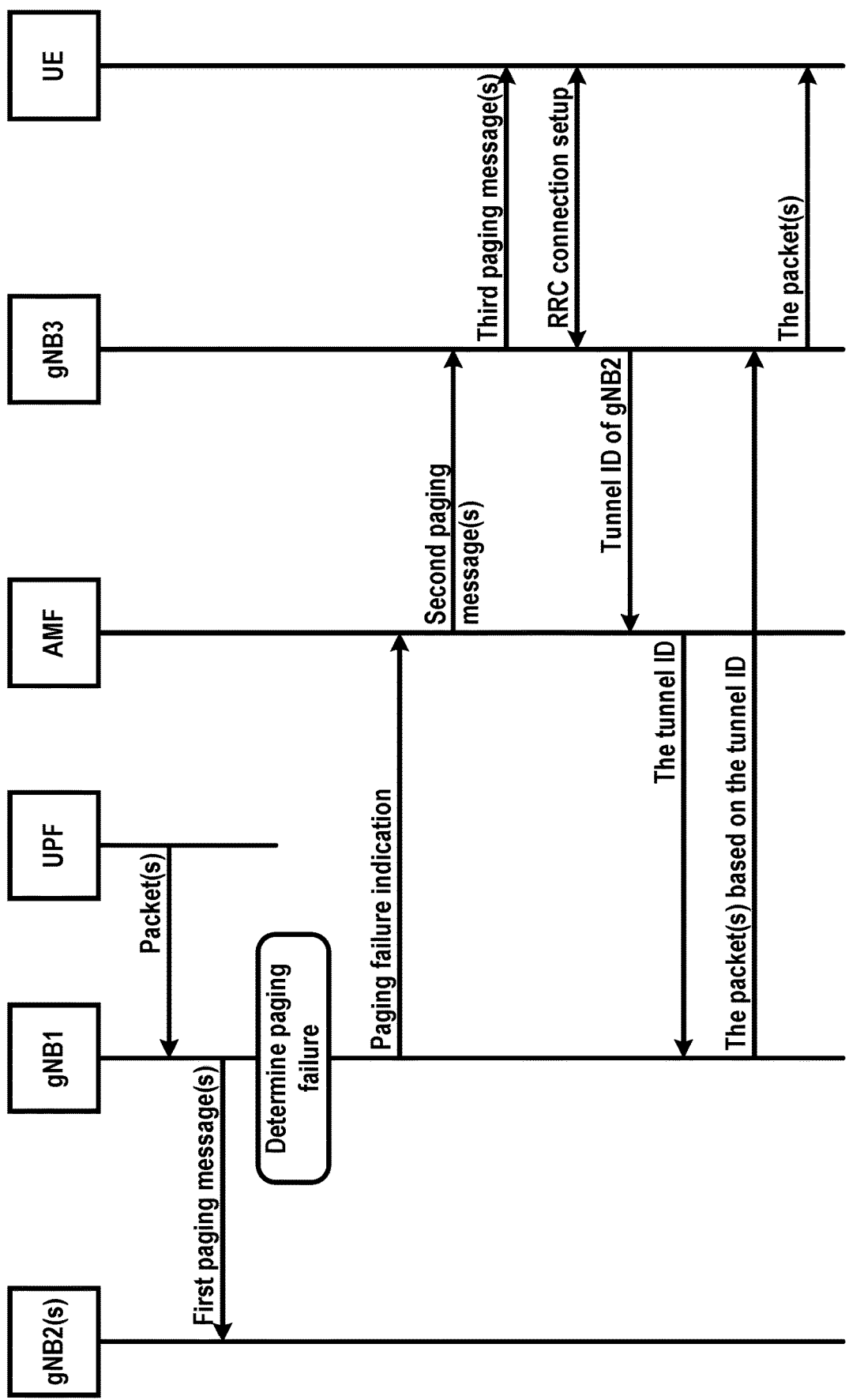
FIG. 15 is an example flow diagram as per an aspect of an embodiment of the present disclosure.

In an example embodiment as shown in FIG. 14 and FIG. 15, when receiving packets for a wireless device (e.g. UE) in an RRC inactive state from a user plane core network entity (e.g. UPF), a first base station (e.g. gNB) may initiate a RAN paging procedure by transmitting one or more first paging messages to one or more second base stations. If the first base station fails in the RAN paging procedure, the first base station may transmit a paging failure indication to a control plane core network entity (e.g. AMF). The core network entity may initiate a core network paging (e.g. tracking area based paging procedure) for the wireless device. A third base station may receive a response from the wireless device for the core network paging procedure, and the third base station may send a tunnel endpoint identifier (e.g. IP address) of the third base station to the first base station, for example, via the core network entity. The first base station may transmit the packets received from the user plane core network entity to the third base station based on the tunnel endpoint identifier.

Example embodiments may enhance system reliability by enabling network nodes to share tunnel information for packet forwarding to a wireless device when a RAN paging procedure is failed. Example embodiments may enable network nodes to reduce packet loss rate or call drop rate for an RRC inactive and/or idle state wireless device in RAN paging failure cases.

In an example, a first base station may receive, from a first core network entity, one or more packets for a wireless device in a radio resource control (RRC) inactive state. The first base station may be an anchor base station of the wireless device, and/or a base station that initiated a state transition of the wireless device to an RRC inactive state. The first base station may keep a UE context of the wireless device. The UE context may comprise at least one of PDU session configurations, security configurations, radio bearer configurations, logical channel configurations, resume identifier associated with the RRC inactive state, RAN notification area information (e.g. a RAN area identifier, a cell identifier, a base station identifier of a RAN notification area of the wireless device). The first core network entity may comprise a user-plane core network entity (e.g. UPF), a control-plane core network entity (e.g. AMF), and/or an application server when the first base station employs a base station-core network collocated structure (e.g. selected IP traffic offload, SIPTO). The one or more packets may comprise downlink data packets for an RRC inactive state wireless device. In an example, the downlink data packets may be associated with a certain service, e.g. a vehicle communication downlink packet transmission, an ultra reliable low latency (URLLC) service, machine type communication (MTC) services, and/or the like. The one or more packets may comprise control signaling packets, for example, one or more NAS layer messages transmitted by the AMF.

In an example, the first base station may initiate a RAN paging procedure comprising sending at least one RAN paging message to at least one second base station. The at least one RAN paging message may comprise a first identifier of the wireless device. The RAN paging procedure may be initiated to page the wireless device being in the RRC inactive state for forwarding the one or more packets received from the first core network entity. The at least one paging message may comprise at least one of a UE identifier of the wireless device, a UE paging identifier associated with the RAN paging procedure for the wireless device, a paging DRX information for transmission of radio paging indication to the wireless device (e.g. the at least one second base station may transmit a paging message via a radio interface based on the paging DRX information indicating when the wireless device monitors radio signaling), RAN paging area information of a RAN paging area (e.g. RAN notification area, RAN area identifiers, cell identifiers associated with the RAN paging procedure), a RAN paging priority, and/or the like.

In an example, the at least one second base station may serve at least one cell associated with the RAN paging area (e.g. RAN notification area(s), RAN area(s), cell(s)). In an example, when the at least one second base station receives the at least one RAN paging message, the at least one second base station may transmit/broadcast/multicast one or more paging indications via one or more cells associated with the RAN paging area (e.g. RAN notification area(s), RAN area(s), cell(s)) for the wireless device. The one or more paging indications may be transmitted via one or more beams of the one or more cells. In an example, the first base station may transmit the at least one RAN paging message (e.g. RRC paging indication) via its one or more serving cells associated with the RAN paging area of the wireless device In an example, the first base station may determine a failure of the RAN paging procedure in response to not receiving a response of the at least one RAN paging message. In an example, the first base station may determine the failure based on no response for the at least one RAN paging message within a certain time period. When the first base station receives a message indicating a UE context retrieve request for the wireless device from at least one of the at least one second base station in response to the at least one RAN paging message, the first base station may consider the RAN paging procedure is successful (e.g. not failed). When the first base station receives a random access preamble and/or a RRC connection resume request message from the wireless device in response to the at least one RAN paging message, the first base station may consider the RAN paging procedure is successful (e.g. not failed).

In an example, the first base station may send, to a second core network entity, a first message in response to the failure of the RAN paging procedure. In an example, the second core network entity may be a control plane core network entity (e.g. AMF). The first message, for example, may comprise a UE context release request message and/or a RAN paging failure indication message. In an example, the first message may indicate a RAN paging failure for the wireless device. In an example, the first message may be a UE context release request message comprising a cause information element indicating that a reason of a UE context release request comprises a failure of a RAN paging procedure for the wireless device.

In an example, the second core network entity may transmit, to one or more base stations of a tracking area of the wireless device, one or more core network paging messages (e.g. tracking area paging message) in response to the first message. The one or more base station may comprise a third base station. The third message may transmit paging messages via one or more serving cells of the tracking area, and may receive a response for at least one of the paging message from the wireless device. The response may comprise a random access preamble and/or a RRC connection request/resume message.

In an example, the one or more core network paging messages and/or the paging messages may comprise an indication parameter indicating that the wireless device is in an RRC inactive state or that a RAN paging procedure for the wireless device was failed. In an example, the one or more core network paging messages and/or the paging messages may comprise an indication parameter indicating that an anchor base station (e.g. the first base station) has a UE context of the wireless device. In an example, the indication parameter may comprise a resume identifier (ID) of the wireless device for the RRC inactive state. In response to receiving the response from the wireless device, the third base station may transmit a tunnel endpoint identifier (e.g. tunnel identifier) of a tunnel for data forwarding to the second core network entity. The data forwarding may comprise transmitting the one or more packets from the first base station to the third base station. The tunnel endpoint identifier may comprise an IP address of the third base station. The tunnel may comprise a logical IP tunneling between the first base station and the third base station. The transmitting of the tunnel endpoint identifier may be based on the indication parameter (of the one or more core network paging messages) indicating that an anchor base station (e.g. the first base station) has a UE context of the wireless device.

In an example, the first base station may receive, from the second core network entity and in response to the first message, a second message comprising the tunnel endpoint identifier of the third base station for forwarding the one or more packets. In an example, the second message may comprise a UE context release request complete message (e.g. a response message for the UE context release request message) and/or a path switch message.

In an example, the first base station may send, to the third base station, the one or more packets based on the tunnel endpoint identifier. The third base station may forward the one or more packets to the wireless device via a radio interface. In an example, the sending of the one or more packets from the first base station to the third base station may employ a GTP-U protocol. In an example, the first base station may send a packet sequence number (e.g. PDCP packet sequence number) for a packet reordering at the third base station and/or at the wireless device.

In an example embodiment, the first base station may forward the one or more packets to a new serving base station (e.g. the third base station) of the wireless device when the RAN paging procedure for transmission of the one or more packets is failed. The example embodiment may enhance transmission reliability of packets (e.g. data packets and/or control plane packets, NAS messages) for an RRC inactive state wireless device and/or an RRC idle state wireless device by enabling forwarding downlink packets received by an anchor base station to a new serving base station.

In an example embodiment, there is a need to implement processes for transmitting downlink packets to a wireless device in an RRC inactive state when RAN paging process fails. Example embodiments describe how a base station initiates a core network paging procedure and forwards downlink packets to a new base station that receives a response to a paging message of the core network paging procedure from the wireless device when the base station fails to complete an RNA paging procedure for downlink packets.

In an example, there may be two potential options to transmit one or more downlink packets to a wireless device in an RRC inactive state: paging in an RNA along with the wireless device (OPTION1), and/or transmitting after the wireless device is located (OPTION2). OPTION1 benefit from lower latency at the cost of more radio resource since data is transmitted in all cells in RNA. From the power consumption point of view, other wireless devices in RRC inactive state in the same paging occasion may have to decode more data to check if it is the target UE. As for OPTION2: The anchor gNB (base station) with connection to the CN should initiate paging in the whole RAN based area. The one or more downlink packets may be only transmitted after UE response to save air resources.

In legacy LTE, UE may send paging response via random access procedure carrying RRC messages (RRC request/RRC resume) to identification and initiate protocol setup/resume, as FIG. 7 illustrated.

In legacy system, 4 steps RA may be needed to identify the UE identity and RRC messages may be involved as well. For small data transmitting case, legacy procedure may be not efficient in terms of signalling overhead and latency. In this case, RRC messages may be used for 3 main reasons: 1). UE resolution. 2). Configure related parameters/protocols 3) state transit to Connected for better scheduling data. Since UE in inactive state has already stored AS contexts and DL data packet size is limited, while UE resolution can be handled by other schemes, direct small data transmitting without RRC message involvement may be possible for inactive state. For example, as illustrated in FIG. 8, such procedure may significantly reduce signalling overhead and latency.

In an example, paging may carry the message indicating direct small data transmission in inactive other than state transition which may make difference on UE behaviors. A UE receiving the paging may send UE ID on pre-configured contention based resources (e.g. grant free/preamble+UE ID, wherein UE ID used here may be valid at least in RAN notification area). The gNB receiving may confirm the UE location upon the reception of UE ID, and then, if needed, may fetch the UE context and schedule DL data transmission on a pre-configured receiving window along with UL grant for ACK. Latency may be further reduced by forwarding UE context along with paging message on Xn interface. Acknowledgement may be sent using UL grant received.

If the UE position is known at cell level, direct DL transmission without paging may be considered. Since the UE may be monitoring paging, one possibility may be to schedule data transmission with unique UE ID directly during a UE paging occasion. UE ID may be S-TMSI/long UE ID valid in RAN notification area or C-RNTI in INACTIVE state. If DL data is scheduled based on common RNTI and long UE ID is indicated in MAC CE then other INACTVE UEs receiving the data may need to further check long UE ID, it may require more potential power consumption. If there is valid C_RNTI then C-RNTI may be preferred which may be similar as UMTS CELL_FACH.

Upon data reception, the UE may need to send feedback to RAN side. The data transmission may include an indication whether the UE continues monitor PDCCH for subsequent data reception or not. If the UE does not monitor PDCCH subsequently, the network may wait until the next paging occasion to send data.

Using UL based mobility, the network may have enough information so that, instead of paging the UE in one or multiple cell, a dedicated transmission to the UE may be possible, even using beam forming, which greatly may enhance transmission efficiency.

For a UE with DL based mobility, i.e. cell reselection, the time interval since last interaction between the UE and the network may be considered. If interactions are frequent, e.g. when DL acknowledgement arrives soon after UL transmission, the network may assume that the UE is still camping on the same cell. DL data may be forwarded directly to this cell to be transmitted. If ACK is not received, then the network may forward the information to its neighbors or start paging.

In an example, when a wireless device is in an RRC inactive state, a core network entity may transmit downlink packets for the wireless device to an anchor base station, which has a wireless device context of the wireless device, and the anchor base station may initiate an RNA paging procedure to forward the downlink packets. In an example, the downlink packets may require an RRC connected state of the wireless device, and/or may be transmitted to the wireless device staying in the RRC inactive state. The RNA paging procedure may comprise transmitting a first RNA paging message to a plurality of base stations belonging to an RNA associated with the wireless device by the anchor base station and/or broadcasting a second RNA paging message via a radio interface by base stations that receives the first RNA paging message. In an example, if the wireless device receives the second RNA paging message, it may transmit a first RNA paging response to the base station that transmitted the second RNA paging message. After receiving the first RNA paging response, the base station may transmit a second RNA paging response to the anchor base station.

In an example, the first RNA paging message may comprise at least one of an RNA identifier, an AS context identifier, a wireless device identifier, and/or a reason of the RNA paging. A base station receiving the first RNA message may broadcast/multicast the second RNA paging message in one or more beam coverage area and/or in one or more cell coverage area at least based on the RNA identifier. In an example, the second RNA paging message may comprise at least one of an AS context identifier, a wireless device identifier, and/or a reason of the RNA paging. The wireless device, which is a target of the RNA paging, may recognize the second RNA paging message based on at least one of the AS context identifier and/or a wireless device identifier, and may perform a random access procedure to transmit the first RNA paging response at least based on the reason of the RNA paging, wherein the random access procedure may be one of a 2-stage random access and/or a 4-stage random access. In an example, the first RNA paging response may comprise an RRC connection request. In an example, the second RNA paging response may comprise a wireless device context fetch request.

In an example, if an anchor base station does not receive a second RNA paging response after initiating an RNA paging procedure for downlink packets, the anchor base station may transmit a core network paging request message to a core network entity. The core network paging request message may be configured to initiate a core network paging procedure by the core network entity. The core network paging procedure may comprise transmitting a first core network paging message to a plurality of base stations belonging to a tracking area associated with the wireless device by the core network entity and/or broadcasting/multicasting a second core network paging message via a radio interface by base stations that receives the first core network paging message. In an example, if the wireless device receives the second core network paging message, it may transmit a first core network paging response to the base station that transmitted the first core network paging message. In an example, the first core network paging response may be one of messages of a 2-stage random access and/or a 4-stage random access procedure. In an example, the first core network paging response may comprise an RRC connection request.

In an example, the first core network paging message may comprise a base station identifier of the anchor base station. A first base station receiving a first core network paging response may determine whether there is a direct interface (e.g. Xn interface) between the anchor base station and the first base station at least based on the base station identifier of the anchor base station.

In an example, the first base station in response to receiving the first core network paging response may transmit a tunnel endpoint identifier of the first base station to a core network entity, and the core network entity may forward the tunnel endpoint identifier of the first base station to the anchor base station. In an example, the anchor base station may forward one or more downlink packets for the wireless device to the first base station at least based on the tunnel endpoint identifier of the first base station. In an example, the first base station may forward the one or more downlink packets to the wireless device via a radio signaling. In an example, the radio signaling may be one or more messages of a random access procedure, and/or may be a packet transmission through a radio bearer established between the first base station and the wireless device in an RRC connected state.

In an example, the first base station may transmit a tunnel endpoint identifier of the first base station to the anchor base station, and the anchor base station may forward one or more downlink packets for the wireless device to the first base station at least based on the tunnel endpoint identifier. In an example, the first base station may forward the one or more downlink packets to the wireless device via a radio signaling. In an example, the radio signaling may be one or more messages of a random access procedure, and/or may be a packet transmission through a radio bearer established between the first base station and the wireless device in an RRC connected state.

In an example, the first base station may transmit a first tunnel endpoint identifier of the first base station to the core network entity, and the core network entity may transmit a second tunnel endpoint identifier of a user plane core network entity to the anchor base station. In an example, the anchor base station may forward one or more downlink packets for the wireless device to the user plane core network entity at least based on the second tunnel endpoint identifier, and the user plane core network entity may forward the one or more downlink packets to the first base station at least based on the first tunnel endpoint identifier received from the core network entity. In an example, the first base station may forward the one or more downlink packets to the wireless device via a radio signaling. In an example, the radio signaling may be one or more messages of a random access procedure, and/or may be a packet transmission through a radio bearer established between the first base station and the wireless device in an RRC connected state.

In an example, the tunnel endpoint identifier of the first base station may be an IP address of the first base station, and the tunnel endpoint identifier of the user plane core network entity may be an IP address of the user plane core network entity.

In an example, the first base station in response to receiving the first core network paging response may transmit a wireless device context request message to the anchor base station via an Xn interface, and the anchor base station may transmit a wireless device context to the first base station. In an example, the first base station in response to receiving the first core network paging response may transmit a wireless device context request message to an anchor base station indirectly through a core network entity, and the anchor base station may transmit a wireless device context to the first base station through the core network entity.

In an example, a base station may receive, from a first network entity, one or more packets for a wireless device in RRC inactive state. The first base station may perform an RNA paging procedure, comprising transmitting to one or more second base stations a first message. The first message may comprise an identifier of the wireless device. The first base station may determine that the RNA procedure is unsuccessful. The first base station may transmit, to a second network entity and in response to the determining that that the RNA paging procedure is unsuccessful, a second message, wherein the second message initiates a core network paging procedure. The first base station may receive a third message indicating a data forwarding procedure in response to the core network paging procedure determining that the wireless device may be in the coverage area of a second base station. The first base station may forward the one or more packets to the second base station. In an example, the first network entity may be the second network entity.

In an example, the forwarding, by the first base station to the second base station, may employs a direct tunnel between the first base station and the second base station, and/or may transmit the one or more packets to a core network node. The first base station may transmit a PDCP sequence number of one of the one or more downlink data packets. The second message may comprise the PDCP sequence number.

Example of Radio Access Network Area Information

In an example embodiment, an issue with respect to exchanging an RNA information between base stations is how a base station gets an RNA information of its neighbor cells or its neighbor base stations and employs the information when the base station initiates a RNA paging procedure for a wireless device in an RRC inactive state.

In an existing RAN paging procedure, a base station may configure a wireless device with one or more RAN area (e.g. RAN notification area, RAN paging area, one or more cells associated with the RAN area) for an RRC inactive state. The base station may initiate a RAN paging procedure when the base station has packets, control signaling, and/or state transition cause for the wireless device by transmitting a RAN paging message to one or more base stations. The wireless device in the RRC inactive state may receive paging indications from the one or more base stations and/or from the base station based on the one or more RAN areas. Implementation of existing signaling when paging an RRC inactive state wireless device may result in increased network resource utilization, increased paging delay, increased packet loss rate, and/or increased call drop rate due to inefficient paging procedure for a wireless device in an RRC inactive state. An existing RAN area coordination may need further enhancements in communication among network nodes (e.g. base stations, core network entity, wireless device). In an example, failure rate in transmitting a RAN paging message (e.g. for data packets, NAS/RRC signaling packets) may increase for RRC inactive state wireless devices. Increased RAN paging failure rate may degrade network system reliability. There is a need to improve backhaul signaling for RRC inactive state wireless devices.

Figure 16:
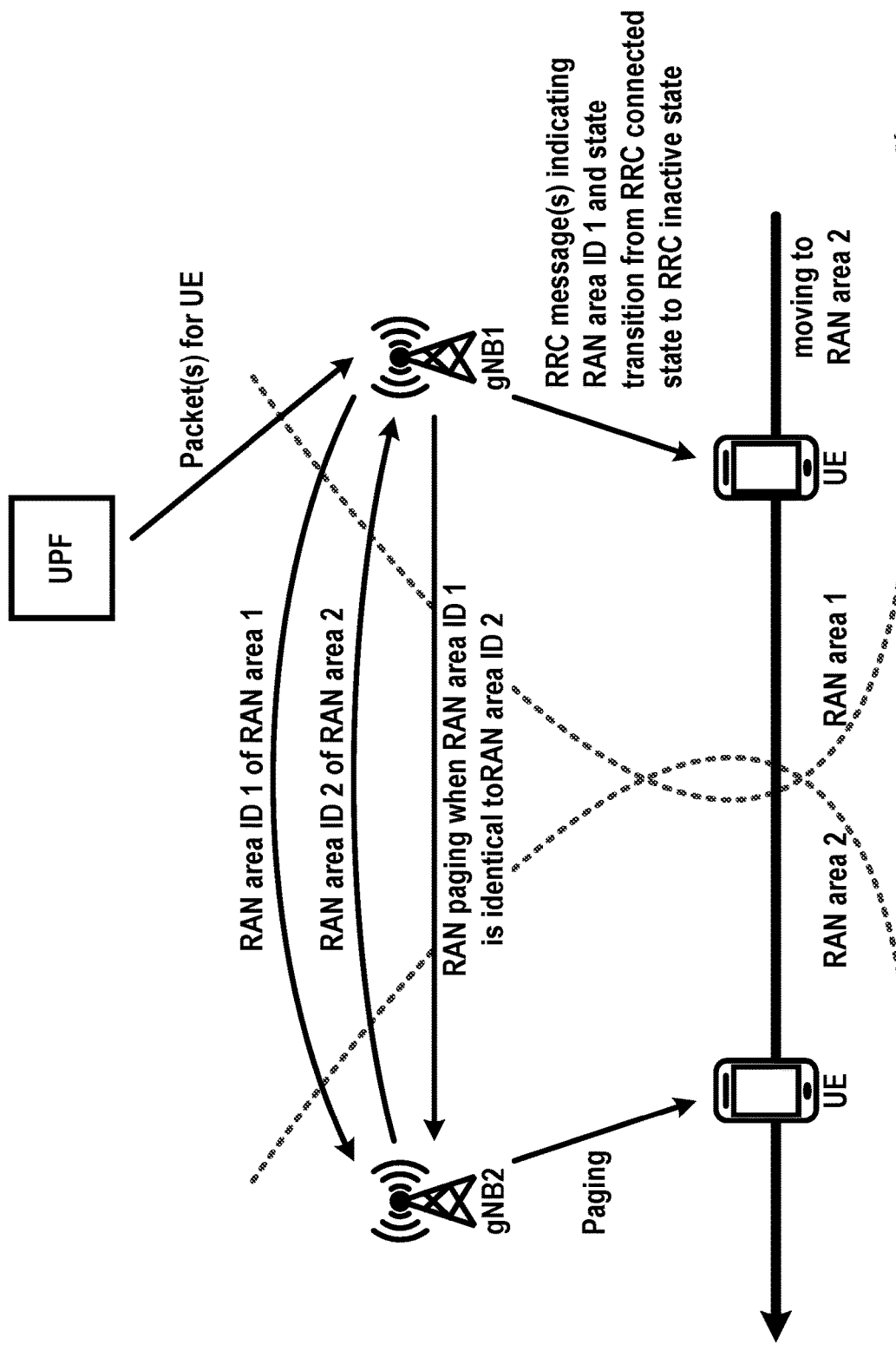
FIG. 16 is an example diagram as per an aspect of an embodiment of the present disclosure.
Figure 17:
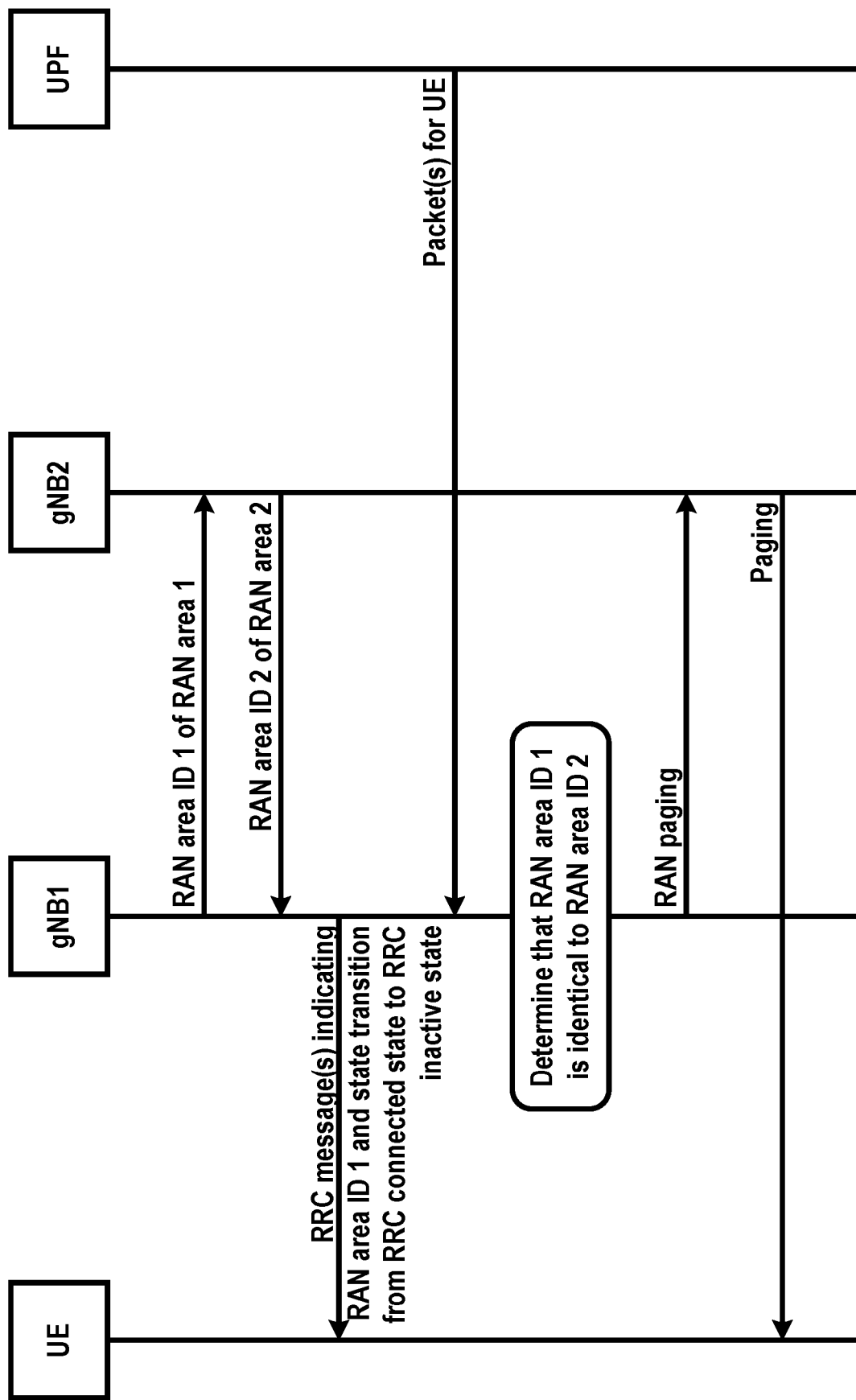
FIG. 17 is an example flow diagram as per an aspect of an embodiment of the present disclosure.

Example embodiments enhance information exchange mechanism among network nodes to improve network communication reliability and/or efficiency when a wireless device is in an RRC inactive state. Example embodiments may enhance signaling procedures for exchanging RAN area information among base stations. In an example embodiment as shown in FIG. 16 and FIG. 17, a base station may transmit its RAN area information (e.g. RAN area identifier, RAN notification identifier, one or more cell information of a RAN area). Based on the RAN area information of neighbor base stations (or neighbor cells), a base station may enhance a RAN paging reliability for an RRC inactive state wireless device by sending a RAN paging message to neighboring base station associated with a RAN area of the RRC inactive state wireless device. Example embodiments may increase backhaul signaling efficiency by limiting a RAN paging message transmission to a corresponding base stations that is associated with a RAN area of a RAN paging target wireless device.

In an example, a base station may perform an Xn setup procedure to setup an Xn interface with its neighbor base station. The Xn setup procedure may comprise a first message received by a first base station from a second base station and/or a second message transmitted by the first base station to the second base station in response to the first message. In an example, the first message may be an Xn setup request message, and the second message may be an Xn setup response message. The first message may comprise at least one of a gNB identifier of the second base station, a cell identifier of a cell served by the second base station, and/or an RNA identifier, wherein the RNA identifier may be associated with the second base station and/or a cell of the second base station. The second message may comprise at least one of a gNB identifier of the first base station, a cell identifier of a cell served by the first base station, and/or an RNA identifier associated with the first base station and/or a cell of the first base station.

In an example, a base station may perform a gNB configuration update procedure to update configuration information of its neighbor base station. In an example, at least if a cell is added, modified, and/or removed in a base station, and/or if an RNA information for a base station or for a cell of a base station is changed, the base station may initiate a gNB configuration update procedure. The gNB configuration update procedure may comprise a first message received by a first base station from a second base station and/or a second message transmitted by the first base station to the second base station in response to the first message. In an example, the first message may be a gNB configuration update message, and the second message may be an gNB configuration update acknowledge message. The first message may comprise at least one of a gNB identifier of the second base station, a cell identifier of a cell served by the second base station, and/or an RNA identifier, wherein the RNA identifier may be associated with the second base station and/or a cell of the second base station. The second message may comprise an acknowledgement of the first message.

In an example, the RNA identifier may comprise RAN notification area information, RAN area information (e.g. RAN area identifier), one or more cell identifiers of one or more cells associated with a RAN notification area (e.g. RAN area, RAN paging area).

In an example embodiment, an RNA identifier may be identifiable globally and/or in a PLMN. In an example, an RNA identifier exchanged through an Xn setup procedure and/or a gNB configuration update procedure may be employed by a base station to determine a paging area for an RNA paging procedure, which may be used to inform a wireless device in an RRC inactive state that at least one of following events occurred: that the base station received one or more packets for the wireless device; that the wireless device is required to transition its RRC state from the RRC inactive state to an RRC idle state; and/or that that the wireless device is required to transition its RRC state from the RRC inactive state to an RRC connected state. In an example the one or more packets may comprise data packets from a user plane core network entity (e.g. UPF) and/or control signaling (e.g. NAS message) from a control plane core network entity (e.g. AMF).

In an example, a base station may transmit, to a wireless device, a RAN notification area information (e.g. RAN area identifier of a RAN area, RAN paging area identifier of a RAN paging area, and/or one or more cell identifier of one or more cells of the RAN notification area, of the RAN paging area, and/or of the RAN area). The base station may indicate, to the wireless device, a state transition from an RRC connected state to an RRC inactive state by transmitting an RRC message (e.g. an RRC connection release message, an RRC connection suspend message). In an example, the RRC message may comprise the RAN notification area information for the wireless device. When the wireless device stays in the RRC inactive state, the wireless device may move around one or more cells of the RAN notification area. When the wireless device stays in the RRC inactive state, the wireless device may move out of the RAN notification area, and may initiate a RAN notification area update procedure informing, to the base station, that the wireless device moved to a different RAN notification area from the RAN notification area. The RAN notification area may comprise a RAN area of the neighboring base station, information of the RAN area received from the neighboring base station via the Xn setup request/response message and/or the gNB configuration update message.

In an example, the RNA paging procedure may comprise transmitting a first RNA paging message by a first base station to a plurality of second base stations belonging to an RNA associated with the wireless device and/or broadcasting/multicasting a second RNA paging message via a radio interface by a plurality of the second base stations that receives the first RNA paging message, wherein the first base station may be an anchor base station of the wireless device. In an example, if the wireless device receives the second RNA paging message, it may transmit a first RNA paging response to the base station that it received the second RNA paging message from. After receiving the first RNA paging response, the base station may transmit a second RNA paging response to the first base station, an anchor base station of the wireless device. In an example, the second RNA paging response may comprise a wireless device context request.

In an example embodiment, during an RNA paging procedure, a first RNA paging message transmitted from a first base station to a plurality of second base stations may comprise at least one of an identifier of a wireless device, an AS context identifier for a wireless device, an RNA identifier, and/or a reason of the RNA paging for the wireless device to notify a plurality of second base station of at least one of downlink packets for the wireless device, an RRC state transition required from an RRC inactive state to an RRC idle state, and/or an RRC state transition required from an RRC inactive station to an RRC connected state. In an example, a first RNA paging message may be transmitted to one or more base stations that serve at least one cell belonging to an RNA associated with a wireless device, a target device of an RNA paging procedure. The first base station may determine the one or more base stations (e.g. RAN paging target base station) based on the RNA information received from the one or more base stations. In an example, when the RNA information comprises a cell and/or a RAN area that was configured to the wireless device (e.g. when transitioning an RRC state to the RRC inactive state), the first base station transmit an RAN paging message to a base station that transmitted the RNA information.

In an example embodiment, during an RNA paging procedure, a second RNA paging message broadcasted/multicasted by a second base station may comprise at least one of an AS context identifier for a wireless device, an identifier of a wireless device, and/or a reason of the RNA paging to notify the wireless device of at least one event of downlink packets for the wireless device, an RRC state transition required from an RRC inactive state to an RRC idle state, and/or an RRC state transition required from an RRC inactive station to an RRC connected state. In an example, a second RNA paging message may be broadcasted and/or multicasted in a coverage area of the second base station, in a coverage area of a cell belonging to an RNA, and/or a coverage area of a beam of a cell belonging to an RNA.

In an example embodiment, after an RNA paging procedure, if an anchor base station receives a second RNA paging response from a base station that received a first RNA paging response from a wireless device in an RRC inactive state, which is a target device of the RNA paging procedure, the anchor base station may forward one or more packets to the base station that transmitted the second RNA paging response in case that the reason of the RNA paging is to transmit the one or more packets for the wireless device. In an example, the second RNA paging response may comprise a UE context retrieve request message for the wireless device. In an example, the second RNA paging response message may comprise a resume identifier for the wireless device, and the anchor base station may retrieve a UE context based on the resume identifier. In an example, the first RNA paging response may comprise a RRC context resume/setup request message. The first RNA paging response may comprise the resume identifier of the wireless device for the RRC inactive state. The base station receiving the first RNA paging response may identify the anchor base station based on the resume identifier, and may transmit the second RNA paging response message.

In an example, the anchor base station receiving the second RNA paging response may release a UE context of the wireless device in case that the reason of the RNA paging procedure is to initiate an RRC state transition of the wireless device. If the RRC state transition is transitioning to an RRC connected state, the anchor base station may transmit one or more elements of the UE context of the wireless device to the base station that transmitted the second RNA paging response before release the UE context. If the RRC state transition is transitioning to an RRC idle state, the anchor base station may release the UE context without transmitting at least one element of the UE context to a base station.

In an example, a first base station may receive, from a second base station, a first message comprising a first radio access network notification area (RNA) identifier associated with the second base station. The first base station may transmit to the second base station a second message comprising an identifier of a wireless device when the first base station is also associated with the first RNA identifier.

In an example, a first base station may receive, from a second base station, a first message comprising a first radio access network notification area (RNA) identifier associated with the second base station. The first base station may transmit to a wireless device, one or more third messages comprising radio configuration parameters, wherein the radio configuration parameters may comprise the RNA identifier, and the wireless device may be in a radio resource control (RRC) connected state. The first base station may initiate a procedure to transition the wireless device from the RRC connected state to an RRC inactive state. The first base station may transmit to the second base station a second message comprising an identifier of the wireless device when the first base station is also associated with the first RNA identifier, wherein the wireless device may be in a radio resource control (RRC) inactive state and configured with the first RNA identifier. The second message may be configured to initiate broadcasting and/or multicasting, by the second base station, a third message comprising an indication. The second message may be configured to initiate broadcasting or multicasting, by the second base station and in a coverage area or a beam area of the second base station, a third message comprising an indication.

In an example, the second message may be a paging message. The indication may be a paging indication. The first base station may further transmit to one or more third base stations one or more third messages comprising the identifier of the wireless device. The indication may be configured to cause the wireless device to change from an RRC inactive state to an RRC idle state. The indication may be configured to cause the wireless device to change from an RRC inactive state to an RRC connected state. The indication may indicate one or more downlink data packets for the wireless device. The wireless device and/or at least one base station may release a wireless device context. The second base station may receive a fourth message comprising an RRC connection request from the wireless device. The second base station may transmit, to the first base station, a fifth message comprising a request of a wireless device context for the wireless device. The second base station may receive a sixth message comprising the wireless device context from the first base station.

In an example, at least one base station may have a wireless device context of the wireless device in an RRC inactive station, and the wireless device may have no RRC connection with the at least one base station having the wireless device context. A wireless device context may comprise at least one of a bearer configuration information, a logical channel information, a security information, a PDCP configuration information, AS context, and one or more parameters for the wireless device. The RNA identifier may be associated with a cell of the second base station. The first base station may be also associated with the first RNA identifier when at least one cell in the first base station is associated with the first RNA identifier. The first base station may be associated with a plurality of RNA identifier. The first base station may transmit a message comprising the first RNA identifier to the second base station. The first base station may transmit the second message in response to receiving at least one data or control packet from a core network entity. The first base station may receive a message from a network entity comprising the first RNA identifier.

Example of Radio Access Network Paging Area Configuration

In an example embodiment, an issue with respect to determining an area for an RNA paging is how a base station transmits a paging message to a wireless device in an RRC inactive state by broadcasting a paging message in a limited area for signaling efficiency.

In an existing RAN paging procedure, base stations exchanges backhaul signaling to transmit a downlink packets to a wireless device in an RRC inactive state. A base station may transmit paging messages via its cells and/or to its neighboring base stations of a RAN notification area associated with the wireless device. Implementation of existing backhaul signaling may result in increased network resource utilization due to inefficient RAN paging message transmission. An inefficient RAN paging procedure may need further enhancement in communication and/or controlling mechanism of network nodes (e.g. base stations, core network entity, wireless device). In an example, increased signaling load for RAN paging procedure to wake up an RRC inactive state wireless device may increase backhaul signaling delay and may decrease signaling reliability. Increased packet loss rate caused due to signaling overhead may degrade network system reliability. There is a need to improve backhaul signaling mechanism of a RAN paging procedure for RRC inactive state wireless devices. Example embodiments enhance RAN paging mechanism by enabling a base station to employ a time duration since a signaling with a RAN paging target wireless device in an RRC inactive state, in selecting a RAN paging target base station. In an example, by transmitting a RAN paging message to a neighbor base station that communicated with the wireless device recent, a base station may avoid unnecessary signaling for RAN paging messages to other base stations, which are unlikely to be selected by the RAN paging target wireless device.

Figure 18:
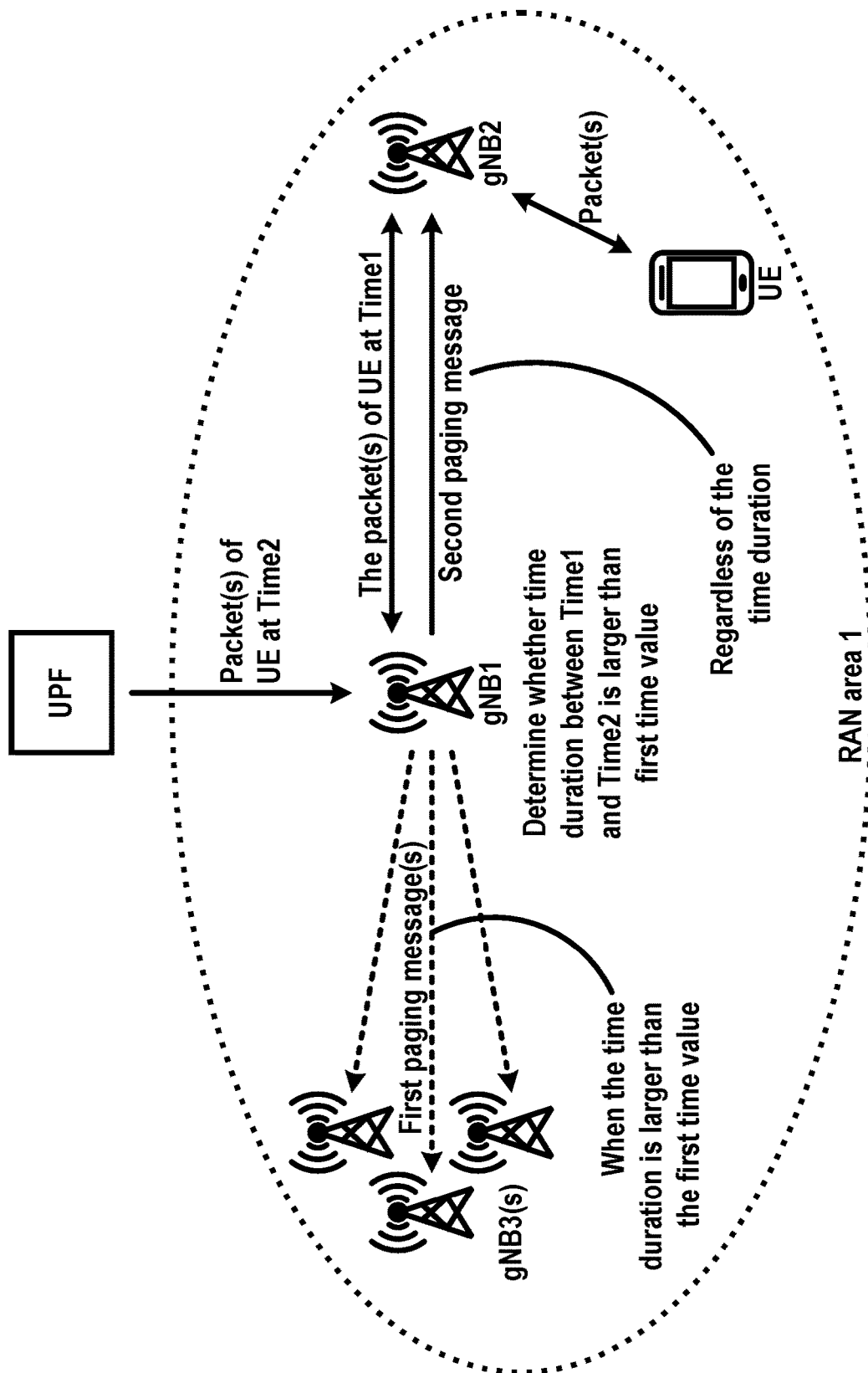
FIG. 18 is an example diagram as per an aspect of an embodiment of the present disclosure.
Figure 19:
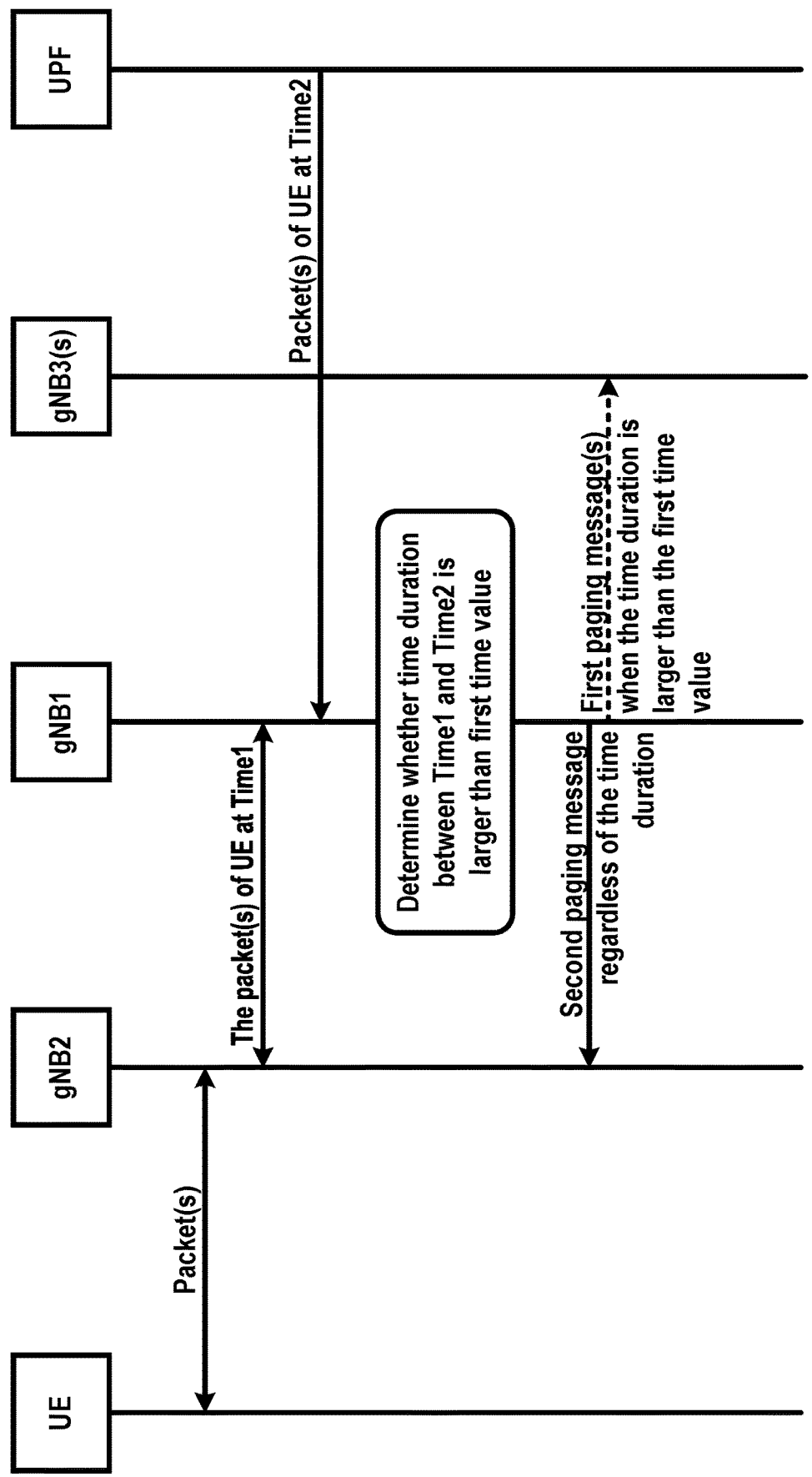
FIG. 19 is an example flow diagram as per an aspect of an embodiment of the present disclosure.

In an example embodiment as shown in FIG. 18 and FIG. 19, a base station (e.g. an anchor base station, gNB) may determine a time duration between receiving/transmitting recent packets from/to a wireless device and receiving packets from a core network entity (e.g. AMF) for the wireless device. In an example, the packets form the core network entity may cause the base station initiates a RAN paging procedure. Based on the time duration, the base station may select a target base station to which the base station transmits a RAN paging message for the wireless device. In an example, when the time duration is smaller than and/or equal to a first time value, the base station may transmit a RAN paging message to a second base station that sent/received the recent packets to/from the base station. In an example, when the time duration is larger than the first time value, the base station may transmit RAN paging messages to third base stations belonging to a RAN notification area associated with the wireless device. In an example, the third base stations may comprise the second base station.

Figure 20:
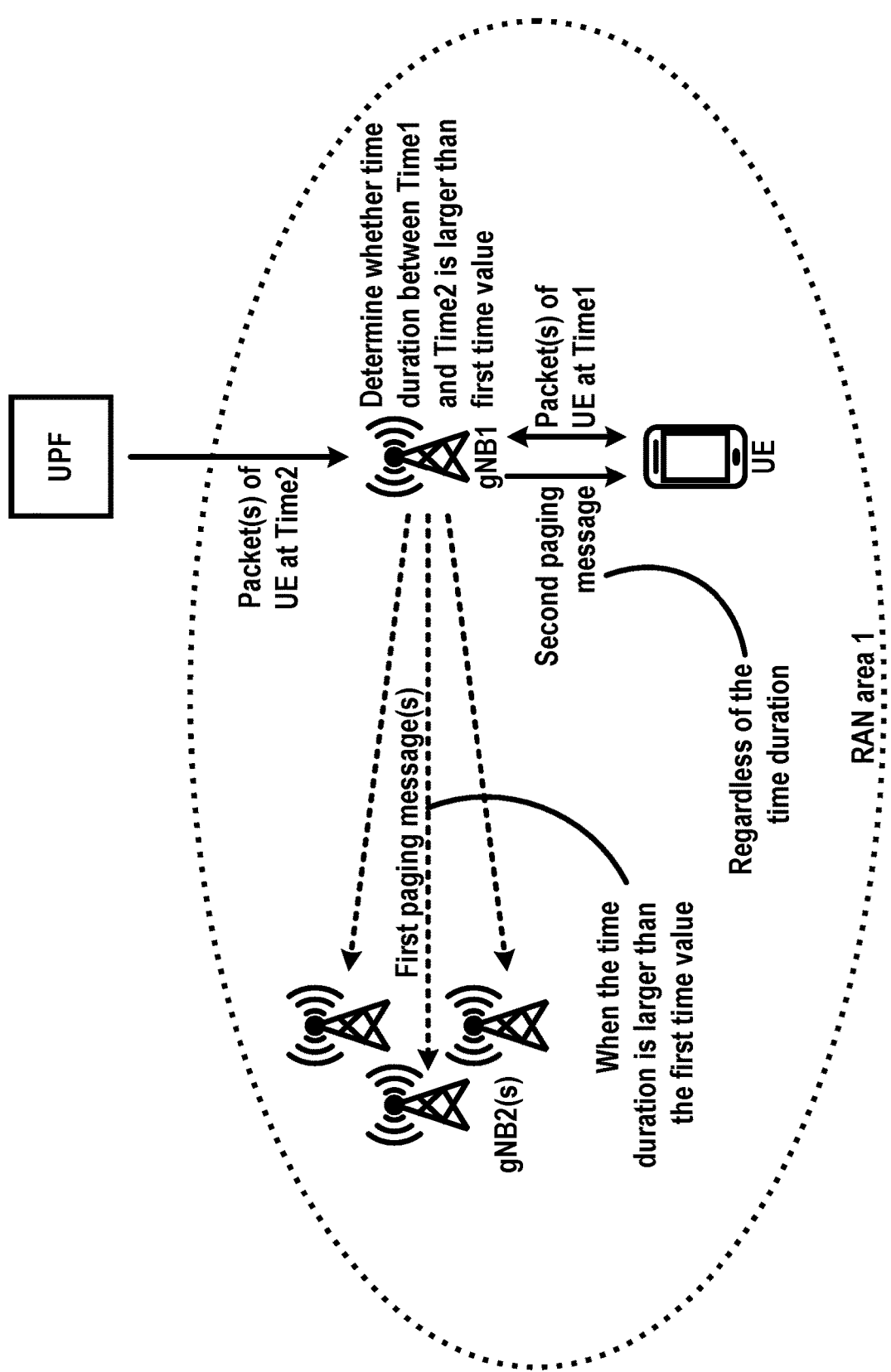
FIG. 20 is an example diagram as per an aspect of an embodiment of the present disclosure.
Figure 21:
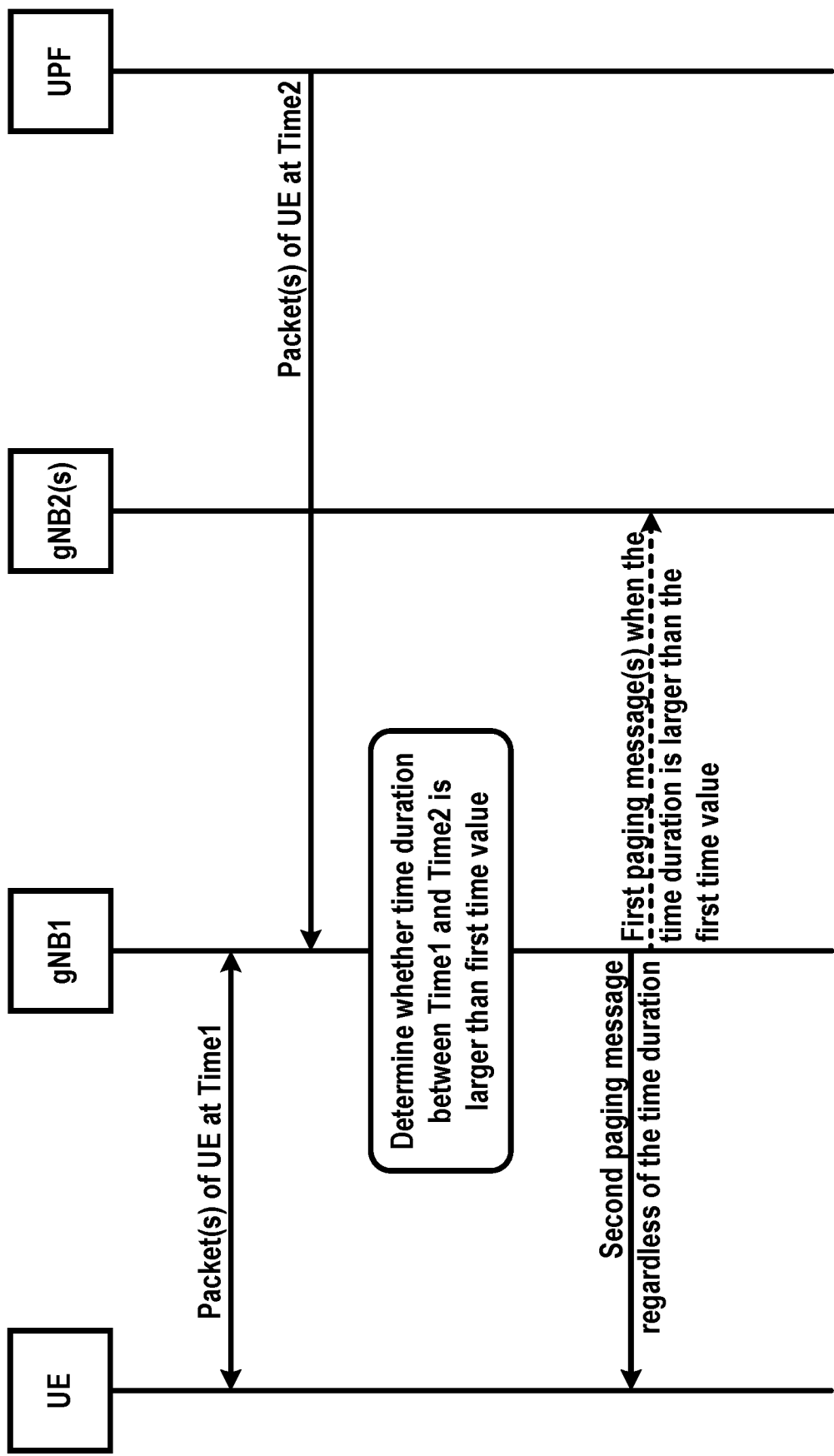
FIG. 21 is an example flow diagram as per an aspect of an embodiment of the present disclosure.

In an example, as shown in FIG. 20 and FIG. 21, if the base station receives/transmit recent packets from the wireless device via its cell, the base station may transmit RAN paging messages (e.g. radio interface paging) via its cell when the time duration is smaller than and/or equal to a first time value, and the base station may transmit RAN paging messages to second base stations belonging to a RAN notification area associated with the wireless device when the time duration is larger than the first time value.

In an example embodiment, by limiting a RAN paging area based on a time duration since a recent communication with a wireless device, a base station may reduce signaling overhead for unnecessary RAN paging message transmissions.

In an example embodiment, a first base station may determine a paging area for an RNA paging procedure and/or a core network paging procedure targeting a wireless device in an RRC inactive state at least based on a time duration between a latest signaling with the wireless device and an occurrence of an event requiring a paging message transmission, and the first base station may transmit a paging message in the determined paging area. A first paging timer may be configured in the base station. The base station may restart the first paging timer in response to receiving and/or transmitting a paging message and/or a pre-defined signaling between the first base station and wireless device (e.g. uplink data transmission, random access preamble, downlink data transmission, ACK, etc). For example, the base station may consider a previous location of the wireless device if the paging process is started when the first paging timer is running. The base station may page the wireless device in the RNA area or core TA area when the paging process starts after the timer is expired.

In an example, a first base station may determine a paging area based on at least one of a moving speed of a paging target wireless device, a service type (e.g. a logical channel type, a bearer type, a slice type, and etc.) of a paging target wireless device, a subscription information of a paging target wireless device, a establish cause of a paging target wireless device, a mobility information of a paging target wireless device, and/or a mobility estimation information of a paging target wireless device.

In an example, the determined paging area may be at least one of one or more base stations in an RNA, one or more cells of a base station in an RNA, and/or one or more beams of a cell operated by a base station in an RNA. In an example, if the determined paging area completely or partially belongs to coverage areas of one or more second base stations, the first base station that determined the paging area may transmit a first paging message to the one or more second base stations, and the one or more second base stations may broadcast and/or multicast a second paging message in their coverage area. In an example, if the determined paging area completely or partially belongs to a coverage area of the first base station that determined the paging area, the first base station may broadcast and/or multicast a second paging message in its coverage area. In an example, if the determined paging area only belongs to a coverage area of the first base station, the first base station may not transmit a first paging message.

In an example, if the determined paging area belongs to a coverage area of a first cell of the first base station, the first base station may broadcast and/or multicast a second paging message in the first cell. In an example, if the determined paging area belongs to a coverage area of a first beam in a first cell of the first base station, the first base station may broadcast and/or multicast a second paging message in the first beam.

In an example, the first paging message transmitted from the first base station to the one or more second base stations may comprise at least one of a wireless device identifier of a wireless device targeted for a paging and/or an RNA identifier, and the second paging message broadcasted and/or multicasted by the first base station and/or the one or more second base stations may comprise the wireless device identifier. In an example, a base station receiving the first paging message with an RNA identifier may broadcast and/or multicast the second paging message in a coverage area of a cell associated with an RNA identified by the RNA identifier.

In an example, the latest signaling with the wireless device may be a signaling message transmitted for at least following procedures: a random access procedure for uplink and/or downlink packet transmission for the wireless device (e.g. data and/or control packets), a uplink and/or downlink packet transmission and/or acknowledge signaling, an RNA update and/or tracking area update procedure initiated by the wireless device, an RRC state transition from an RRC connected state to the RRC inactive state, and/or a paging and/or response procedure.

In an example, the event requiring a paging message transmission may be one of at least following events: a downlink packet reception for the wireless device (e.g. data and/or control packets), an event requiring an RRC state transition of the wireless device to an RRC connected state (e.g. receiving one or more downlink packets for a service requiring an RRC connected state, receiving a command from a core network entity that requests an RRC connected state of the wireless device, a timer expiration for an RRC inactive state, a high load of random access procedure attempts, and/or other abnormal events), and/or an event requiring an RRC state transition of the wireless device to an RRC idle state (e.g. receiving a command from a core network entity that requests an RRC idle state of the wireless device, a timer expiration for an RRC inactive state, a high load of random access procedure attempts, and/or other abnormal events).

In an example, the random access procedure for uplink and/or downlink packet transmission may be initiated by a wireless device in an RRC inactive state at least when its buffer has one or more packets to transmit and/or when the wireless device receives a paging message for one or more downlink packets from a base station. In an example, the random access procedure may be performed with two messages (e.g. 2-stage random access) and/or four messages (e.g. 4-stage random access).

In a 2-stage random access procedure, a first message may be transmitted by a wireless device to a base station, and the first message may comprise at least one of a random access preamble and/or one or more uplink packets. A second message of the 2-stage random access procedure may be transmitted to the wireless device by the base station receiving the first message, and the second message may comprise an acknowledgement of a reception of the one or more uplink packets. In an example, the second message of the 2-stage random access procedure may further comprise a resource grant for further uplink packet transmission, and the wireless device may transmit a third message comprising one or more packets at least based on the resource grant. The base station receiving the third message may transmit an acknowledgement and/or further resource grant for further uplink packet transmission. In an example, further resource grants by the base station and associating uplink packet transmissions by the wireless device may be continued through further messages.

In a 4-stage random access procedure, a first message may be transmitted by a wireless device to a base station, and the first message may comprise at least one of a random access preamble and/or one or more uplink packets. A second message of the 4-stage random access procedure may be transmitted to the wireless device by the base station receiving the first message, and the second message may comprise a resource grant for uplink packet transmission. A third message of the 4-stage random access procedure may be transmitted by the wireless device to the base station at least based on the resource grant in the second message, and may comprise one or more uplink packets. A fourth message transmitted by the base station to the wireless device may comprise an acknowledgement of a reception of the one or more uplink packets. In an example, the fourth message of the 4-stage random access procedure may further comprise a further resource grant for further uplink packet transmission, and the wireless device may transmit a fifth message comprising one or more packets at least based the further resource grant in the fourth message. The base station receiving the fifth message may transmit an acknowledgement and/or further resource grant for further uplink packet transmission. In an example, further resource grants by the base station and associating uplink packet transmissions by the wireless device may be continued through further messages.

In an example, the RNA update procedure may be initiated by a wireless device in an RRC inactive state at least when the wireless device selects a cell belonging to a new RNA and/or when a time threshold for a periodic RNA update is expired. In an example, a base station may configure a wireless device to perform an RNA update periodically when the time threshold is expired. In an example, a cell may broadcast one or more RNA identifier for one or more RNA associated with the cell, and a wireless device may determine whether one of the broadcasted one or more RNA identifier is same to its RNA identifier assigned in at least one of a cell in which the wireless device performed the latest RNA update procedure, a cell in which the wireless device performed the latest uplink and/or downlink packet transmission, and/or a cell in which the wireless device was in an RRC connected state most recently.

In an example, the RNA update procedure may comprise at least one of a random access procedure initiated by a wireless device in an RRC inactive state, a wireless device context fetch procedure initiated by a new base station, a path switch procedure initiated by a new base station, and/or storing a RNA identifier of a new RNA by a wireless device. In an example, the wireless device context fetch procedure may comprise requesting, by the new base station to an old anchor base station of a wireless device, a wireless device context for the wireless device initiating the RNA update procedure, and/or receiving, by the new base station from the old anchor base station, the wireless device context. In an example, the wireless device context may comprise at least one of an AS context, a bearer configuration information, a security information, a PDCP configuration information, and/or other configuration information for the wireless device. In an example, the path switch procedure may comprise requesting, by the new base station to a core network entity, to update a downlink tunnel endpoint identifier for one or more bearers established for the wireless device between a user plane core network entity and a RAN node (e.g. changing a downlink tunnel endpoint identifier from an address of the old anchor base station to an address of the new base station).

In an example, the tracking area update procedure may be initiated by a wireless device in an RRC inactive state (and/or in an RRC idle state) at least when the wireless device selects a cell belonging to a new tracking area and/or when a time threshold for a periodic tracking area update is expired. In an example, a core network entity may configure a wireless device to perform a tracking area update periodically when the time threshold is expired. In an example, a cell may broadcast one or more tracking area identifier for one or more tracking area associated with the cell, and a wireless device may determine whether one of the broadcasted one or more tracking area identifier is same to its tracking area identifier assigned in at least one of a cell in which the wireless device performed the latest tracking area update procedure, (a cell in which the wireless device performed the latest uplink and/or downlink packet transmission,) and/or a cell in which the wireless device was in an RRC connected state most recently.

In an example, the RRC state transition from an RRC connected state to the RRC inactive state may be completed by a first RRC message transmitted by a base station to a wireless device in an RRC connected state. The first RRC message may comprise a command for the RRC state transition of the wireless device. In an example, the wireless device may transmit an acknowledgement via a second RRC message, a MAC layer message, and/or a physical layer message.

In an example, the paging and response procedure may comprise a paging message broadcasted/multicasted by a base station for an RNA paging and/or a core network paging, and/or a random access procedure. The random access procedure may be a 2-stage random access procedure and/or a 4-stage random access procedure.

In an example, the downlink packet reception for the wireless device may be a reception of one or more packets for the wireless device from a core network entity and/or an anchor base station. The downlink packet reception for the wireless device may require an RNA paging procedure. In an example, a base station that received the one or more packets may measure a time duration from a latest signaling with the wireless device and an occurrence of the downlink packet reception, and may determine a paging area for an RNA paging.

In an example, the event requiring an RRC state transition of the wireless device to an RRC connected state in a base station may be at least one of receiving one or more downlink packets for the wireless device, receiving an RRC state transition request for the wireless device from a core network entity, and/or a decision by the base station of the RRC state transition. In an example, the base station may measure a time duration from a latest signaling with the wireless device and an occurrence of the event requiring an RRC state transition, and may determine a paging area for an RNA paging and/or a core network paging.

In an example, the event requiring an RRC state transition of the wireless device to an RRC idle state in a base station may be one of receiving an RRC state transition request for the wireless device from a core network entity and/or a decision by the base station of the RRC state transition. In an example, the base station may measure a time duration from a latest signaling with the wireless device and an occurrence of the event requiring an RRC state transition, and may determine a paging area for an RNA paging and/or a core network paging.

In an example, a first base station may receive or transmit a first message associated with a wireless device in an RRC inactive state. The first base station may determine which selected base station is selected by the wireless device. The first base station may receive, from a core network node, a downlink data packet for the wireless device. The first base station may determine whether a time duration between a reception of the first messages and a reception of the downlink data packet is smaller than a first time period. When the first base station is the same as the selected base station and when the determination indicates the time duration is smaller than the first time period, the first base station may transmit one or more second messages comprising at least one of a downlink data indication and at least one of the one or more downlink data packets.

In an example, when the first base station is the same as the selected base station and when the determination indicates the time duration is not smaller that the first time period, the first base station may transmit, to a plurality of base stations, one or more third messages comprising an indication of a downlink data. When the first base station is different from the selected base station and when the determination indicates the time duration is smaller than the first time period, the first base station may transmit, to a second base station, one or more second messages comprising at least one of a downlink data indication and at least one of the one or more downlink data packets. When the first base station is different from the selected base station and when the determination indicates the time duration is not smaller that the first time period, the first base station may transmit, to a plurality of base stations, one or more third messages comprising an indication of a downlink data.

In an example, the first message may be at least one uplink signaling transmission of: an uplink data transmission procedure in the RRC inactive state, a downlink data transmission procedure in the RRC inactive state, an RNA update procedure, and/or a procedure of an RRC state transition from an RRC connected state to the RRC inactive state. The first time period may be defined at least based on a moving speed of the wireless device. The limited area may be determined at least based on one of: a moving speed of the wireless device, a size of the cell where the one or more first messages were transmitted, and/or a size of the beam area where the one or more first messages were transmitted. At least one base station may have a UE context of the wireless device in the RRC inactive state, and the wireless device in the RRC inactive state may not have an RRC connection with the at least one base station having the UE context.

Example of Cell Selection of Inactive State Wireless Device

In an example embodiment, an issue with respect to selecting a cell by a wireless device in an RRC inactive state or an RRC idle state is how a wireless device determines a cell that supports a service that the wireless device may likely receive, the determination to reduce further signaling to assign a cell providing the service.

In an existing network mechanism, a wireless device being in an RRC inactive state may select/reselect cell to camp on based on a received power and/or quality from one or more cells. The wireless device may employ a certain type of services (e.g. network slice, bearer, logical channel, QoS flow, PDU session). In an example, a cell may not support a specific type of services. For example, a cell may support different types of numerologies, TTIs, subcarrier spacing configurations, and/or licensed/unlicensed spectrums. The different types of numerologies, TTIs, subcarrier spacing configurations, and/or licensed/unlicensed spectrums may be employed for a specific type of services. In an example, a small TTI configuration may support a URLLC type service (network slice) for a low latency requirement, and/or an unlicensed spectrum may not support the URLLC type service due to its less reliability. In an example, some limited cells may support a configured grant type 1 (e.g. grant-free uplink resources), which may be required for a URLLC services and/or a IoT (e.g. MTC) service.

In an example, if a wireless device select/reselect a cell that does not support a service type required by the wireless device, the wireless device may require increased signaling with a base station to reselect a cell supporting the service type and/or to perform a handover or a secondary cell addition procedure to employ a cell supporting the service type. The increased signaling caused by selecting a cell that does not support a required service type may increase communication delay, packet loss, and/or communication reliability. Example embodiment enhance a cell selection/reselection procedure by enabling a base station to configure associations between a cell (e.g. cell type, registration area, numerology, TTI, subcarrier spacing, spectrum band) and a service type (e.g. network slice, bearer, logical channel, QoS flow, PDU session) for a wireless device in an RRC inactive state (and/or an RRC idle state).

In an example, in an RRC idle state, a wireless device may not have a logical channel (and/or a bearer) activated, and the wireless device may need a RRC connection to transmit/receive data for a service. Unlike the RRC idle state, in an RRC inactive state, a wireless device may be configured with one or more logical channels (and/or one or more bearers), and the wireless device may have a configured buffer to queue packets associated with the one or more logical channels in the RRC inactive state (without transitioning to an RRC connected state).

Figure 22:
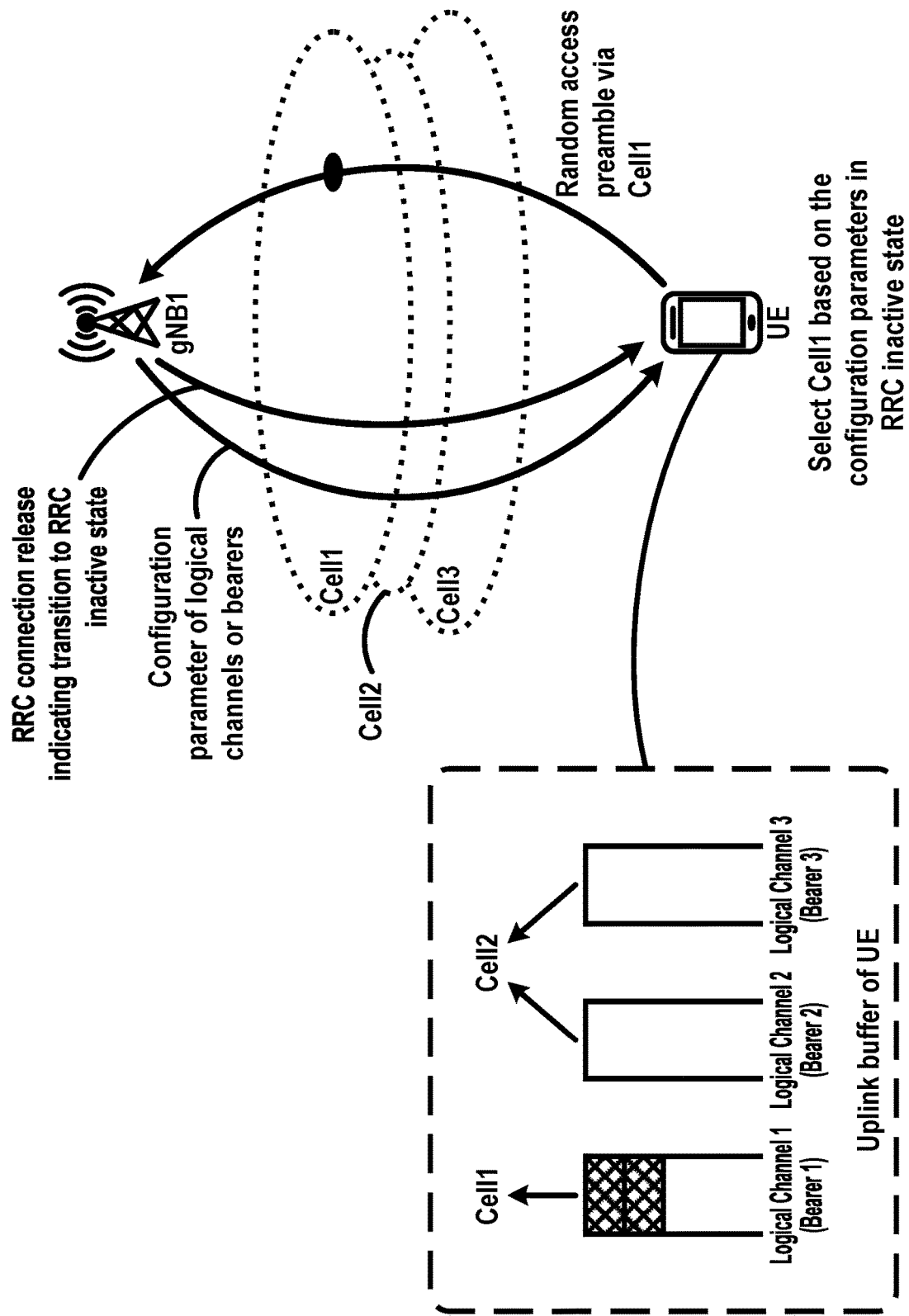
FIG. 22 is an example diagram as per an aspect of an embodiment of the present disclosure.
Figure 23:
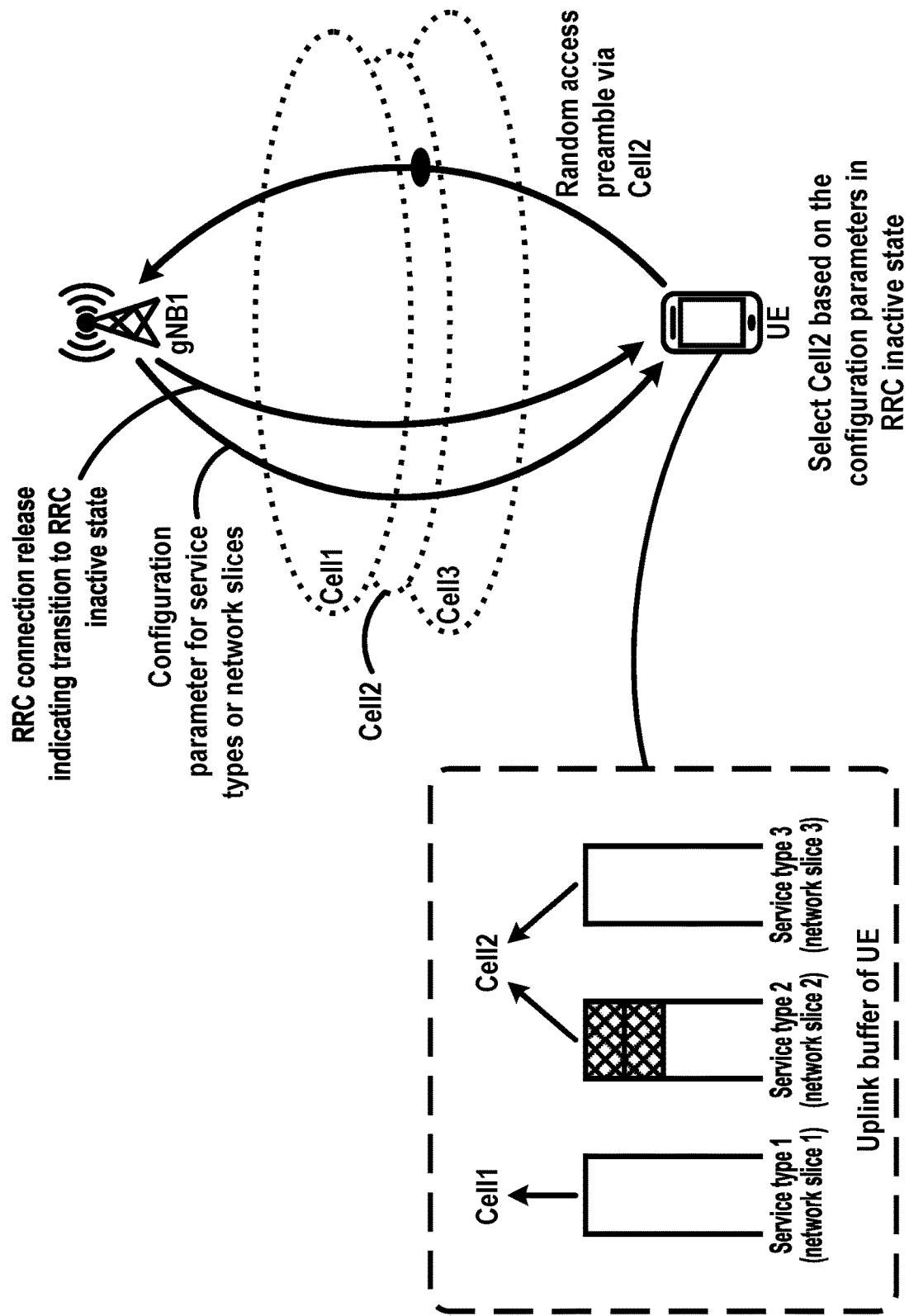
FIG. 23 is an example diagram as per an aspect of an embodiment of the present disclosure.
Figure 24:
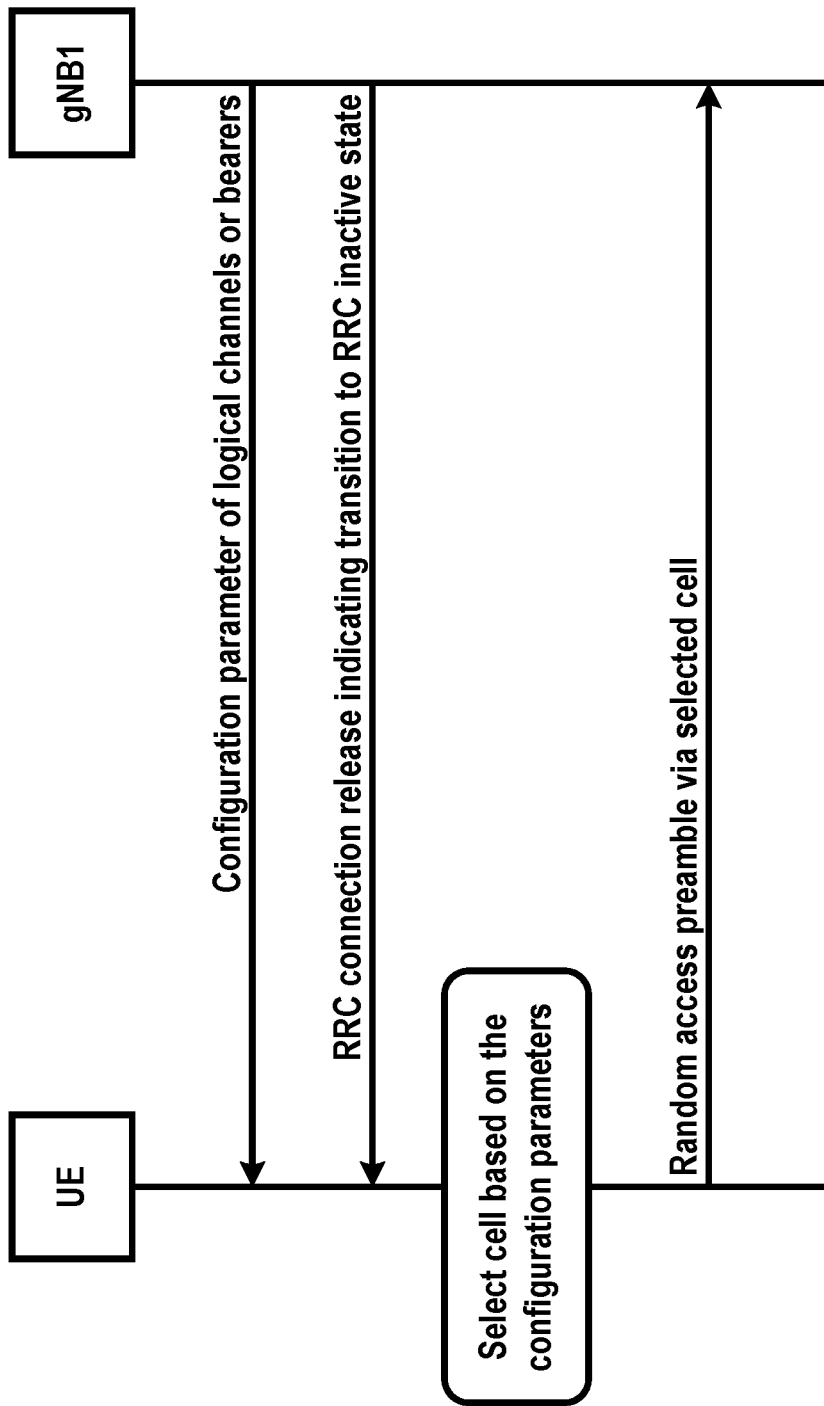
FIG. 24 is an example flow diagram as per an aspect of an embodiment of the present disclosure.

In an example embodiment, as shown in FIG. 22, FIG. 23, and FIG. 24, a cell may or may not support a service to a wireless device. The service may be associated with at least one of a logical channel, a bearer, a slice, a UE type, and/or a categorized type for packet transmission. In an example, a base station may configure a wireless device to employ one or more cells and/or cell types to transmit a packet for a logical channel. The configuration may be provided to the wireless device via one or more dedicated RRC messages and/or one or more broadcasted/multicasted system information messages. In an example, a base station may broadcast/multicast a cell identifier and/or a cell type information via a system information message of a cell. In an example, a cell of a base station may broadcast/multicast a restricted and/or allowed service list (e.g. a logical channel type list, a bearer type list, and/or a slice list). In an example, the wireless device in an RRC inactive state and/or an RRC idle state may select a cell, at least based on the broadcasted/muticasted information by a cell, for at least one of purposes: to receive a paging message for an RNA paging and/or a core network paging (e.g. a tracking area paging) for reception of one or more downlink packets and/or an RRC state transition command, to transmit one or more uplink packets, and/or to initiate an RRC state transition to an RRC connected state. In an example, when the wireless device in an RRC inactive state gets data for a first logical channel (e.g. first bearer) in corresponding buffer, the wireless device may select/reselect a cell configured, by a base station, for the first logical channel (or the first bearer), and may transmit the data to the base station via the cell. In an example, when the wireless device in an RRC inactive state gets data for a first service type (e.g. first network slice) in corresponding buffer, the wireless device may select/reselect a cell configured, by a base station, for the first service type (or the first network slice), and may transmit the data to the base station via the cell. The cell may be configured as a registration area, a cell type (e.g. numerology, TTI, subcarrier spacing, spectrum band), and/or the like.

In an example, a wireless device may receive/transmit, from/to a base station, one or more packets via one or more logical channels and/or one or more bearers for one or more services. When a base station establishes a radio bearer and/or a logical channel for a wireless device, the base station may provide, to the wireless device, a list of cells and/or cell types that may be employed to transmit one or more packets associated with a logical channel and/or a bearer. In an example, if the wireless device is in an RRC connected state, the list of cells and/or cell types for a logical channel and/or a bearer may be transmitted via one or more RRC message. In an example, the list of cells and/or cell types for a logical channel and/or a bearer may be transmitted via one or more MAC CEs. In an example, a cell may broadcast/multicast a list of one or more restricted and/or allowed logical channel types, bearer types, and or slice types, wherein the list may be transmitted via one or more system information messages.

In an example, a wireless device in an RRC inactive state may select a cell to further receive an RNA paging message or a core network paging message. The RNA paging message or the core network paging message may be transmitted by a base station to transmit one or more downlink packets to the wireless device, the one or more downlink packets associated with a logical channel and/or a bearer. If the wireless device selects a cell that does not support the logical channel and/or the bearer, a base station may assign another cell to the wireless device to transmit the one or more downlink packets after the wireless device response to the paging message. In an example, if the wireless device selects a cell that may support the logical channel and/or the bearer, the base station may not need to assign another cell to transmit the one or more downlink packets.

In an example, if a first logical channel and/or bearer is established for a wireless device and if one or more cells and/or cell types are configured by a base station for the first logical channel and/or bearer, the wireless device in an RRC inactive state may select one of the one or more cells and/or cell types for further downlink packet reception associated with the first logical channel and/or bearer at least based on a broadcasted/multicasted cell identifier and/or cell type in a cell. In an example, the wireless device may not select a cell where the first logical channel and/or bearer is associated with a list of one or more restricted logical channel types, bearer types, and or slice types at least based on broadcasted/multicasted information from a cell. In an example, the wireless device may select a cell where the first logical channel and/or bearer is associated with a list of one or more allowed logical channel types, bearer types, and or slice types at least based on broadcasted/multicasted information from a cell.

In an example, a wireless device in an RRC idle state may select a cell to further receive a core network paging message. The core network paging message may be transmitted by a base station to transmit one or more downlink packets to the wireless device, the one or more downlink packets associated with a logical channel type and/or a bearer type. In an example, if a wireless device in an RRC idle state selects a cell that may support the logical channel and/or the bearer for a service that the wireless device may receive, a base station may not need to assign another cell to transmit the one or more downlink packets after the wireless device response to a core network paging message.

In an example, if one or more cells and/or cell types are configured by a base station for a first logical channel type and/or bearer type, the wireless device after transitioning to an RRC idle state may select one of the one or more cells and/or cell types for further downlink packet reception associated with the first logical channel type and/or bearer type at least based on a broadcasted/multicasted cell identifier and/or cell type in a cell. In an example, the wireless device may not select a cell where the first logical channel type and/or bearer type is associated with a list of one or more restricted logical channel types, bearer types, and or slice types at least based on broadcasted/multicasted information from a cell. In an example, the wireless device may select a cell where the first logical channel type and/or bearer type is associated with a list of one or more allowed logical channel types, bearer types, and or slice types at least based on broadcasted/multicasted information from a cell.

In an example, a wireless device in an RRC inactive state may select a cell to further transmit one or more uplink packets to a network. In an example, a wireless device may transmit one or more uplink packets to a base station via one or more random access procedure in a selected cell, the one or more uplink packets associated with a logical channel and/or a bearer. If the wireless device selects a cell that does not support the logical channel and/or the bearer, a base station may assign another cell to the wireless device to receive the one or more uplink packets. In an example, if the wireless device selects a cell that may support the logical channel and/or the bearer, the base station may not need to assign another cell to receive the one or more uplink packets.

In an example, if a first logical channel and/or bearer is established for a wireless device and if one or more cells and/or cell types are configured by a base station for the first logical channel and/or bearer, the wireless device in an RRC inactive state may select one of the one or more cells and/or cell types for further uplink packet transmission associated with the first logical channel and/or bearer at least based on a broadcasted/multicasted cell identifier and/or cell type in a cell. In an example, the wireless device may not select a cell where the first logical channel and/or bearer is associated with a list of one or more restricted logical channel types, bearer types, and or slice types at least based on broadcasted/multicasted information from a cell. In an example, the wireless device may select a cell where the first logical channel and/or bearer is associated with a list of one or more allowed logical channel types, bearer types, and or slice types at least based on broadcasted/multicasted information from a cell.

In an example, a wireless device in an RRC inactive state and/or an RRC idle state may select a cell to initiate an RRC state transition to an RRC connected state. The wireless device may perform a random access procedure to make an RRC connection in the selected cell. After completing the RRC state transition, the wireless device may transmit and/or receive one or more packets associated with a logical channel and/or a bearer. In an example, if the wireless device selects a cell that does not support the logical channel and/or the bearer, a base station may assign another cell to the wireless device to transmit and/or receive the one or more packets after completing the RRC state transition. In an example, if the wireless device selects a cell that may support the logical channel and/or the bearer, the base station may not need to assign another cell to transmit and/or receive the one or more packets.

In an example, if a first logical channel and/or bearer is established for a wireless device and if one or more cells and/or cell types are configured by a base station for the first logical channel and/or bearer, the wireless device in an RRC inactive state may select one of the one or more cells and/or cell types for further packet transmission and/or reception associated with the first logical channel and/or bearer, after completing an RRC state transition to an RRC connected state, at least based on a broadcasted/multicasted cell identifier and/or cell type in a cell. In an example, the wireless device may not select a cell where the first logical channel and/or bearer is associated with a list of one or more restricted logical channel types, bearer types, and or slice types at least based on broadcasted/multicasted information from a cell. In an example, the wireless device may select a cell where the first logical channel and/or bearer is associated with of a list of one or more allowed logical channel types, bearer types, and or slice types at least based on broadcasted/multicasted information from a cell.

In an example, if one or more cells and/or cell types are configured by a base station for a first logical channel type and/or bearer type, the wireless device after transitioning to an RRC idle state may select one of the one or more cells and/or cell types for further packet transmission and/or reception associated with the first logical channel type and/or bearer type at least based on a broadcasted/multicasted cell identifier and/or cell type in a cell. In an example, the wireless device may not select a cell where the first logical channel type and/or bearer type is associated with a list of one or more restricted logical channel types, bearer types, and or slice types at least based on broadcasted/multicasted information from a cell. In an example, the wireless device may select a cell where the first logical channel type and/or bearer type is associated with a list of one or more allowed logical channel types, bearer types, and or slice types at least based on broadcasted/multicasted information from a cell.

In an example, a wireless device may receive, from a base station, a first messages comprising configuration parameters, wherein the configuration parameters may indicate association of a bearer or logical channel with one or more cells for the wireless device in a RRC connected state. The wireless device may receive, from a base station, a second message comprising an RRC state transition command configured to cause an RRC state transition of the wireless device from the RRC connected state to an RRC inactive state. The wireless device in the RRC inactive state may select a first cell at least based on one or more criteria, wherein the one or more criteria may employ at least the configuration parameters. The wireless device may transmit to the base station a random access preamble message via the first cell. The wireless device in the RRC connected state may have an RRC connection with at least one base station. When the wireless device is in the RRC inactive state, at least one base station may have a wireless device context of the wireless device, and/or the wireless device may not have an RRC connection with the at least one base station having the wireless device context. The wireless device context may comprise at least one of a bearer configuration information, a logical channel information, a security information, an AS context, a PDCP configuration information, and other information for the wireless device. The transmitting the random access preamble message may be in response to at least one of the following: an uplink buffer including one or more data packets, the wireless device receiving a paging indication, and/or the wireless device detecting moving to a new RNA or TA. The association of the bearer or logical channel with one or more cells may comprise association of the bearer or logical channel with a cell type and/or cells in a frequency band.

Example of Radio Access Network Notification Area Update Failure

Example embodiments provide methods and system for determining a periodic RNA update failure in a base station and a wireless device. Example embodiment provides mechanisms for a base station to transmit a notification of the failure to a core network entity. Example embodiment provides processes in a wireless device when a periodic RNA update process fails.

In an existing RAN notification area update (RNAU) procedure, base station(s) and/or a wireless device may exchange signaling to update a location information of the wireless device being in an RRC inactive state. A wireless device may transmit a RNAU indication to a base station to update its RAN notification area, which may be employed by the base station (e.g. anchor base station) to page the wireless device in an RRC inactive state. Implementation of existing signaling may result in increased communication delay, increased packet loss rate, and/or increased call drop rate due to inefficient packet transmission for the wireless device of an RRC inactive state and/or an RRC idle state.

In an RRC idle state of a wireless device, a core network entity may recognize that the wireless device is unreachable by a base station, and the core network entity may not transmit packets for the wireless device to a base station before initiating a core network paging procedure. Unlike the RRC idle state, when a wireless device is in an RRC inactive state, a core network entity may consider that the wireless device has an RRC connection with a base station, and may transmit packets for the wireless device to a base station when the wireless device is not reachable by the base station. In an existing network signaling, when a RAN notification area update procedure is failed, a core network entity may keep sending, to an anchor base station, packets for an RRC inactive state wireless device though the anchor base station is uncertain whether the wireless device is reachable. Example embodiments may prevent packet transmission of a core network entity towards a base station when a wireless device is unreachable by informing a wireless device state to the core network entity.

There is a need for further enhancement in communication among network nodes (e.g. base stations, core network entity, wireless device), for example, when there is a failure in a periodic RNAU procedure. In an example, in some scenarios a periodic RNAU update procedure of a wireless device may increase a failure rate in transmitting downlink user plane or control plane packets (e.g. data packets, NAS/RRC signaling packets) for RRC inactive state wireless devices. Increased packet loss rate and/or increased transmission delay may degrade network system reliability. There is a need to improve backhaul signaling mechanism for RRC inactive state wireless devices. Example embodiments enhance information exchange among network nodes to improve network communication reliability when a wireless device is in an RRC inactive state. Example embodiments may enhance signaling procedures when a RAN notification area update procedure is failed.

In an example embodiment, after transitioning an RRC station from an RRC connected state to an RRC inactive state, a wireless device may periodically perform a RAN notification area update (RNAU) procedure by sending a RNAU indication to an anchor base station. The anchor base station receiving the RNAU indication may consider that the wireless device in the RRC inactive state stays in an RAN notification area associated with the anchor base station, and/or may consider that the wireless device is in a reliable service area (e.g. reachable) of a cell of the RAN notification area. During the RRC inactive state, a core network entity (e.g. AMF and/or UPF) may consider that the wireless device has a RRC connection with the anchor base station, and may send downlink packets (e.g. data packets and/or control signaling packets, NAS messages) to the anchor base station. In an example embodiment, when an anchor base station recognizes a RNAU procedure (e.g. periodic RNAU procedure) failure of an RRC inactive state wireless device, the anchor base station may indicate that an RNAU of the wireless device is failed and/or that the wireless device is not reachable (e.g. UE context release request indicating a state transition of the wireless device to an RRC idle state).

Example embodiments may enhance system reliability by enabling a base station to inform a core network entity of a wireless device state when a RAN notification area update procedure of the wireless device in an RRC inactive state is failed. Example embodiments may enable network nodes to reduce packet loss rate or call drop rate for an RRC inactive and/or RRC idle state wireless device in a RAN notification area update failure.

In legacy LTE, a NAS identifier (typically S-TMSI) may be used to address the UE (wireless device) in a paging procedure. With the Rel-14 Light connection WI and the introduction of RAN initiated paging, it may have been agreed that a RAN allocated UE identity (Resume identity) may be used in the RRC Paging message when the paging is initiated in the RAN. One of the reasons behind this agreement may the potential security issue if the NAS identity (S-TMSI) may be exposed on the radio interface without the CN being in control of this.

In NR (new radio), a similar security issue by exposing the NAS identity on the radio interface may be likely to appear. Furthermore, using a NAS identifier at RAN initiated paging may probably also lead to additional signalling between the RAN and the CN since mechanisms for frequent updates of the NAS identity may be needed. It may be also likely that the update mechanism may be more complex since recovery procedures may be needed if re-allocation of the NAS identity fails.

For the reasons above, the UE may be addressed with a RAN allocated UE identity (resume identity) at RAN initiated paging. A UE in RRC_INACTIVE may be normally paged from the RAN, however for robustness purposes a UE in RRC_INACTIVE also may need to be reached by a CN initiated page. To resolve from a state inconsistency situation in which the UE is in RRC_INACTIVE while the network considers the UE to be in IDLE (e.g. if the UE was temporarily out of coverage at the time the release message was sent), the UE in RRC_INACTIVE may need to respond on a CN initiated page containing its NAS identifier.

A UE may need to monitor and respond to a RAN initiated paging as well as to a CN initiated paging while in RRC_INACTIVE. A RAN initiated paging message may include a RAN allocated UE identity whereas a CN initiated paging message is sent with a CN allocated (NAS) identity.

At reception of the RRC Paging message while in RRC_INACTIVE the UE may however behave the same regardless if the paging procedure is triggered in the RAN or in the CN, i.e. independently of the UE identifier included in the message. That is, the UE may take advantage of the stored AS context and may attempt to resume the RRC connection by sending an RRC Connection Resume Request message (or equivalent) to the gNB, identifying itself with the RAN allocated UE identity sent to the UE once it may be transited to RRC_INACTIVE.

When the AS context is successfully retrieved in the network, the UE may be transited to RRC_CONNECTED as part of the Resume procedure, see FIG. 16 below.

If the AS context for some reason cannot be retrieved in the network, thus the resumption of the RRC connection fails, a fall-back procedure may be proposed in which the gNB triggers an RRC Connection Establishment procedure as a result of the failed resumption. The signalling flow for this scenario may be shown in FIG. 17 below.

In an example, if the resumption attempt fails it may not add any additional roundtrip costs between the UE and the network compared to a normal RRC Connection Establishment procedure triggered from RRC_IDLE (the UE may send a RRC Connection Request message instead of the RRC Connection Resume Request message).

The fact that the UE may keep the AS context until informed by the network (in FIG. 2d at reception of the RRC Connection Setup message) may also be considered as a more secure solution compared to a solution where the AS context may be simply released at reception of a paging message.

The Paging procedure in FIG. 1d and FIG. 2d may also be initiated from the CN if e.g. the UE may be temporarily out of coverage at the time the release message was sent.

The following are example call flows. There may be additional messages (not shown in the call flow) that are communicated among the network nodes.

Figure 25:
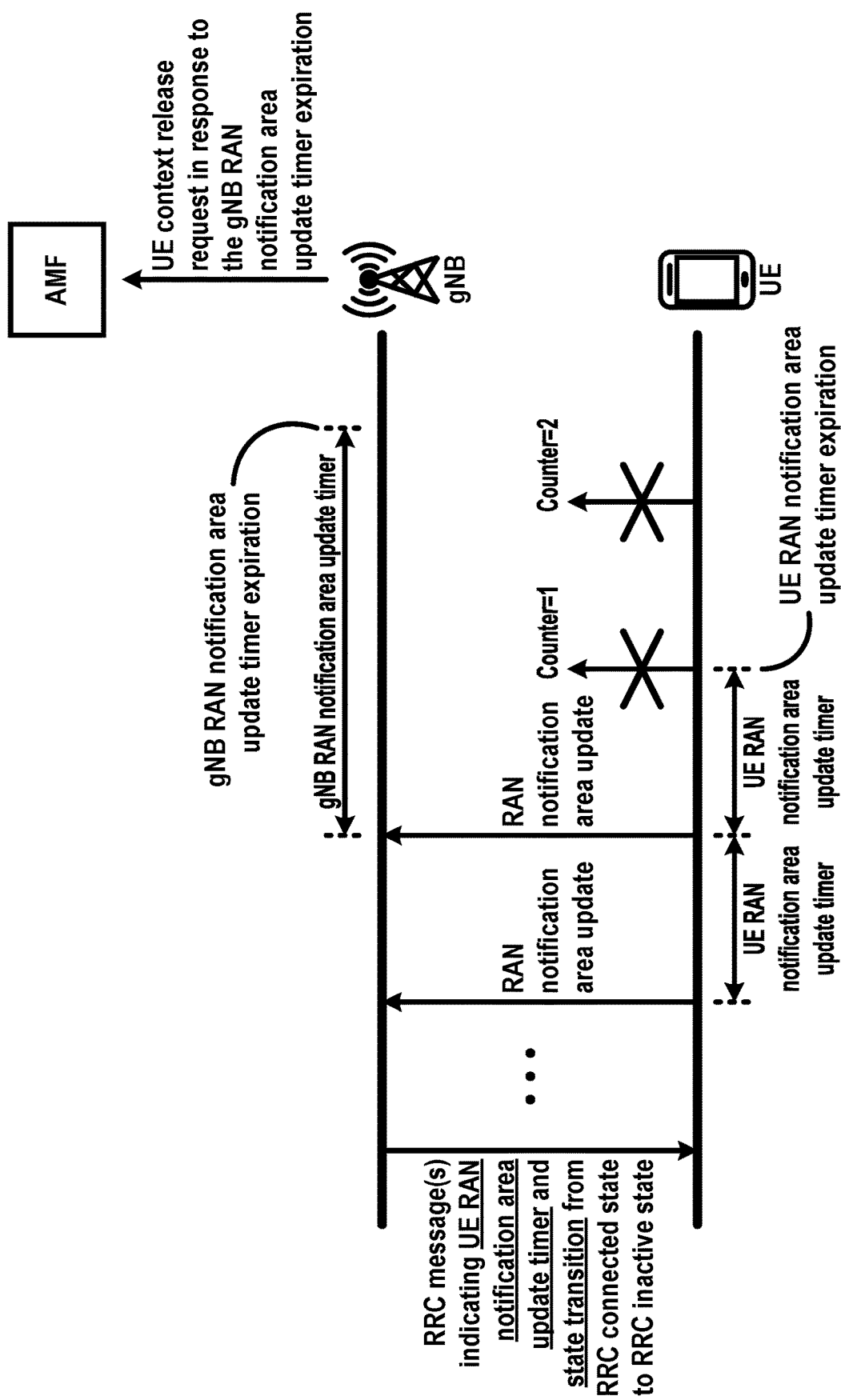
FIG. 25 is an example diagram as per an aspect of an embodiment of the present disclosure.
Figure 26:
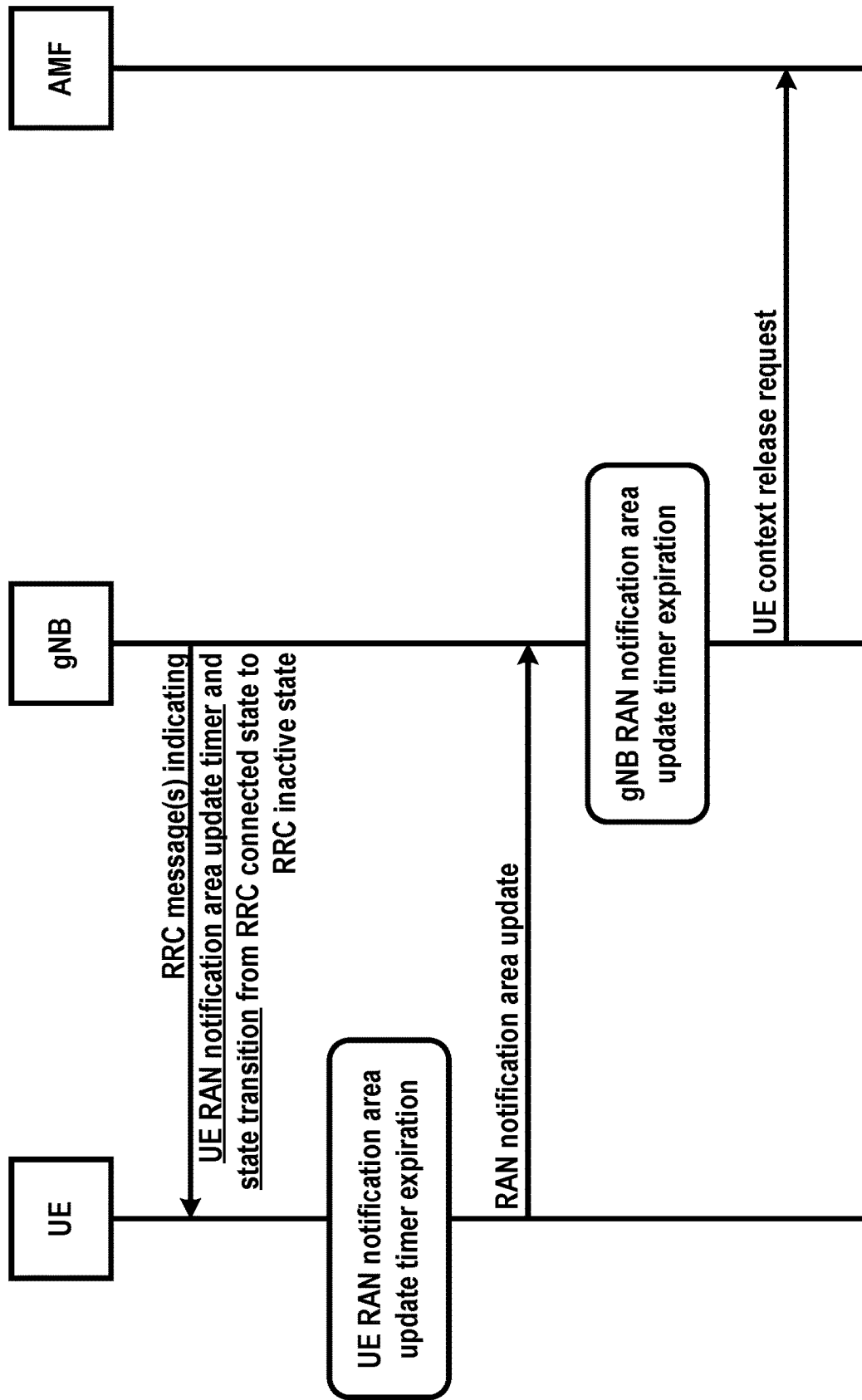
FIG. 26 is an example flow diagram as per an aspect of an embodiment of the present disclosure.

In an example embodiment as shown in FIG. 25 and FIG. 26, a first base station may transmit, to a wireless device, at least one first message indicating a radio resource control (RRC) state transition of the wireless device from an RRC connected state to an RRC inactive state. The at least one first message may comprise a parameter indicating a value associated with a wireless device radio access network (RAN) notification area update timer for a periodic RAN notification area update procedure. In an example, the first base station may be an anchor base station of the wireless device. The first base station may keep a UE context of the wireless device. The UE context may comprise at least one of PDU session configurations, security configurations, radio bearer configurations, logical channel configurations, resume identifier associated with the RRC inactive state, RAN notification area information (e.g. a RAN area identifier, a cell identifier, a base station identifier of a RAN notification area of the wireless device).

In an example, a wireless device in an RRC inactive state may perform an RNA update procedure when a UE RNA update timer (a periodic RAN notification area update timer value) is expired. Periodic RNA may be configured by a base station for a wireless device. The UE RNA update timer may be configured and/or (re)started when the wireless device makes an RRC connection, when performs an RNA update procedure, and/or via one or more signaling message between the wireless device and the base station. In an example the UE RNA update timer may be configured based on a moving speed, a network slice, a UE type, a established bearer type, and/or a service type of the wireless device. The base station may transmit one or more message comprising configuration parameters, e.g. an RNA timer value, and/or an RNA counter. An RNA timer and/or counter may be restarted when the UE successfully transmits an RNA update to a base station.

In an example, a wireless device may not be able to initiate an RNA update procedure when a UE RNA update timer is expired for a plurality of reasons (e.g. a plurality of system errors, moving to out of network coverage, and/or a power off). In an example, a first base station may determine that a periodic RNA update is unsuccessful if a network RNA update timer is expired without receiving an RNA update message from a wireless device in an RRC inactive state and/or if the first base station does not receive an RNA update message more than the number of a periodic RNA update counter. In an example, the base station may consider that a periodic RNA update is unsuccessful, when a first number of (e.g. subsequent) expected periodic RNA update messages have not been received. In an example, the network RNA update timer may be longer than the UE RNA update timer. When one or more periodic RNA update procedures of a wireless device fail, the base station (e.g. anchor base station) may determine a failure of a periodic RNA update of the wireless device. The determining, by the base station, the periodic RNA update failure may be based on expiration of a network RNA update timer (e.g. RAN notification area update guard timer).

In an example, the first base station may start the network RNA update timer in response receiving a RNA update indication from the wireless device. The RNA update indication may comprise an RRC connection resume message from the wireless device, a UE context retrieve request message from a base station where the wireless device camps on, an Xn message indicating an RNA update of the wireless device, and/or the like. In an example, the first base station may start the network RNA update timer in response to communicating with the wireless device (e.g. transmitting/receiving one or more packets to/from the wireless device). In an example, the first base station may stop the network RNA update timer in response to communicating with the wireless device.

After determining that a periodic RNA update is unsuccessful, the first base station may transmit a first message to a core network entity. The first message may comprise at least one of a wireless device identifier of the wireless device that failed in a periodic RNA update, an AS context identifier of the wireless device, an RNA update failure indication for the wireless device, a wireless device context release indication for the wireless device in the first base station, an RRC state transition indication informing that a RRC state of the wireless device transitions to an RRC idle state, a Resume ID of the wireless device and/or a core network paging request for the wireless device. In an example, after transmitting the first message, the first base station may release a wireless device context (a UE context). In an example, the first message may comprise a UE context release request message for the wireless device. The first message may comprise a cause information element indicating that the wireless device is unreachable, that the wireless device is in an RRC idle state, and/or that a periodic RAN notification area update of the wireless device is failed.

In an example, the core network entity may release a UE context of the wireless device in response to receiving the first message from the base station (e.g. anchor base station).

In an example, the core network entity, receiving the first message for the failure of a periodic RNA update of the wireless device from the first base station, may configure an RRC state of the wireless device as an RRC idle state. In an example, the core network entity may keep an RRC state of the wireless device as an RRC inactive state. In an example, the core network entity receiving the first message may transmit a first core network paging message to a plurality of base stations. The first core network paging message may comprise at least one of a wireless device identifier, an AS context identifier of the wireless device, a tracking area identifier (and/or a tracking area code), a base station identifier of the first base station, an RNA identifier associated with the wireless device, a reason of the core network paging, resume ID of the wireless device and/or an action indication for the wireless device. In an example, the action indication may be configured for the wireless device to perform an RRC state transition to an RRC idle state, an RRC state transition to an RRC connected state, an RNA update procedure, and/or a random access procedure. In an example, a second base station receiving a first core network paging message may determine whether there is a direct interface (e.g. Xn interface) between the first base station and the second base station at least based on the base station identifier of the first base station.

In an example, a second base station that receives the first core network paging message may broadcast/multicast a second core network paging message comprising the wireless device identifier, e.g., Resume ID, S-TMSI, or IMSI. In an example, the second core network paging message may further comprise the AS context identifier, the RNA identifier, the reason of the core network paging, and/or the action indication for the wireless device. The second core network paging message may be configured to initiate a random access procedure by the wireless device. In an example, the wireless device may recognize the second core network paging message based on at least one of the wireless device identifier, the AS context identifier, and/or the RNA identifier. In an example, after receiving the second core network paging message, the wireless device may initiate a random access procedure by transmitting a preamble message to the second base station. In an example, the random access procedure may be a 2-stage random access procedure and/or a 4-stage random access procedure. In an example, during the random access procedure, the second base station may inform the wireless device of an action to take at least based on the action indication for the wireless device, wherein the action may be at least one of transitioning an RRC state to an RRC connected state, transitioning an RRC state to an RRC idle state, staying in an RRC inactive state, and/or initiating an RNA update procedure.

In an example, after receiving the preamble message for the random access from the wireless device, the second base station may transmit a core network paging acknowledge message for the first core network paging message to the core network entity. The core network paging acknowledge message may comprise a wireless device context request for the wireless device. In an example, the core network entity may transmit an acknowledge message to the first base station for the first message received form the first base station. The acknowledge message to the first base station may comprise a wireless device context request for the wireless device. In an example, after receiving the preamble message for the random access from the wireless device, the second base station may transmit a wireless device context request message to the first base station via a direct interface (e.g. an Xn interface) between the first base station and the second base station at least based on the base station identifier of the first base station included in the first core network paging message. In an example, the first base station may transmit a wireless device context to the second base station indirectly via the core network entity and/or directly via the direct interface. In an example, after transmitting the wireless device context to the second base station, the first base station may release a wireless device context (a UE context).

In an example, in case that the second base station fetches the wireless device context from the first base station via a direct interface, the second base station may transmit a path switch request for the wireless device to a core network entity, and the core network entity may update a downlink tunnel endpoint identifier for one or more bearers established for the wireless device between a user plane core network entity and a RAN node, e.g. changing a downlink tunnel endpoint identifier from an address of the first base station to an address of the second base station.

In an example, after the successful core network paging procedure, the wireless device may stay in an RRC inactive state, transition to an RRC connected state, and/or transition to an RRC idle state. In case that the wireless device stays in an RRC inactive state or transitions to an RRC connected state, the second base station may keep a wireless device context of the wireless device and may maintain one or more bearers for the wireless device between the second base station and a user plane core network entity. If the wireless device stays in an RRC inactive state, the second base station may become an anchor base station for the wireless device. If the wireless device transitions to an RRC connected state, the second base station may initiate an RRC state transition of the wireless device to an RRC inactive state, and the second base station may become an anchor base station. In case that the wireless device transitions to an RRC idle state, the second base station may not request a wireless device context to the first base station and/or to the core network entity.

In an example, if a wireless device in an RRC inactive state does not perform an RNA update procedure before a UE RNA update timer (a periodic RAN notification area update timer value) is expired, the wireless device may determine that a periodic RNA update is failed. The may UE may start an RNA update timer in response to an RRC message configuring periodic RNA timer in the UE and the UE transitioning to inactive RRC state. The UE may restart the UE RNA timer when the UE transmits an RNA update.

In an example, if the periodic RNA update failure occurs, the wireless device may transition its RRC state to an RRC idle state immediately, after an expiration of another timer, and/or after failing in performing an RNA update procedure more than a number of a periodic RNA update counter. For example, when a UE RNA update procedure is unsuccessful a first number of (e.g. consecutive) times, the UE may determine that the periodic RNA update failed. In an example, a base station may transmit to the wireless device a configuration message comprising periodic RNA update timer and/or counter values.

In an example, a first base station may determine, for a wireless device, a periodic RNA failure based on one or more criteria comprising expiry of a periodic RAN notification area update timer. The first base station may transmit, to a core network entity, a first message in response to determining the periodic RNA failure, wherein the first message may comprise a first wireless device identifier of the wireless device, and/or the first message may indicate the periodic RNA failure for the wireless device. The first message further may comprise a first indication indicating that the first base station releases a wireless device context. The first base station may further release a wireless device context of the wireless device. The first message may further comprise a second indication indicating that a first time duration associated with RNA update period is elapsed and no RNA update is received. The second base station may further receive, from the core network entity, a second message comprising a first paging and a second wireless device identifier of the wireless device. The second base station may broadcast and/or multicast a third message comprising a second paging and the second wireless device identifier. The second base station may receive, from the wireless device, a fourth message comprising an acknowledgement of the second paging, wherein the wireless device may recognize the second paging request at least based on the second wireless device identifier. The second base station may transmit, to the core network entity, a fifth message indicating a response to the second message.

In an example, the first base station may further receive a fifth message comprising a request of a wireless device context for the wireless device. The first base station may transmit a sixth message comprising the wireless device context. The first base station may release the wireless device context. The wireless device may further transition a radio resource control state to a radio resource control idle state in response to a paging message from a base station. The wireless device may further transition a radio resource control state to a radio resource control idle state after receiving the paging message. The wireless device may be in a radio resource control RRC inactive state after receiving the paging message. The second base station may further transmit to the wireless device at least one of the following: a message comprising a radio resource control state transition indication completing a radio resource control state transition from a radio resource control connected state to a radio resource control inactive state, a message comprising a radio access network notification area update accept, and/or one of one or more packets. The second base station may receive, from the wireless device, at least one of the following: a message comprising a radio access network notification area update request, one of one or more packets received by the first base station from the wireless device, and/or a message comprising an acknowledgement of a radio access network notification area paging.

In an example, the first base station may further release a RAN context of the wireless device. The first base station and/or the core network entity may transition a radio resource control state from an RRC inactive state to an RRC idle state. In an example, the wireless device may transition to an RRC idle state from an RRC inactive state if a second criteria is met. The first base station may transmit to the wireless device one or more messages comprising one or more configuration parameters of an RNA, the one or more configuration parameter comprising a parameter indicating a value for a periodic RAN notification area update timer value. In an example, the first base station may transmit to the wireless device one or more criteria comprising reaching a periodic RAN notification area update counter. If a number of failing in an RNA update reaches the periodic RAN notification area update counter, the wireless device may transition to an RRC idle state.

In an example, a wireless device may receive, from a base station, one or more first messages comprising one or more configuration parameters of an RNA, the one or more configuration parameter comprising a parameter indicating a value for a periodic RAN notification area update timer value. The wireless device may determine a periodic RNA update failure based on one or more criteria comprising expiry of the periodic RAN notification area update timer. The wireless device may transition to an RRC idle state in response to determining the periodic RNA update failure.

Embodiments may be configured to operate as needed. The disclosed mechanism may be performed when certain criteria are met, for example, in a wireless device, a base station, a radio environment, a network, a combination of the above, and/or the like. Example criteria may be based, at least in part, on for example, wireless device or network node configurations, traffic load, initial system set up, packet sizes, traffic characteristics, a combination of the above, and/or the like. When the one or more criteria are met, various example embodiments may be applied. Therefore, it may be possible to implement example embodiments that selectively implement disclosed protocols.

According to various embodiments, a device such as, for example, a wireless device, off-network wireless device, a base station, and/or the like, may comprise one or more processors and memory. The memory may store instructions that, when executed by the one or more processors, cause the device to perform a series of actions. Embodiments of example actions are illustrated in the accompanying figures and specification. Features from various embodiments may be combined to create yet further embodiments.

Figure 27:
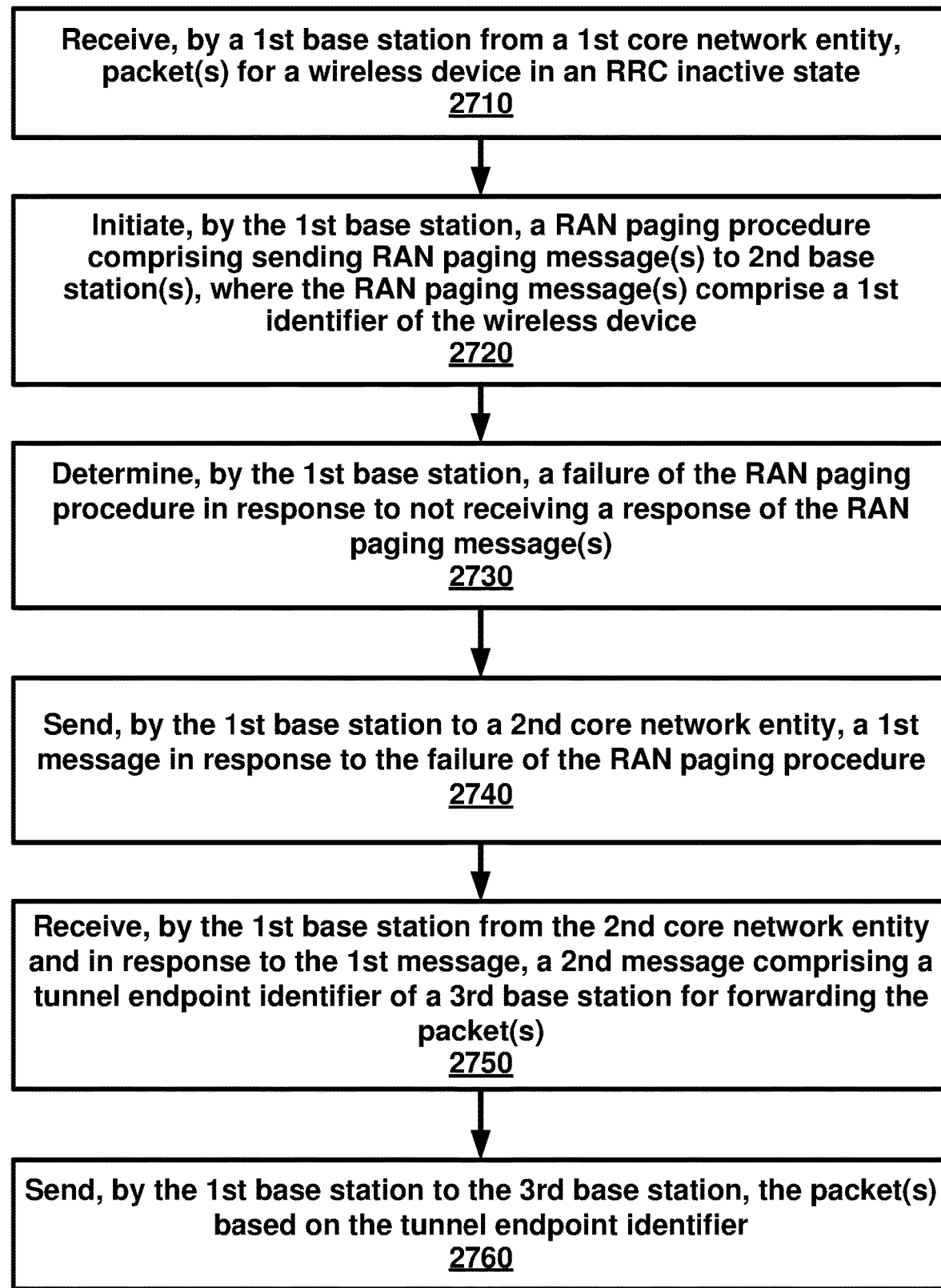
FIG. 27 is an example flow diagram as per an aspect of an embodiment of the present disclosure.

FIG. 27 is an example flow diagram as per an aspect of an embodiment of the present disclosure. At 2710, a first base station may receive from a first core network entity, one or more packets for a wireless device in a radio resource control (RRC) inactive state. At 2720, the first base station may initiate a radio access network (RAN) paging procedure comprising sending at least one RAN paging message to at least one second base station. The at least one RAN paging message may comprise a first identifier of the wireless device. At 2730, the first base station may determine a failure of the RAN paging procedure in response to not receiving a response of the at least one RAN paging message. At 2740, the first base station may send a first message to a second core network entity in response to the failure of the RAN paging procedure. At 2750, the first base station may receive a second message from the second core network entity in response to the first message. The second message may comprise a tunnel endpoint identifier of a third base station for forwarding the one or more packets. At 2760, the first base station may send to the third base station, the one or more packets based on the tunnel endpoint identifier.

According to an embodiment, the second core network entity may initiate, in response to receiving the first message, a core network paging procedure. The core network paging procedure may comprise sending a first paging message to the third base station. The first paging message may comprise a second identifier of the wireless device. The second core network entity may receive from the third base station, a third message in response to the first paging message. The third message may comprise the tunnel endpoint identifier of the third base station. According to an embodiment, the first core network entity may comprise a control plane core network node. The second core network entity may comprise a user plane core network node. According to an embodiment, the sending of the one or more packets may be via a direct tunnel between the first base station and the third base station. The direct tunnel may be associated with the tunnel endpoint identifier. According to an embodiment, the tunnel endpoint identifier may comprise an internet protocol (IP) address of the third base station. According to an embodiment, the first message may indicate the failure of the RAN paging procedure. According to an embodiment, the at least one RAN paging message may comprise at least one of: a RAN notification information; a context identifier of the wireless device; a reason of initiating the RAN paging procedure; and/or the like. According to an embodiment, the at least one second base station may transmit a second RAN paging message via a radio interface in response to receiving the at least one RAN paging message.

FIG. 28 is an example flow diagram as per an aspect of an embodiment of the present disclosure. At 2810, a third base station may receive from a second core network entity, a first paging message for a wireless device. The first paging message may comprise a second identifier of the wireless device. At 2820, the third base station may transmit, in response to receiving the first paging message, a second paging message for the wireless device via a radio interface. At 2830, the third base station may receive from the wireless device, in response to the first paging message, a random access preamble for a radio resource control (RRC) connection. At 2840, the third base station may transmit to the second core network entity, in response to the RRC connection, a third message comprising a tunnel endpoint identifier of the third base station. At 2850, the third base station may receive from a first base station, one or more packets based on the tunnel endpoint identifier.

According to an embodiment, the second core network entity may comprise a user plane core network node. According to an embodiment, the receiving of the one or more packets may be via a direct tunnel between the first base station and the third base station. The direct tunnel may be associated with the tunnel endpoint identifier. According to an embodiment, the tunnel endpoint identifier may comprise an internet protocol (IP) address of the third base station.

Figure 29:
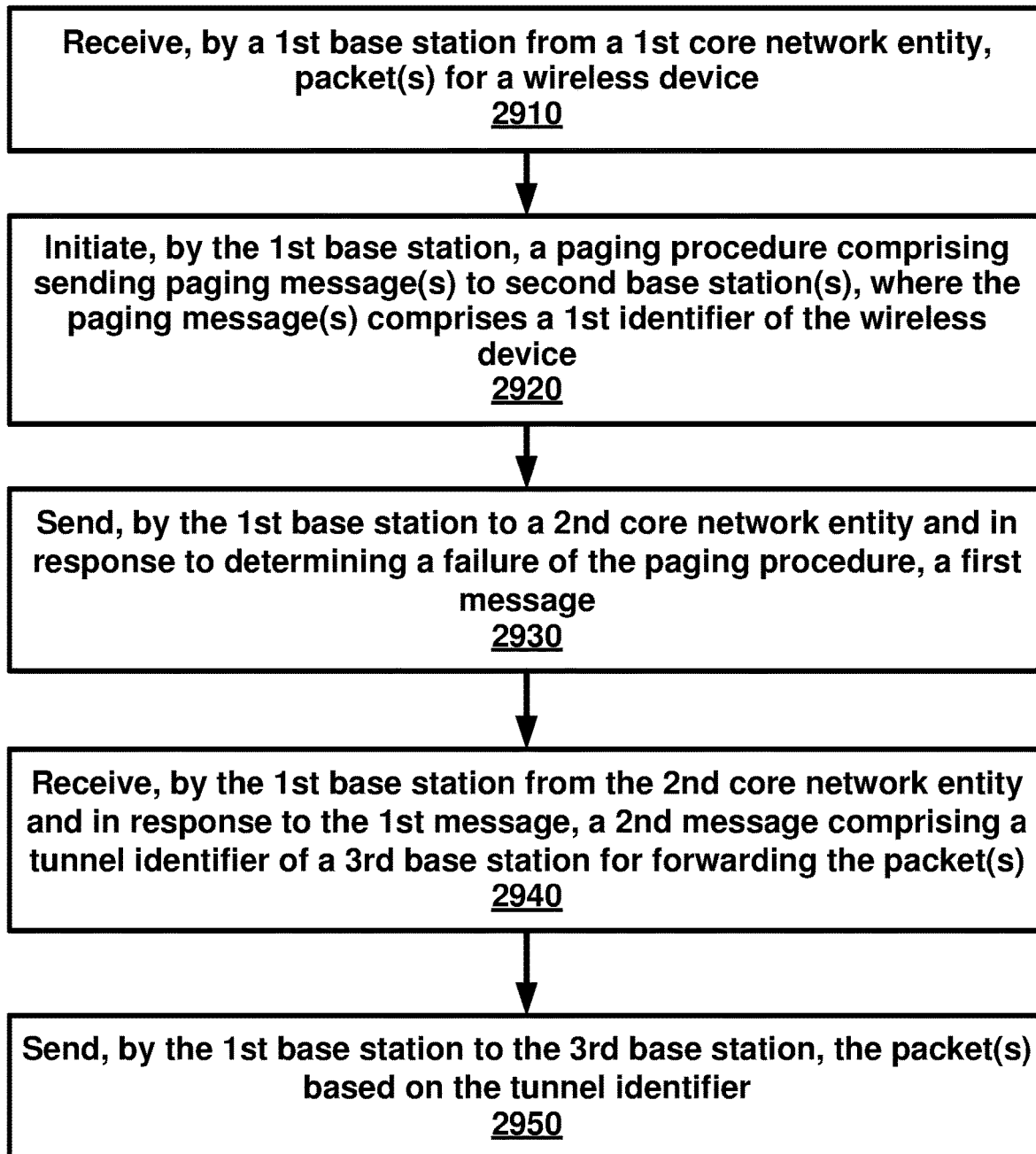
FIG. 29 is an example flow diagram as per an aspect of an embodiment of the present disclosure.

FIG. 29 is an example flow diagram as per an aspect of an embodiment of the present disclosure. At 2910, a first base station may receive from a first core network entity, one or more packets for a wireless device. At 2920, the first base station may initiate a paging procedure. The paging procedure may comprise sending at least one paging message to at least one second base station. The at least one paging message may comprise a first identifier of the wireless device. At 2930, the first base station may send a first message to a second core network entity in response to determining a failure of the paging procedure. At 2940, the first base station may receive a second message from the second core network entity in response to the first message. The second message may comprise a tunnel identifier of a third base station for forwarding the one or more packets. At

2950, the first base station may send to the third base station, the one or more packets based on the tunnel identifier.

According to an embodiment, the paging procedure may comprise a radio access network (RAN) paging procedure. According to an embodiment, the tunnel identifier may comprise a tunnel endpoint identifier. According to an embodiment, the wireless device may be in a radio resource control inactive state. According to an embodiment, the determining the failure may be in response to not receiving a response of the at least one paging message. According to an embodiment, the first message may indicate the failure of the paging procedure.

Figure 30:
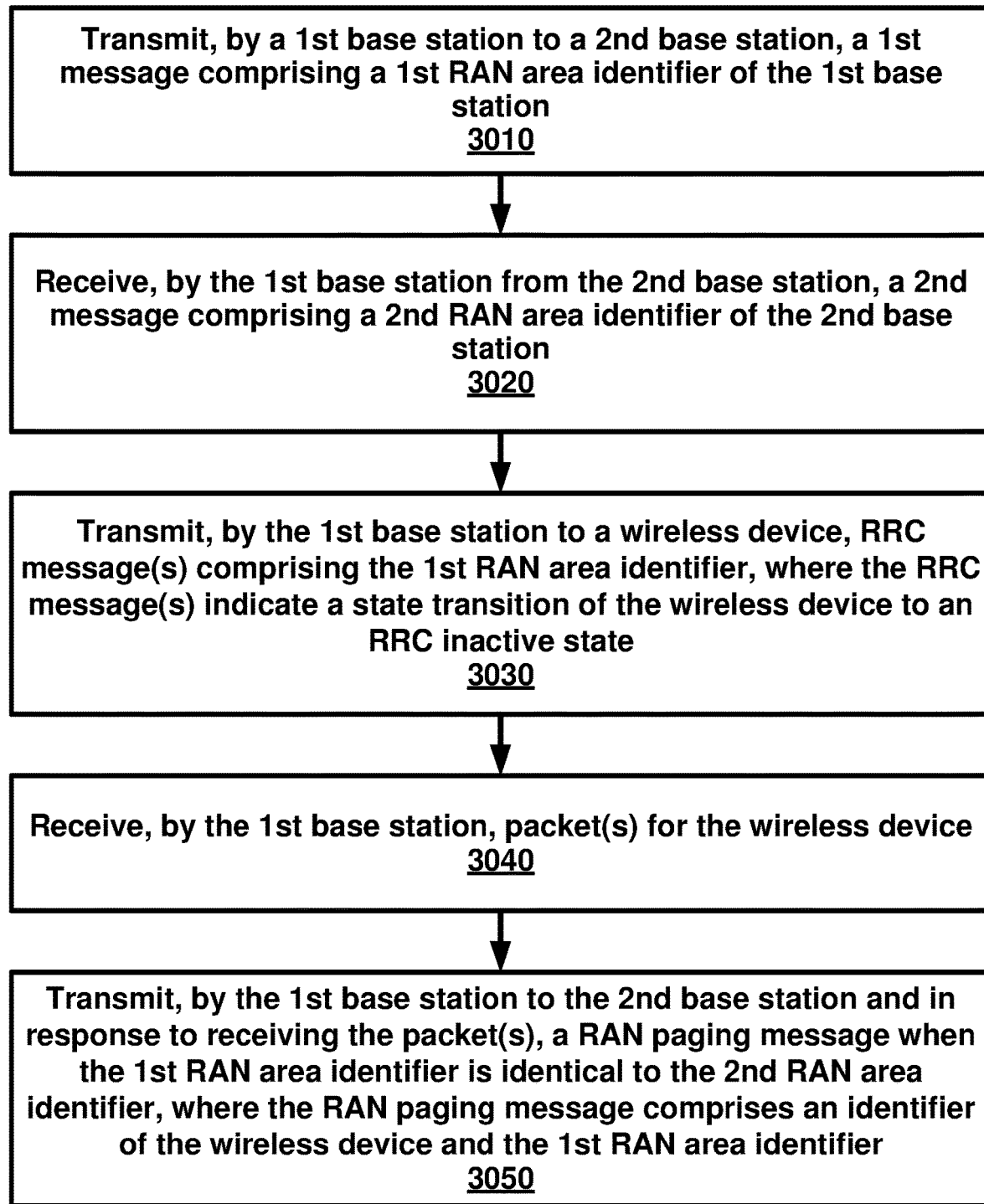
FIG. 30 is an example diagram as per an aspect of an embodiment of the present disclosure.

FIG. 30 is an example flow diagram as per an aspect of an embodiment of the present disclosure. At 3010, a first base station may transmit to a second base station, a first message comprising a first radio access network (RAN) area identifier of the first base station. At 3020, the first base station may receive from the second base station, a second message comprising a second RAN area identifier of the second base station. At 3030, the first base station may transmit to a wireless device, at least one radio resource control (RRC) message. The at least one RRC message may comprise the first RAN area identifier. The at least one RRC message may indicate a state transition of the wireless device to an RRC inactive state. At 3040, the first base station may receive one or more packets for the wireless device. At 3050, the first base station may transmit to the second base station, and in response to receiving the one or more packets, a RAN paging message when the first RAN area identifier is identical to the second RAN area identifier. The RAN paging message may comprise an identifier of the wireless device and the first RAN area identifier.

According to an embodiment, the first message may further comprise a first cell identifier of a first cell of the first base station. The first cell may be associated with the first RAN area identifier. According to an embodiment, the second message may further comprise a second cell identifier of a second cell of the second base station. The second cell may be associated with the second RAN area identifier. According to an embodiment, the transmitting of the RAN paging message may be in response to the wireless device being in the RRC inactive state. According to an embodiment, the first base station may further receive from the second base station, a third message in response to the RAN paging message. According to an embodiment, the first base station may further transmit to the second base station, the one or more packets for the wireless device in response to the third message. According to an embodiment, the first base station may keeps a wireless device context of the wireless device at least during a time in which the wireless device is in the RRC inactive state. The wireless device context may comprise at least one of: a bearer configuration information; a logical channel configuration information; a security information; and/or the like. According to an embodiment, the first message may comprise at least one of: an interface setup request message; an interface setup response message; a base station configuration update message; and/or the like. According to an embodiment, the first base station may receive the one or more packets from a core network entity. According to an embodiment, the first base station may further transmit one or more RAN paging messages to one or more third base stations associated with the first RAN identifier.

Figure 31:
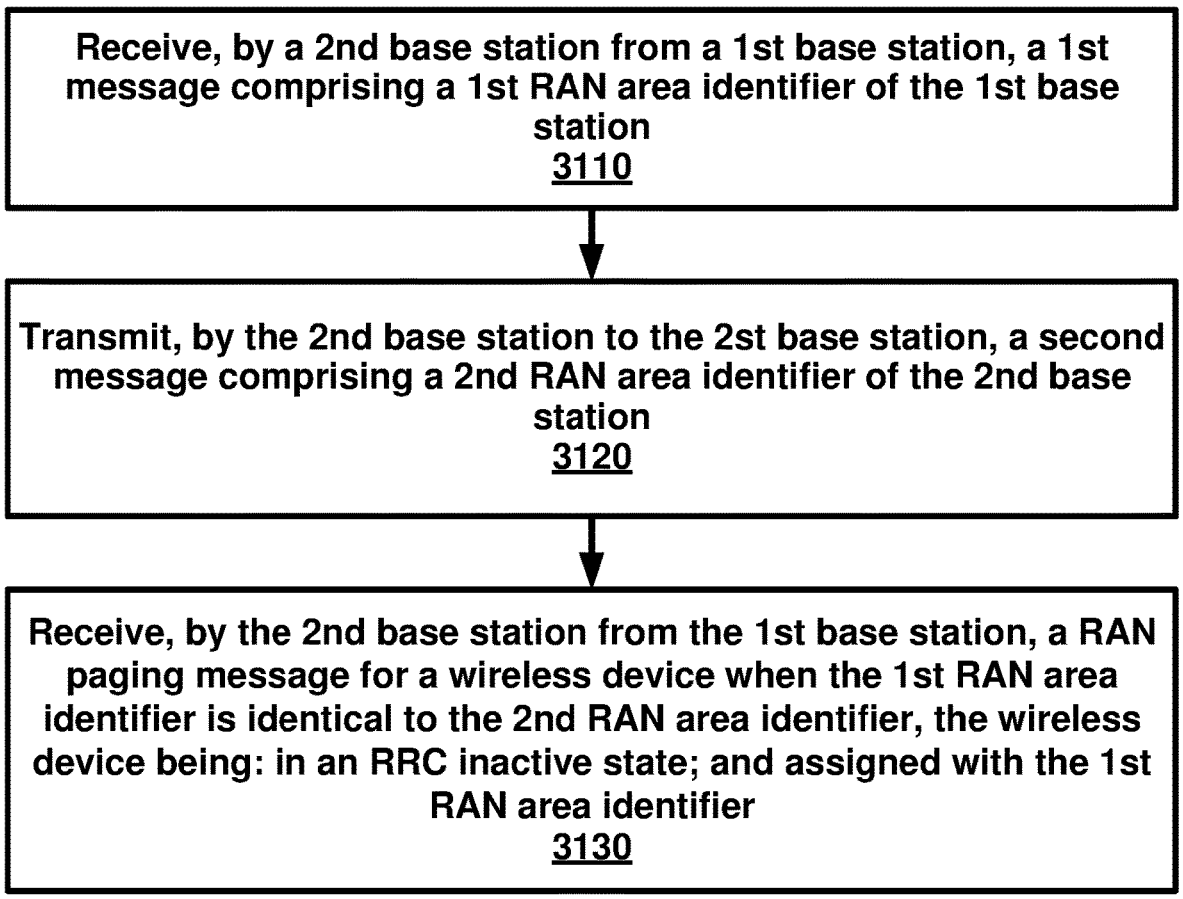
FIG. 31 is an example flow diagram as per an aspect of an embodiment of the present disclosure.

FIG. 31 is an example flow diagram as per an aspect of an embodiment of the present disclosure. At 3110, a second base station may receive from a first base station, a first message comprising a first radio access network (RAN) area identifier of the first base station. At 3120, the second base station may transmit to the first base station, a second message comprising a second RAN area identifier of the second base station. At 3130, the second base station may receive from the first base station, a RAN paging message for a wireless device when the first RAN area identifier is identical to the second RAN area identifier. The wireless device may be: in a radio resource control (RRC) inactive state; and assigned with the first RAN area identifier. According to an embodiment, the RAN paging message may comprise an identifier of the wireless device and the first RAN area identifier.

Figure 32:
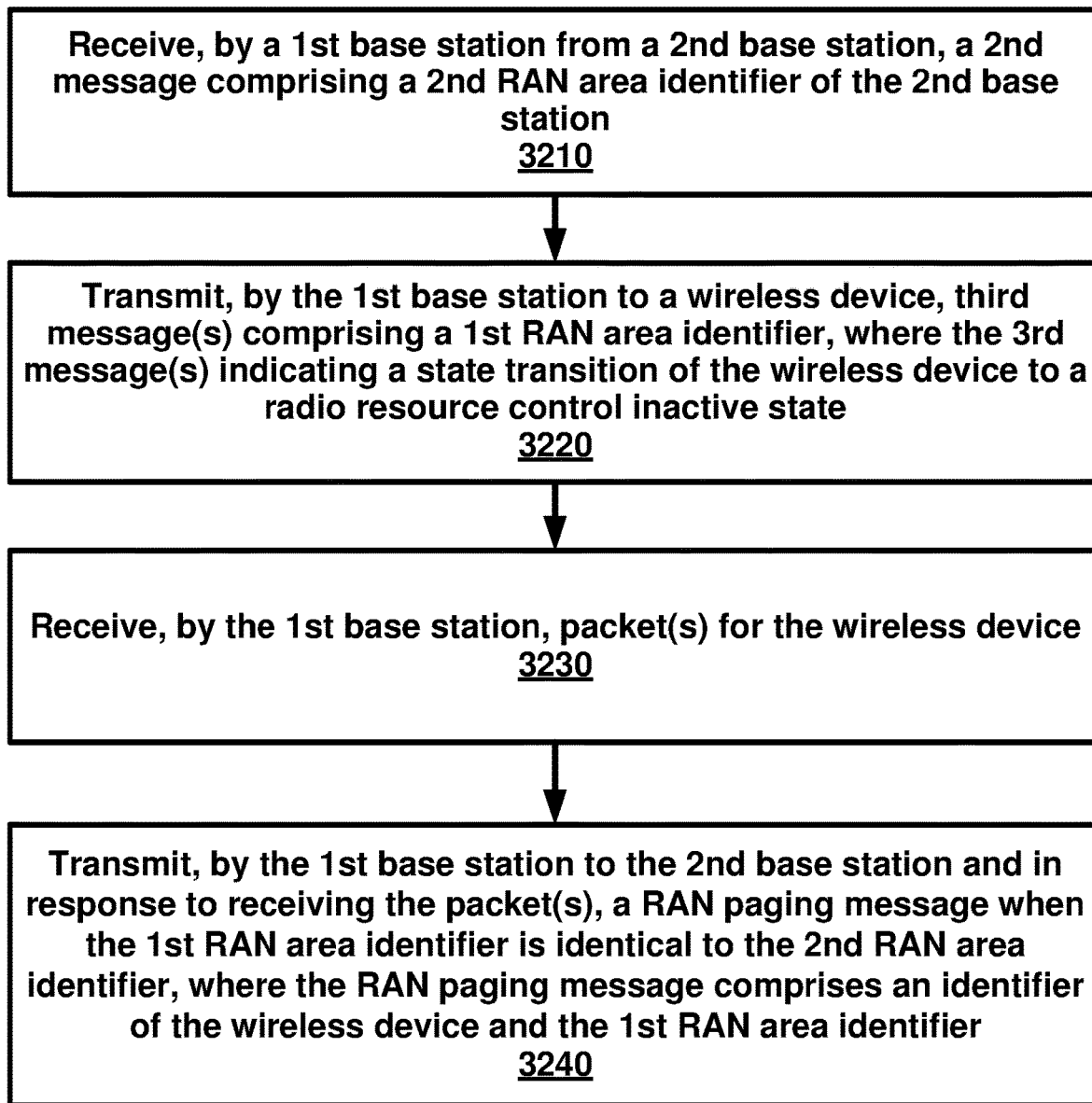
FIG. 32 is an example diagram as per an aspect of an embodiment of the present disclosure.

FIG. 32 is an example flow diagram as per an aspect of an embodiment of the present disclosure. At 3210, a first base station may receive from a second base station, a second message comprising a second radio access network (RAN) area identifier of the second base station. At 3220, the first base station may transmit to a wireless device, at least one third message comprising a first RAN area identifier. The at least one third message may indicate a state transition of the wireless device to a radio resource control inactive state. At 3230, the first base station may receive one or more packets for the wireless device. At 3240, the first base station may transmit to the second base station and in response to receiving the one or more packets, a RAN paging message when the first RAN area identifier is identical to the second RAN area identifier. The RAN paging message may comprise an identifier of the wireless device and the first RAN area identifier. According to an embodiment, the first base station may further transmit to the second base station, a first message comprising a first RAN area identifier of the first base station.

FIG. 33 is an example flow diagram as per an aspect of an embodiment of the present disclosure. At 3310, a first base station may receive from a second base station, at least one first packet associated with a wireless device. At 3320, the first base station may receive from a core network entity, at least one second packet for the wireless device when the wireless device is in a radio resource control (RRC) inactive state. At 3330, the first base station may transmit a first RAN paging message to a third base station of a radio access network (RAN) area associated with the wireless device and in response to a first time duration being larger than a first time value. The first time duration may comprise a time duration between the receiving of the at least one first packet and the receiving of the at least one second packet. At 3340, the first base station may transmit a second RAN paging message to the second base station regardless of the first time duration being smaller or larger than the first time value. At 3350, the first base station may transmit at least one second packet to one of the second base station or the third base station based on a response received for one of the first RAN paging message or the second RAN paging message.

According to an embodiment, the RAN area may be associated with a RAN notification area. According to an embodiment, the first RAN paging message or the second RAN paging message may comprise: an identifier of the wireless device; and a RAN area information of the RAN area. According to an embodiment, the at least one first packet may be associated with at least one of: an uplink data transmission of the wireless device being in the RRC inactive state; a data transmission; a RAN notification area update procedure; or a state transition of the wireless device from a RRC inactive state connected state to the RRC inactive state. According to an embodiment, the first time value may be based on moving speed of the wireless device.

According to an embodiment, the first base station may keep a wireless device context of the wireless device at least during a time in which the wireless device is in the RRC inactive state. The wireless device context may comprise at least one of: a bearer configuration information; a logical channel configuration information; a packet data convergence protocol configuration information; or a security information. According to an embodiment, the first base station may be associated with the RAN area. According to an embodiment, the first base station may further transmit to the wireless device, at least one RRC message comprising RAN area information of the RAN area. The at least one RRC message may indicate a state transition of the wireless device to the RRC inactive state.

According to an embodiment, the second base station may transmit a first paging message via a first cell of the RAN area associated with the wireless device in response to: receiving the second RAN paging message; and a second time duration being larger than a second time value. The second time duration may comprise a time duration between receiving the at least one first packet from the wireless device and the receiving of the second RAN paging message. The second base station may transmit a second paging message via a second cell regardless of the second time duration being smaller or larger than the second time value wherein the second base station may have received the at least one first packet from the wireless device via the second cell. According to an embodiment, the second base may further transmit the at least one second packet via one of the first cell or the second cell based on a response received for one of the first paging message or the second paging message.

Figure 34:
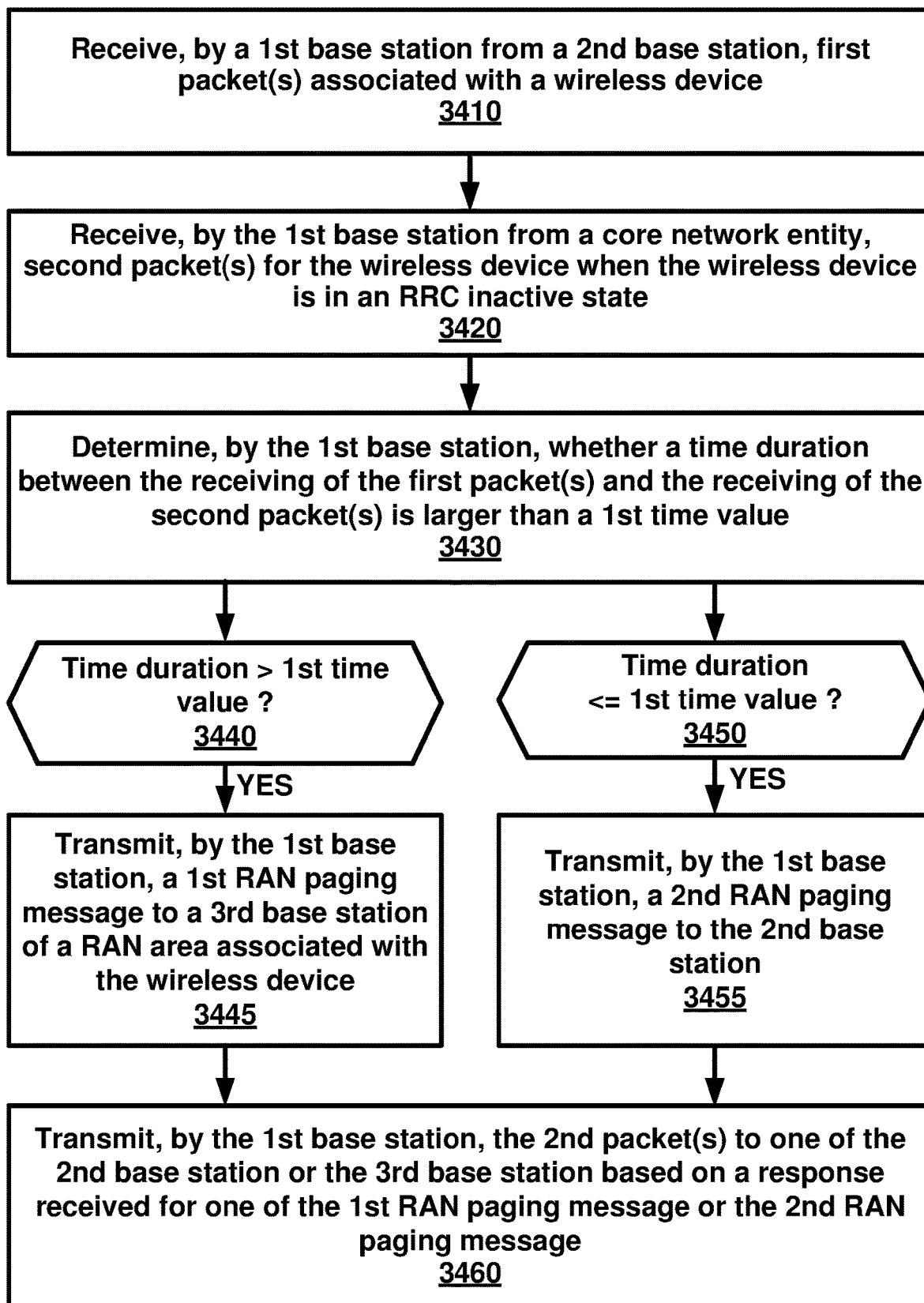
FIG. 34 is an example diagram as per an aspect of an embodiment of the present disclosure.

FIG. 34 is an example flow diagram as per an aspect of an embodiment of the present disclosure. At 3410, a first base station may receive from a second base station, at least one first packet associated with a wireless device. At 3420, the first base station may receive from a core network entity, at least one second packet for the wireless device when the wireless device is in a radio resource control (RRC) inactive state. At 3430, the first base station may determine whether a time duration between the receiving of the at least one first packet and the receiving of the at least one second packet is larger than a first time value. When the time duration is larger than the first time value (3440), the first base station may transmit a first RAN paging message to a third base station of a radio access network (RAN) area associated with the wireless device at 3445. When the time duration is smaller than or equal to the first time value (3450), the first base station may transmit a second RAN paging message to the second base station at 3455. At 3460, the first base station may transmit at least one second packet to one of the second base station or the third base station based on a response received for one of the first RAN paging message or the second RAN paging message.

FIG. 35 is an example flow diagram as per an aspect of an embodiment of the present disclosure. At 3510, a first base station may receive from a wireless device, at least one first packet via a first cell of the first base station. At 3520, the first base station may receive from a core network entity, at least one second packet for the wireless device when the wireless device is in a radio resource control inactive state. At 3530, the first base station may transmit a first RAN paging message to a second base station of a radio access network (RAN) area associated with the wireless device and in response to a first time duration being larger than a first time value. The first time duration may comprise a time duration between the receiving of the at least one first packet and the receiving of the at least one second packet. At 3540, the first base station may transmit a second RAN paging message via one or more second cells of the RAN area regardless of the first time duration being smaller or larger than the first time value. The one or more second cells may comprise the first cell. At 3550, the first base station may transmit the at least one second packet to the wireless device via one of the one or more second cells or the second base station based on a response received for one of the first RAN paging message or the second RAN paging message.

FIG. 36 is an example flow diagram as per an aspect of an embodiment of the present disclosure. At 3610, a wireless device may receive from a base station, at least one first message comprising configuration parameters of at least one of: at least one logical channel; or at least one radio bearer. At 3620, the wireless device may receive from the base station, a second message indicating a radio resource control (RRC) state transition of the wireless device from an RRC connected state to an RRC inactive state. At 3630, the wireless device being in the RRC inactive state may select a first cell based on the configuration parameters. At 3640, the wireless device may transmit to the base station, a random access preamble via the first cell.

According to an embodiment, the configuration parameters may further comprises at least one of: a first cell identifier of the first cell; at least one logical channel identifier of the at least one logical channel; or at least one radio bearer identifier of the at least one radio bearer. According to an embodiment, the configuration parameters may indicate association of the at least one logical channel or the at least one radio bearer with the first cell. According to an embodiment, the configuration parameters may indicate association of the at least one logical channel or the at least one radio bearer with at least one of: one or more cell types; or one or more frequency bands. According to an embodiment, the configuration parameters may further indicate association of a first network slice with at least one of: the first cell; one or more cell types; or one or more frequency bands. According to an embodiment, the at least one logical channel or the at least one radio bearer may be associated with a first network slice. According to an embodiment, the base station may keep a wireless device context of the wireless device at least during a time in which the wireless device is in the RRC inactive state. The wireless device context may comprising at least one of: a bearer configuration information; a logical channel configuration information; a packet data convergence protocol configuration information; a security information; and/or the like. According to an embodiment, the selecting of the first cell may be in response to an uplink buffer comprising one or more packets associated with at least one of: the at least one logical channel; or the at least one radio bearer. According to an embodiment, the transmitting of the random access preamble message may be in response to at least one of: an uplink buffer comprising one or more packets; a paging indication from the base station; moving to a first radio access network notification area; or moving to a first tracking area.

FIG. 37 is an example flow diagram as per an aspect of an embodiment of the present disclosure. At 3710, a base station may transmit to a wireless device, at least one first message. The at least one first message may comprise configuration parameters of at least one of: at least one logical channel; or at least one radio bearer. At 3720, the base station may transmit to the wireless device, a second message indicating a radio resource control (RRC) state transition of the wireless device from an RRC connected state to an RRC inactive state. At 3730, the base station may receive from the wireless device, a random access preamble via the first cell selected by the wireless device based on the configuration parameters. The wireless device may be in the RRC inactive state. According to an embodiment, the configuration parameters may further comprises at least one of: a first cell identifier of the first cell; at least one logical channel identifier of the at least one logical channel; or at least one radio bearer identifier of the at least one radio bearer.

Figure 38:
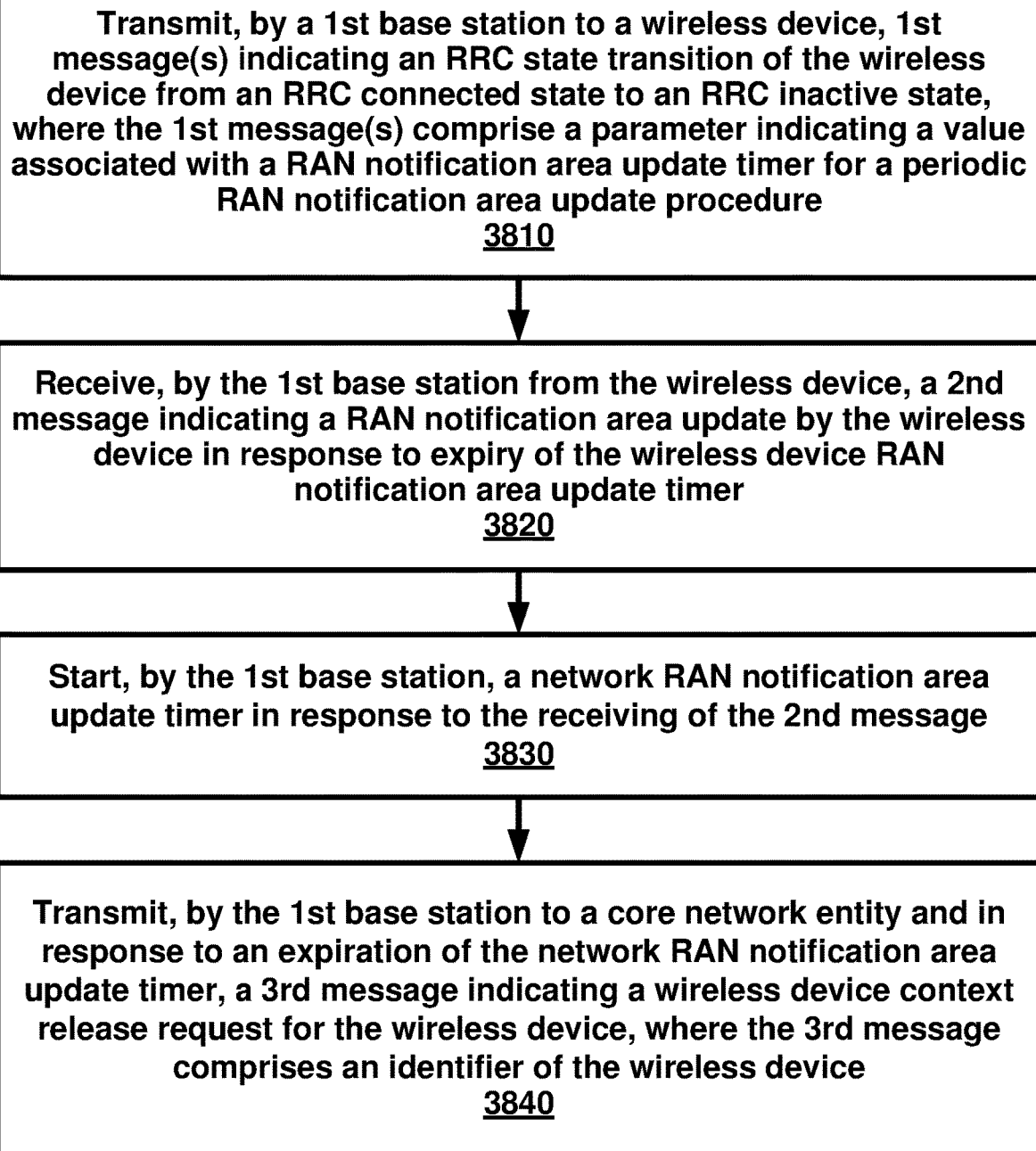
FIG. 38 is an example flow diagram as per an aspect of an embodiment of the present disclosure.

FIG. 38 is an example flow diagram as per an aspect of an embodiment of the present disclosure. At 3810, a first base station may transmit to a wireless device, at least one first message indicating a radio resource control (RRC) state transition of the wireless device from an RRC connected state to an RRC inactive state. The at least one first message may comprise a parameter indicating a value associated with a wireless device radio access network (RAN) notification area update timer for a periodic RAN notification area update procedure. At 3820, the first base station may receive a second message indicating a RAN notification area update by the wireless device in response to expiry of the wireless device RAN notification area update timer. At 3830, the first base station may start a network RAN notification area update timer in response to the receiving of the second message. At 3840, the first base station may transmit to a core network entity and in response to an expiration of the network RAN notification area update timer, a third message indicating a wireless device context release request for the wireless device. The third message may comprise an identifier of the wireless device.

According to an embodiment, the at least one first message may further comprise a RAN notification area information associated with the wireless device. The RAN notification area information may comprise at least one of: a RAN area identifier; or a cell identifier. According to an embodiment, the first base station may further release a wireless device context of the wireless device based on the expiration of the network RAN notification area update timer. According to an embodiment, the third message may further indicate that the wireless device fails in a period RAN notification area update. According to an embodiment, the core network entity may determine the wireless device as being in an idle state in response to receiving the third message. According to an embodiment, the first base station may keep a wireless device context of the wireless device at least during a time in which the wireless device is in the RRC inactive state. The wireless device context may comprise at least one of: a bearer configuration information; a logical channel configuration information; a packet data convergence protocol configuration information; a security information, and/or the like. According to an embodiment, the wireless device RAN notification area update timer may be configured based on at least one of: a moving speed of the wireless device; a wireless device type of the wireless device; a network slice of the wireless device; a bearer of the wireless device; and/or the like. According to an embodiment, the core network entity may further transmit to a second base station, a paging message for the wireless device based on the third message. The core network entity may further receive from the second base station, a response message to the paging message. According to an embodiment, the wireless device may transition a RRC state from the RRC inactive state to a RRC idle state in response to failing in a period RAN notification area update. According to an embodiment, the second message may comprise an RRC connection resume request message.

Figure 39:
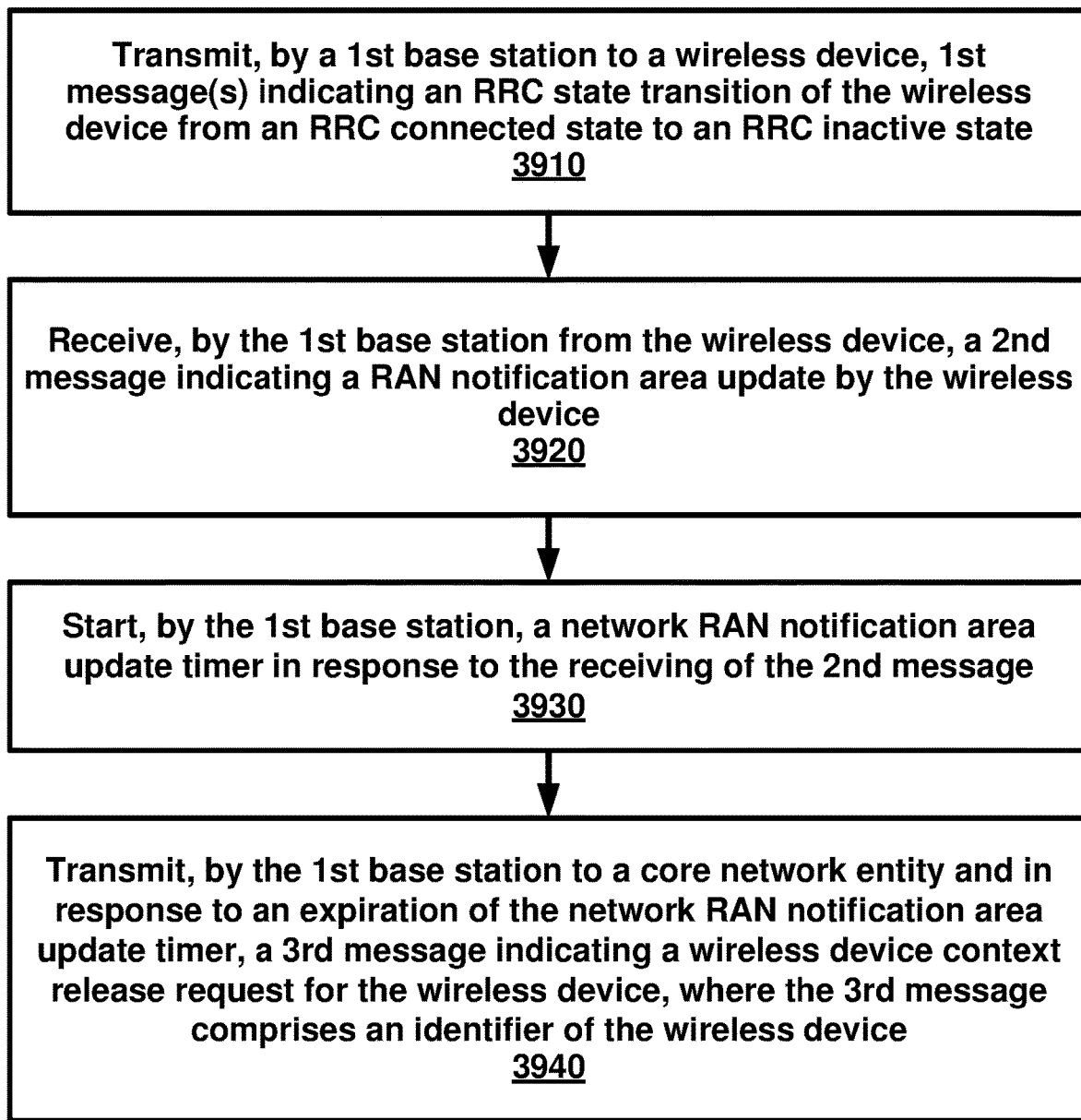
FIG. 39 is an example diagram as per an aspect of an embodiment of the present disclosure.

FIG. 39 is an example flow diagram as per an aspect of an embodiment of the present disclosure. At 3910, a first base station may transmit to a wireless device, at least one first message indicating a radio resource control (RRC) state transition of the wireless device from an RRC connected state to an RRC inactive state. At 3920, the first base station may receive from the wireless device, a second message indicating a RAN notification area update by the wireless device. At 3930, the first base station may start a network radio access network (RAN) notification area update timer in response to the receiving of the second message. At 3940, the first base station may transmit to a core network entity and in response to an expiration of the network RAN notification area update timer, a third message indicating a wireless device context release request for the wireless device. The third message may comprise an identifier of the wireless device.

FIG. 40 is an example flow diagram as per an aspect of an embodiment of the present disclosure. At 4010, a first base station may transmit to a wireless device, at least one first message indicating a radio resource control (RRC) state transition of the wireless device from an RRC connected state to an RRC inactive state. The at least one first message may comprise a parameter indicating a value associated with a wireless device radio access network (RAN) notification area update timer for a periodic RAN notification area update procedure. At 4020, the first base station may receive a second message indicating a RAN notification area update by the wireless device in response to expiry of the wireless device RAN notification area update timer. At 4030, the first base station may transmit to a core network entity and in response to not receiving a RAN notification area update within a time duration, a third message indicating a wireless device context release request for the wireless device. The time period may be longer than the value associated with the wireless device RAN notification area update timer. According to an embodiment, the third message may comprise an identifier of the wireless device.

Figure 41:
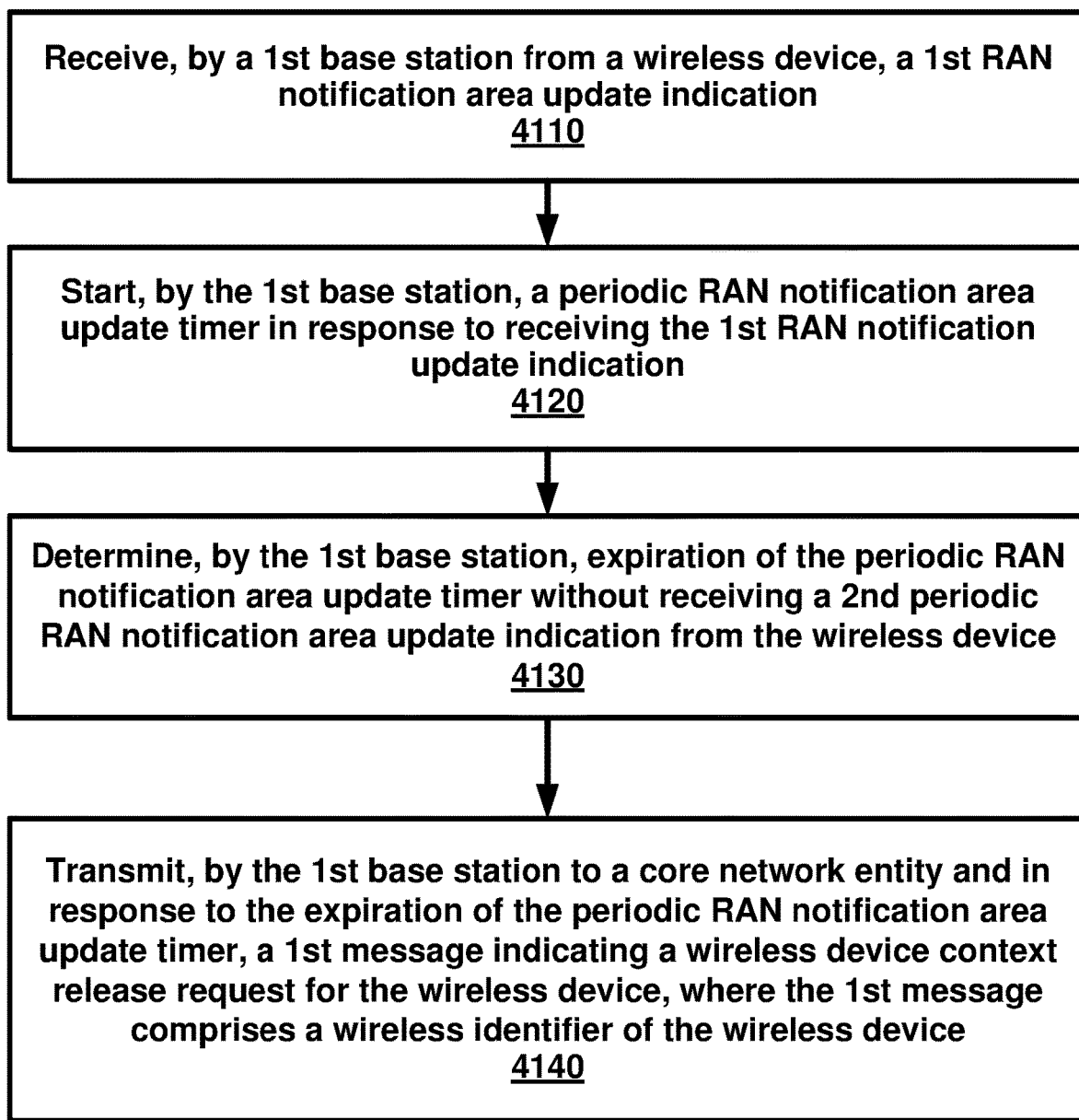
FIG. 41 is an example flow diagram as per an aspect of an embodiment of the present disclosure.

FIG. 41 is an example flow diagram as per an aspect of an embodiment of the present disclosure. At 4110, a first base station may transmit to a wireless device, at least one first message indicating a radio resource control (RRC) state transition of the wireless device from an RRC connected state to an RRC inactive state. The at least one first message may comprise a parameter indicating a first value associated with a wireless device radio access network (RAN) notification area update timer for a periodic RAN notification area update procedure. At 4120, the wireless device may start a RAN notification area update timer in response to the RRC state transition. At 4130, the first base station may receive a second message indicating a RAN notification area update with a second value by the wireless device in response to expiry of the wireless device RAN notification area update timer. At 4140, the first base station may start a network RAN notification area update timer in response to the receiving of the second message. At 4140, the first base station may transmit to a core network entity and in response to an expiration of the network RAN notification area update timer, a third message indicating a wireless device context release request for the wireless device. The third message may comprise an identifier of the wireless device. The second value of the network RAN notification area update timer may be larger than the first value of the wireless device RAN notification area update timer.

A base station may communicate with a mix of wireless devices. Wireless devices and/or base stations may support multiple technologies, and/or multiple releases of the same technology. Wireless devices may have some specific capability(ies) depending on wireless device category and/or capability(ies). A base station may comprise multiple sectors. When this disclosure refers to a base station communicating with a plurality of wireless devices, this disclosure may refer to a subset of the total wireless devices in a coverage area. This disclosure may refer to, for example, a plurality of wireless devices of a given LTE or 5G release with a given capability and in a given sector of the base station. The plurality of wireless devices in this disclosure may refer to a selected plurality of wireless devices, and/or a subset of total wireless devices in a coverage area which perform according to disclosed methods, and/or the like. There may be a plurality of base stations or a plurality of wireless devices in a coverage area that may not comply with the disclosed methods, for example, because those wireless devices or base stations perform based on older releases of LTE or 5G technology.

In this disclosure, "a" and "an" and similar phrases are to be interpreted as "at least one" and "one or more." Similarly, any term that ends with the suffix "(s)" is to be interpreted as "at least one" and "one or more." In this disclosure, the term "may" is to be interpreted as "may, for example." In other words, the term "may" is indicative that the phrase following the term "may" is an example of one of a multitude of suitable possibilities that may, or may not, be employed to one or more of the various embodiments.

If A and B are sets and every element of A is also an element of B, A is called a subset of B. In this specification, only non-empty sets and subsets are considered. For example, possible subsets of B={cell1, cell2} are: {cell1}, {cell2}, and {cell1, cell2}. The phrase "based on" (or equally "based at least on") is indicative that the phrase following the term "based on" is an example of one of a multitude of suitable possibilities that may, or may not, be employed to one or more of the various embodiments. The phrase "in response to" (or equally "in response at least to") is indicative that the phrase following the phrase "in response to" is an example of one of a multitude of suitable possibilities that may, or may not, be employed to one or more of the various embodiments. The phrase "depending on" (or equally "depending at least to") is indicative that the phrase following the phrase "depending on" is an example of one of a multitude of suitable possibilities that may, or may not, be employed to one or more of the various embodiments. The phrase "employing/using" (or equally "employing/using at least") is indicative that the phrase following the phrase "employing/using" is an example of one of a multitude of suitable possibilities that may, or may not, be employed to one or more of the various embodiments.

The term configured may relate to the capacity of a device whether the device is in an operational or non-operational state. Configured may also refer to specific settings in a device that effect the operational characteristics of the device whether the device is in an operational or non-operational state. In other words, the hardware, software, firmware, registers, memory values, and/or the like may be "configured" within a device, whether the device is in an operational or nonoperational state, to provide the device with specific characteristics. Terms such as "a control message to cause in a device" may mean that a control message has parameters that may be used to configure specific characteristics or may be used to implement certain actions in the device, whether the device is in an operational or non-operational state In this disclosure, various embodiments are disclosed. Limitations, features, and/or elements from the disclosed example embodiments may be combined to create further embodiments within the scope of the disclosure.

In this disclosure, parameters (or equally called, fields, or Information elements: IEs) may comprise one or more information objects, and an information object may comprise one or more other objects. For example, if parameter (IE) N comprises parameter (IE) M, and parameter (IE) M comprises parameter (IE) K, and parameter (IE) K comprises parameter (information element) J. Then, for example, N comprises K, and N comprises J. In an example embodiment, when one or more messages comprise a plurality of parameters, it implies that a parameter in the plurality of parameters is in at least one of the one or more messages, but does not have to be in each of the one or more messages.

Furthermore, many features presented above are described as being optional through the use of "may" or the use of parentheses. For the sake of brevity and legibility, the present disclosure does not explicitly recite each and every permutation that may be obtained by choosing from the set of optional features. However, the present disclosure is to be interpreted as explicitly disclosing all such permutations. For example, a system described as having three optional features may be embodied in seven different ways, namely with just one of the three possible features, with any two of the three possible features or with all three of the three possible features.

Many of the elements described in the disclosed embodiments may be implemented as modules. A module is defined here as an element that performs a defined function and has a defined interface to other elements. The modules described in this disclosure may be implemented in hardware, software in combination with hardware, firmware, wetware (i.e. hardware with a biological element) or a combination thereof, all of which may be behaviorally equivalent. For example, modules may be implemented as a software routine written in a computer language configured to be executed by a hardware machine (such as C, C++, Fortran, Java, Basic, Matlab or the like) or a modeling/simulation program such as Simulink, Stateflow, GNU Octave, or LabVIEWMathScript. Additionally, it may be possible to implement modules using physical hardware that incorporates discrete or programmable analog, digital and/or quantum hardware. Examples of programmable hardware comprise: computers, microcontrollers, microprocessors, application-specific integrated circuits (ASICs); field programmable gate arrays (FPGAs); and complex programmable logic devices (CPLDs). Computers, microcontrollers and microprocessors are programmed using languages such as assembly, C, C++ or the like. FPGAs, ASICs and CPLDs are often programmed using hardware description languages (HDL) such as VHSIC hardware description language (VHDL) or Verilog that configure connections between internal hardware modules with lesser functionality on a programmable device. The above mentioned technologies are often used in combination to achieve the result of a functional module.

The disclosure of this patent document incorporates material which is subject to copyright protection. The copyright owner has no objection to the facsimile reproduction by anyone of the patent document or the patent disclosure, as it appears in the Patent and Trademark Office patent file or records, for the limited purposes required by law, but otherwise reserves all copyright rights whatsoever.

While various embodiments have been described above, it should be understood that they have been presented by way of example, and not limitation. It will be apparent to persons skilled in the relevant art(s) that various changes in form and detail can be made therein without departing from the scope. In fact, after reading the above description, it will be apparent to one skilled in the relevant art(s) how to implement alternative embodiments. Thus, the present embodiments should not be limited by any of the above described exemplary embodiments.

In addition, it should be understood that any figures which highlight the functionality and advantages, are presented for example purposes only. The disclosed architecture is sufficiently flexible and configurable, such that it may be utilized in ways other than that shown. For example, the actions listed in any flowchart may be re-ordered or only optionally used in some embodiments.

Further, the purpose of the Abstract of the Disclosure is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract of the Disclosure is not intended to be limiting as to the scope in any way.

Finally, it is the applicant's intent that only claims that include the express language "means for" or "step for" be interpreted under 35 U.S.C. 112. Claims that do not expressly include the phrase "means for" or "step for" are not to be interpreted under 35 U.S.C. 112.

The invention claimed is:

1. A method comprising:
receiving, by a first base station from a second base station, an uplink signal of a wireless device, wherein a radio access network (RAN) notification area of the wireless device comprises the first base station, the second base station, and one or more other base stations;
receiving, by the first base station, a packet for transmission to the wireless device:
after a duration from receiving the uplink signal; and
while the wireless device is in a radio resource control inactive state:
determining that the duration is shorter than a value; and
based on the determining:
sending, by the first base station to the second base station, a radio access network (RAN) paging and the packet; and
not sending, by the first base station to the one or more other base stations in the RAN notification area, the RAN paging and the packet.

2. The method of claim 1, wherein the receiving the packet for transmission to the wireless device comprises receiving the packet for the wireless device from a core network node.

3. The method of claim 1, wherein the uplink signal is associated with at least one of:
a data transmission;
an uplink data transmission of the wireless device being in the radio resource control (RRC) inactive state;
a RAN notification area update procedure; or
a state transition of the wireless device from an RRC connected state to the RRC inactive state.

4. The method of claim 1, wherein the RAN paging indicates at least one of:
an identifier of the wireless device; or
information of the RAN notification area.

5. The method of claim 1, wherein the value is based on moving speed of the wireless device.

6. The method of claim 1, wherein the first base station keeps a wireless device context of the wireless device at least during a time in which the wireless device is in the radio resource control inactive state, the wireless device context comprising at least one of:
a bearer configuration information;
a logical channel configuration information;
a packet data convergence protocol configuration information; or
a security information.

7. The method of claim 1, wherein the first base station is an anchor base station associated with the RAN notification area.

8. The method of claim 1, further comprising sending, by the first base station to the wireless device, at least one radio resource control message comprising information of the RAN notification area, wherein the at least one radio resource control message indicates a state transition of the wireless device to the radio resource control inactive state.

9. The method of claim 1, further comprising receiving, by the first base station from the second base station, a RAN paging response.

10. The method of claim 9, wherein the sending of the packet by the first base station to the second base station is further based on the receiving the RAN paging response.

11. A method comprising:
receiving, by a first base station from a wireless device, an uplink signal, wherein a radio access network (RAN) notification area of the wireless device comprises the first base station and one or more other base stations;
receiving, by the first base station, a packet for transmission to the wireless device:
after a duration from receiving the uplink signal; and
while the wireless device is in a radio resource control inactive state;
determining that the duration is shorter than a value; and
based on the determining:
sending, by the first base station to the wireless device, a radio access network (RAN) paging and the packet; and
not sending, by the first base station to the one or more other base stations in the RAN notification area, the RAN paging and the packet.

12. The method of claim 11, wherein the receiving the packet for transmission to the wireless device comprises receiving the packet for the wireless device from a core network node.

13. The method of claim 11, wherein the uplink signal is associated with at least one of:
a data transmission;
an uplink data transmission of the wireless device being in the radio resource control (RRC) inactive state;
a RAN notification area update procedure; or
a state transition of the wireless device from an RRC connected state to the RRC inactive state.

14. The method of claim 11, wherein at least one of the first RAN paging message or the second RAN paging indicates at least one of:
an identifier of the wireless device; or
information of the RAN notification area.

15. The method of claim 11, wherein the value is based on moving speed of the wireless device.

16. The method of claim 11, wherein the first base station keeps a wireless device context of the wireless device at least during a time in which the wireless device is in the radio resource control inactive state, the wireless device context comprising at least one of:

a bearer configuration information;
a logical channel configuration information;
a packet data convergence protocol configuration information; or
a security information.

17. The method of claim 11, wherein the first base station is an anchor base station associated with the RAN notification area.

18. The method of claim 11, further comprising sending, by the first base station to the wireless device, at least one radio resource control message comprising information of the RAN notification area, wherein the at least one radio resource control message indicates a state transition of the wireless device to the radio resource control inactive state.

19. The method of claim 11, further comprising receiving, by the first base station from the wireless device, a radio resource control message associated with the first RAN paging.

20. The method of claim 19, wherein the sending of the packet by the first base station to the wireless device is further based on the receiving the radio resource control message.

* * * * *